United States Patent
Li et al.

(10) Patent No.: US 9,160,001 B2
(45) Date of Patent: Oct. 13, 2015

(54) LITHIUM-ION BATTERY MATERIALS WITH IMPROVED PROPERTIES

(75) Inventors: Bin Li, San Diego, CA (US); Steven Kaye, San Diego, CA (US); Doron Greenberg, Agoura Hills, CA (US); Conor Riley, San Diego, CA (US); Jingning Shan, San Diego, CA (US); Jen-Hsien Yang, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 33 days.

(21) Appl. No.: 13/336,600

(22) Filed: Dec. 23, 2011

(65) Prior Publication Data

US 2012/0273716 A1     Nov. 1, 2012

Related U.S. Application Data

(60) Provisional application No. 61/426,733, filed on Dec. 23, 2010, provisional application No. 61/543,254, filed on Oct. 4, 2011.

(51) Int. Cl.
   *H01M 4/88* (2006.01)
   *H01M 4/13* (2010.01)
   *H01M 4/58* (2010.01)
   (Continued)

(52) U.S. Cl.
   CPC .............. *H01M 4/5825* (2013.01); *H01M 4/02* (2013.01); *H01M 4/136* (2013.01); *H01M 4/366* (2013.01); *H01M 4/525* (2013.01); *H01M 4/58* (2013.01); *H01M 4/5805* (2013.01);
   (Continued)

(58) Field of Classification Search
   CPC .. H01M 4/58; H01M 4/5805; H01M 2004/02
   USPC ........................ 252/182.1; 429/231.95, 218.1
   See application file for complete search history.

(56) References Cited

U.S. PATENT DOCUMENTS

| 5,538,814 | A | 7/1996 | Kamauchi et al. |
| 5,744,264 | A | 4/1998 | Barker |

(Continued)

FOREIGN PATENT DOCUMENTS

| CN | 101049922 A | * 10/2007 | .............. C01B 25/45 |
| JP | 11025983 | 1/1999 | |
| WO | WO 2005086771 | 9/2005 | |

OTHER PUBLICATIONS

International Preliminary Report on Patentability of PCT/US2011/067187.

(Continued)

*Primary Examiner* — Jane L Stanley
(74) *Attorney, Agent, or Firm* — Corridor Law Group, P.C.

(57) ABSTRACT

A cobalt-containing phosphate material can comprise lithium (Li) (or, alternatively or additionally other alkali metal(s)), cobalt (Co), phosphate ($PO_4$), and at least two additional metals other than Li and Co (e.g., as dopants and/or metal oxides), and can have a molar ratio of Co to a total amount of Co and the additional metals (e.g., as dopants and/or metal oxides) of at least 0.2, at least 0.3, at least 0.5, at least 0.7, or at least about 0.75. The cobalt-containing phosphate material can have a molar ratio of Co to a total amount of Co and the additional metals (e.g., as dopants and/or metal oxides) ranging from 0.2 to 0.98, from 0.3 to 0.98, from 0.3 to 0.94, from 0.5 to 0.98, from 0.5 to 0.94, or alternatively from 0.5 to 0.9, from 0.7 to 0.9, or from 0.75 to 0.85.

16 Claims, 36 Drawing Sheets

(51) Int. Cl.
*H01M 4/02* (2006.01)
*H01M 4/136* (2010.01)
*H01M 4/36* (2006.01)
*H01M 4/525* (2010.01)
*H01M 4/485* (2010.01)
*H01M 4/505* (2010.01)

(52) U.S. Cl.
CPC .............. *H01M 4/485* (2013.01); *H01M 4/505* (2013.01); *H01M 2004/021* (2013.01); *Y02E 60/122* (2013.01)

(56) References Cited

U.S. PATENT DOCUMENTS

| | | |
|---|---|---|
| 5,871,866 A | 2/1999 | Barker et al. |
| 5,910,382 A | 6/1999 | Goodenough et al. |
| 6,085,015 A | 7/2000 | Armand et al. |
| 6,136,472 A | 10/2000 | Barker et al. |
| 6,447,951 B1 | 9/2002 | Barker et al. |
| 6,514,640 B1 | 2/2003 | Armand et al. |
| 6,528,033 B1 | 3/2003 | Barker et al. |
| 6,632,566 B1 | 10/2003 | Yamada et al. |
| 6,702,961 B2 | 3/2004 | Barker et al. |
| 6,716,372 B2 | 4/2004 | Barker et al. |
| 6,720,113 B2 | 4/2004 | Goto et al. |
| 6,746,799 B2 | 6/2004 | Yamada et al. |
| 6,794,084 B2 | 9/2004 | Adamson et al. |
| 6,815,122 B2 | 11/2004 | Barker et al. |
| 6,884,544 B2 | 4/2005 | Barker et al. |
| 6,913,855 B2 | 7/2005 | Stoker et al. |
| 6,984,470 B2 | 1/2006 | Morishima et al. |
| 6,991,873 B2 | 1/2006 | Sakai et al. |
| 7,041,239 B2 | 5/2006 | Barker et al. |
| 7,060,238 B2 | 6/2006 | Saidi et al. |
| 7,087,346 B2 | 8/2006 | Barker et al. |
| 7,261,979 B2 | 8/2007 | Gozdz et al. |
| 7,282,301 B2 | 10/2007 | Wixom et al. |
| 7,285,260 B2 | 10/2007 | Armand et al. |
| 7,326,494 B2 | 2/2008 | Wang et al. |
| 7,348,100 B2 | 3/2008 | Adamson et al. |
| 7,348,101 B2 | 3/2008 | Gozdz et al. |
| 7,371,482 B2 | 5/2008 | Wurm et al. |
| 7,422,823 B2 * | 9/2008 | Saidi et al. .................. 429/231.9 |
| 7,457,018 B2 | 11/2008 | Armand et al. |
| 7,482,097 B2 | 1/2009 | Saidi et al. |
| 7,494,744 B2 | 2/2009 | Chang |
| 7,529,014 B2 | 5/2009 | Franger et al. |
| 7,585,593 B2 | 9/2009 | Chang |
| 7,629,084 B2 | 12/2009 | Chang |
| 7,642,014 B2 | 1/2010 | Morishima et al. |
| 7,670,721 B2 | 3/2010 | Wurm et al. |
| 7,718,320 B2 | 5/2010 | Chang |
| 7,736,807 B2 | 6/2010 | Hasegawa et al. |
| 7,767,332 B2 | 8/2010 | Barker et al. |
| 7,799,461 B2 | 9/2010 | Gozdz et al. |
| 2004/0151649 A1 | 8/2004 | Hemmer et al. |
| 2005/0181283 A1 | 8/2005 | Pugh et al. |
| 2008/0014507 A1 | 1/2008 | Kejha |
| 2009/0123839 A1 | 5/2009 | Soma et al. |
| 2009/0186275 A1 * | 7/2009 | Exnar et al. .................. 429/220 |
| 2009/0186277 A1 | 7/2009 | Beck et al. |
| 2010/0028777 A1 * | 2/2010 | Ueda et al. .................. 429/221 |
| 2010/0190058 A1 | 7/2010 | Thackeray et al. |
| 2011/0052988 A1 * | 3/2011 | Beck et al. .................. 429/221 |

OTHER PUBLICATIONS

International Search Report and Written Opinion for International Application No. PCT/US2011/067187, mailed Apr. 4, 2012, 16 pages.

Nam et al., "In situ X-ray absorption and diffraction studies of carbon coated LiFe1/4Mn1/4Co1/4Ni1/4P04 cathode during first charge," Electrochemistry Communications, vol. 11 (2009), 913-916 Feb. 26, 2009.

Chen, et al., "Electrochemical and structural studies of $LiCo_{1/3}Mn_{1/3}Fe_{1/3}PO_4$ as a cathode material for lithium ion batteries," Journal of Power Sources, 195 (2010), 6867-6872. Feb. 2, 2010.

Kuo et al., Effect of $Co_2P$ on Electrochemical Performance of $Li(Mn_{0.35}Co_{0.2}Fe_{0.45}) PO_4/C$, The Journal of Physical Chemistry B, vol. 112, No. 27, 8017-8023; Jun. 18, 2008.

Wang et al., "Continuous solid solutions $LiFe_{1-x}CoxPO_4$ and its electrochemical performance," Journal of Power Sources, 146 (2005), p. 580-583; Apr. 27, 2005.

Lin et al., "Cross-Disciplinary Physics And Related Areas Of Science And Technology; LiSite and Metal-Site Ion Doping in Phosphate-Olivine LiCoP04 by First-Principles Calculation," Chinese Physics Letters. Institute Of Physics Mar. 1, 2009, vol. 26, No. 3 (2009) 038202.

Wolfenstine et al., "Electrical conductivity of doped $LiCoPO_4$," Journal Of Power Sources. vol 158 (2006) 1431-1435; Nov. 28, 2005.

Wolfenstine et al., "$LiNiPO_4$-$LiCoPO_4$ solid solutions as cathodes," Journal Of Power Sources vol. 136 (2004) 150-153; Jul. 8, 2004.

Kishore et al., "Influence of isovalent ion substitution on the electrochemical performance of LiCoP04," Materials Research Bulletin, Oct. 6, 2005 vol. 40 (2005) 1705-1712.

* cited by examiner

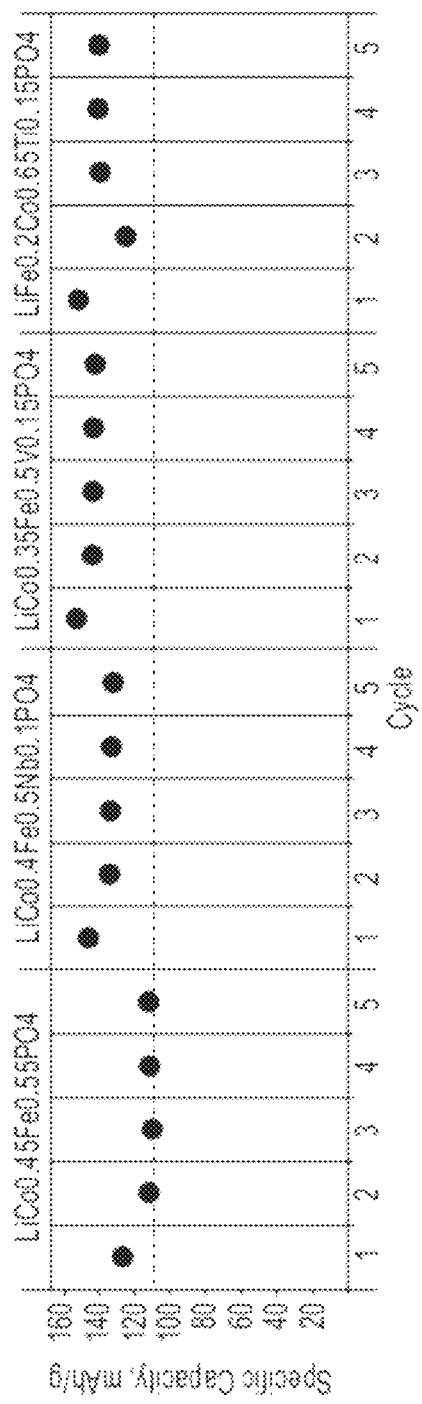
Figure 3a
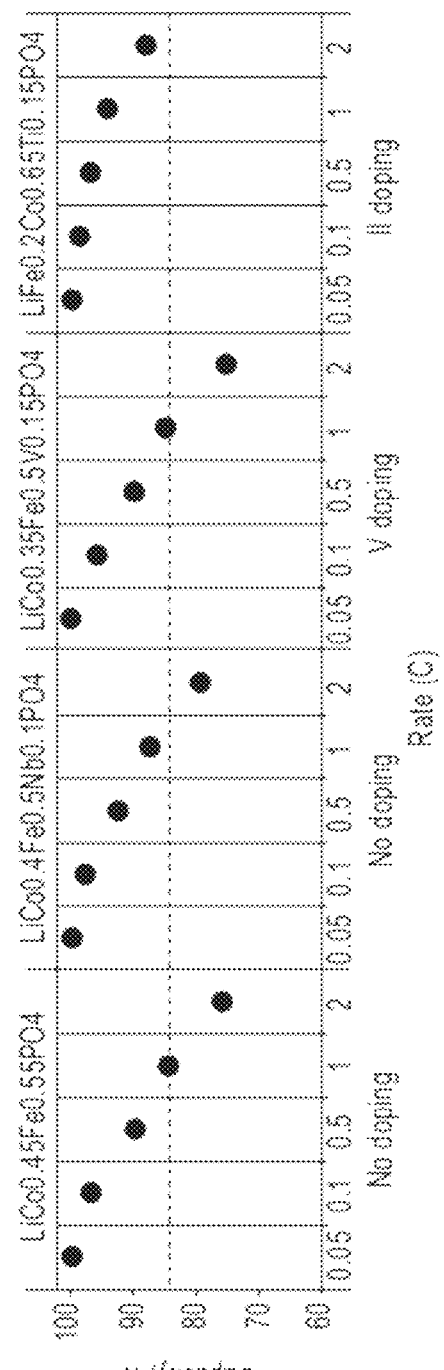
Figure 3b
Figure 3

Figure 5
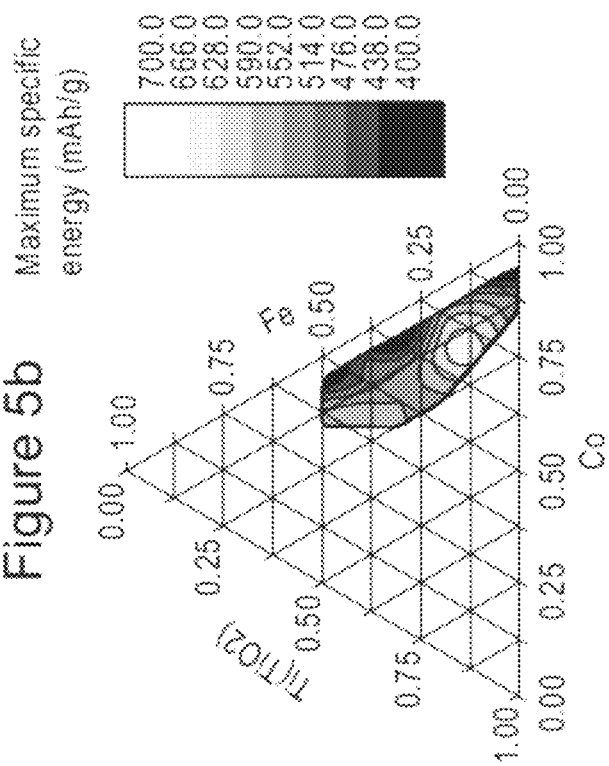
Figure 5a
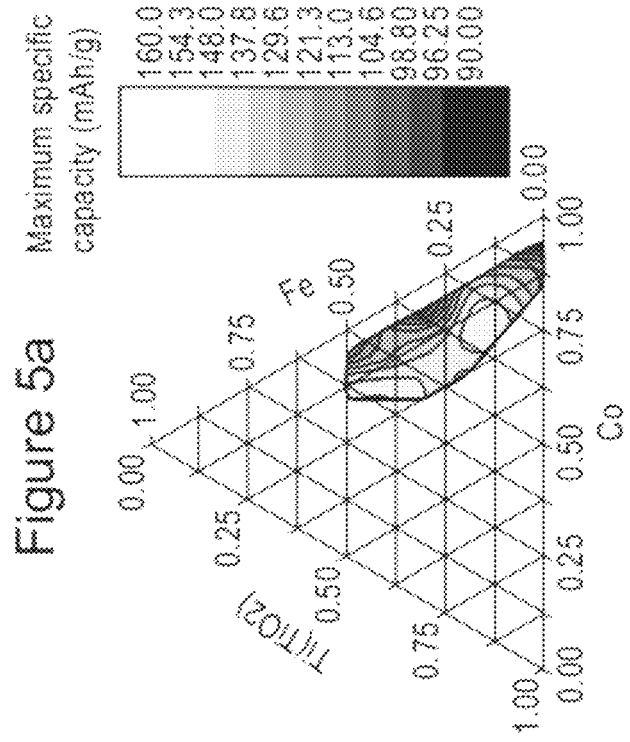
Figure 5b

Figure 6
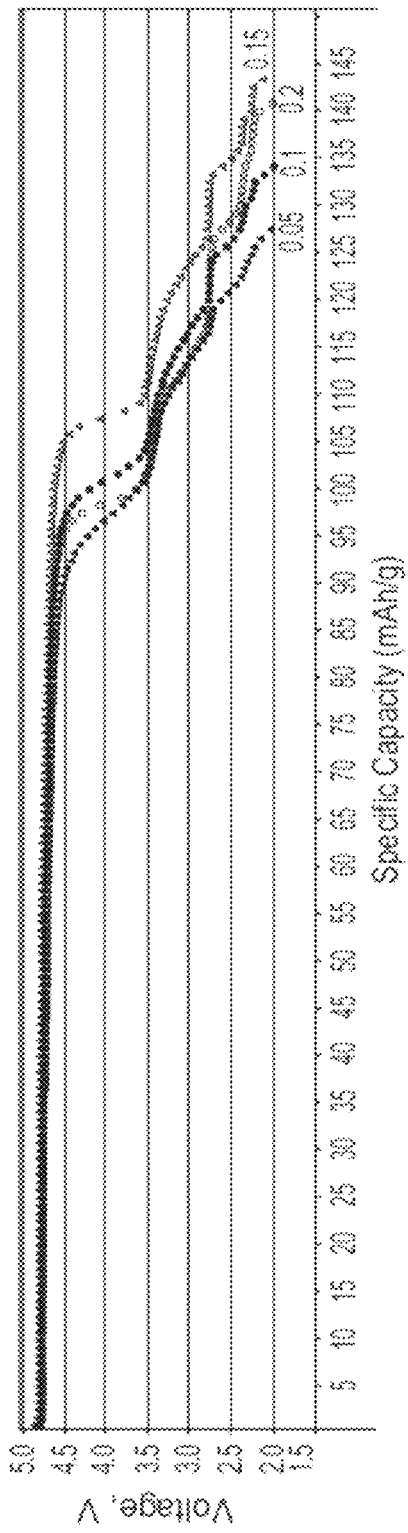
Figure 6a
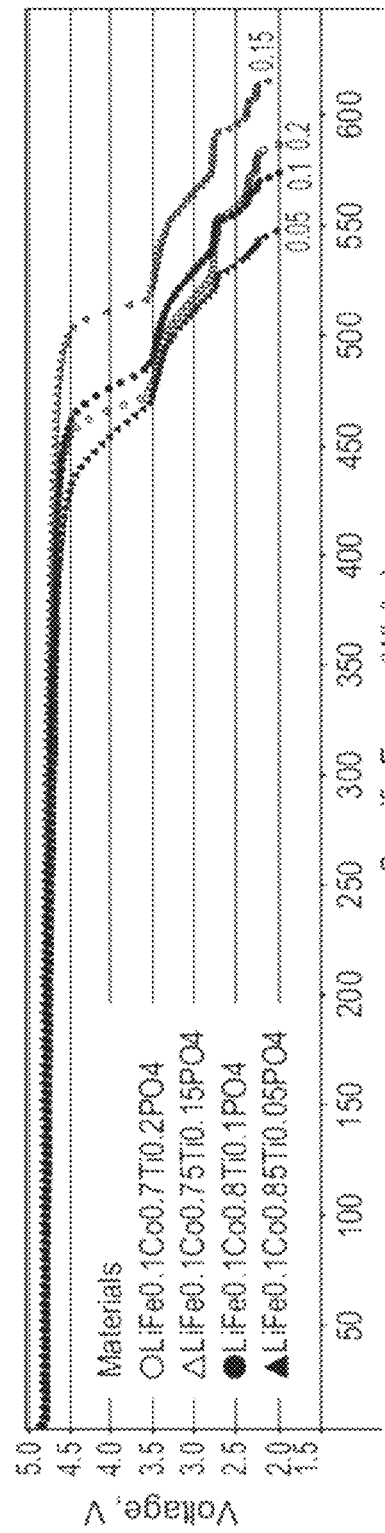
Figure 6b

Figure 8
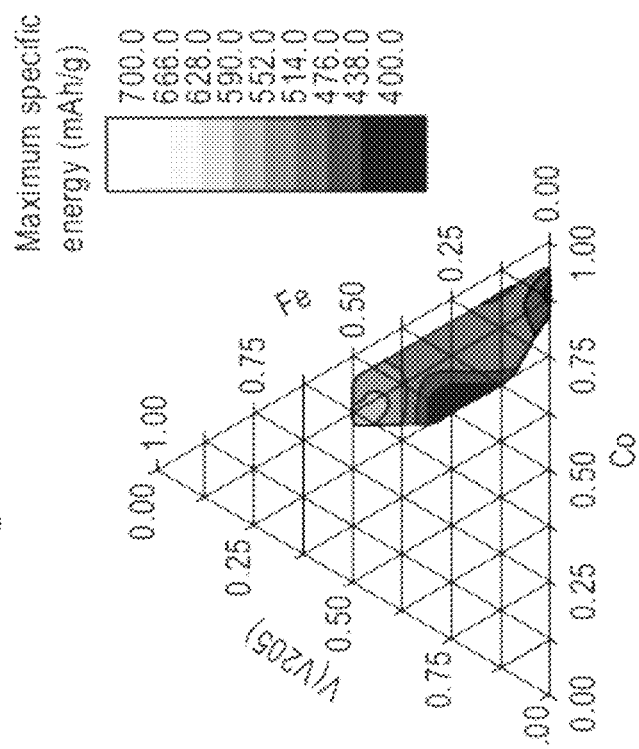
Figure 8a
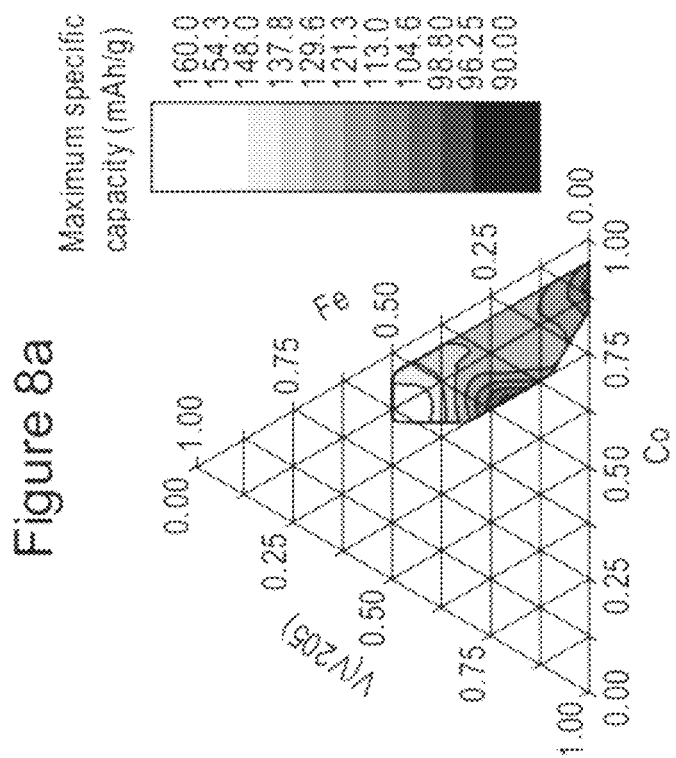
Figure 8b

Figure 11
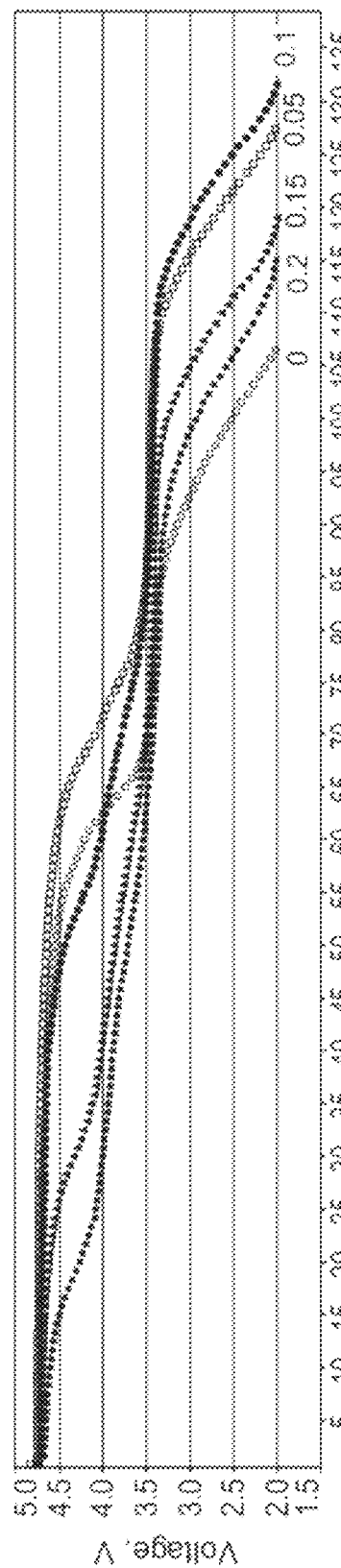
Figure 11a
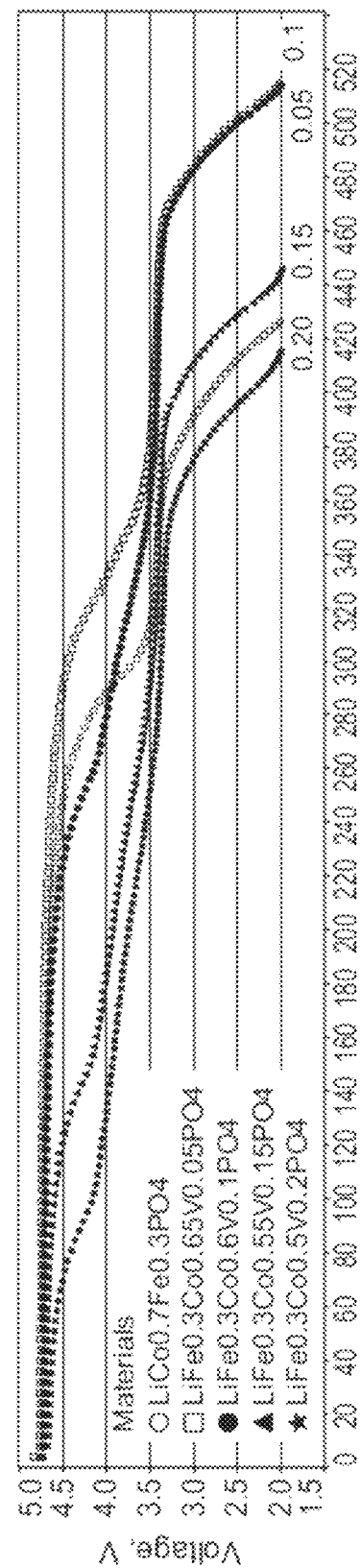
Figure 11b

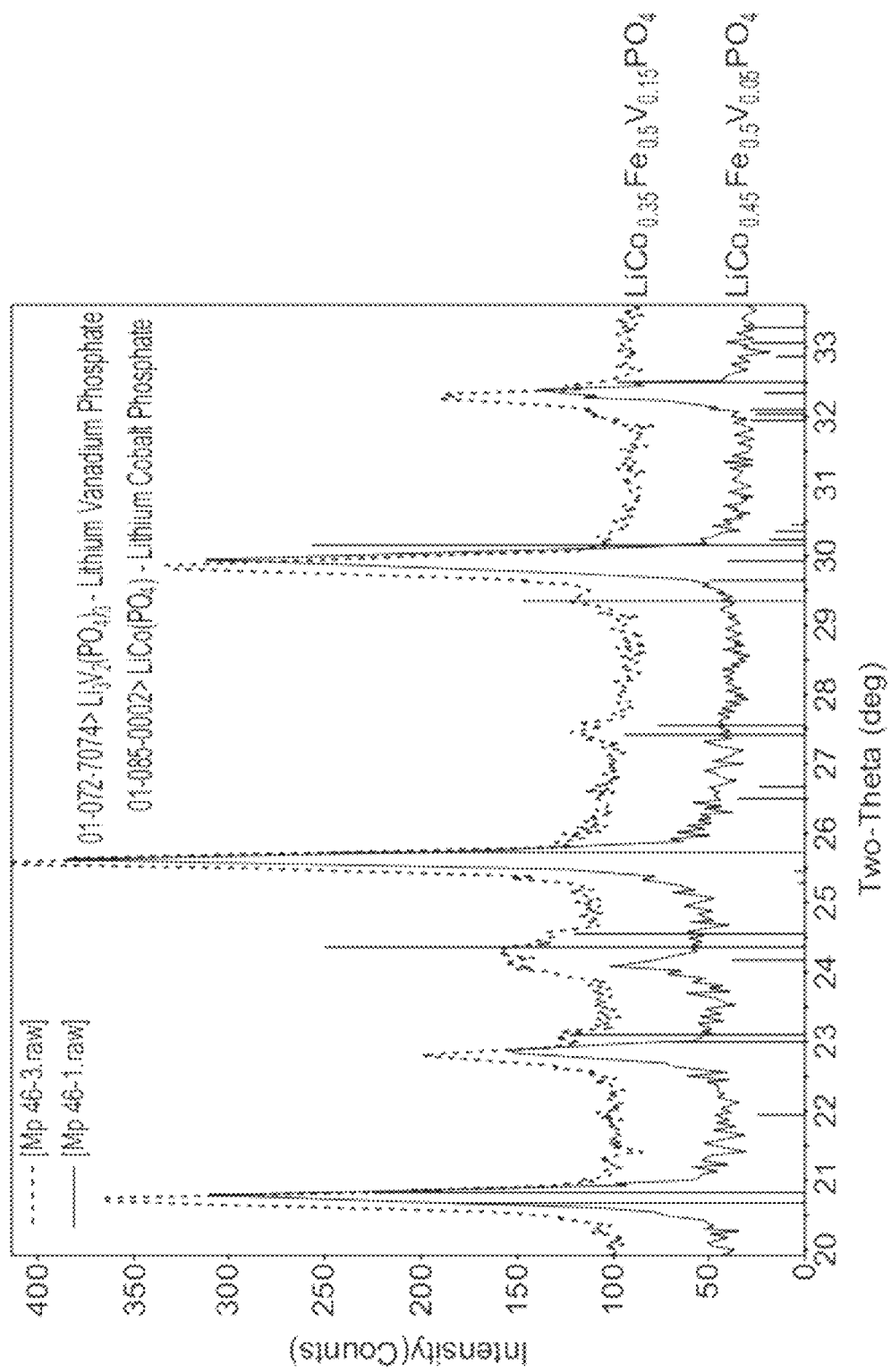

Figure 13
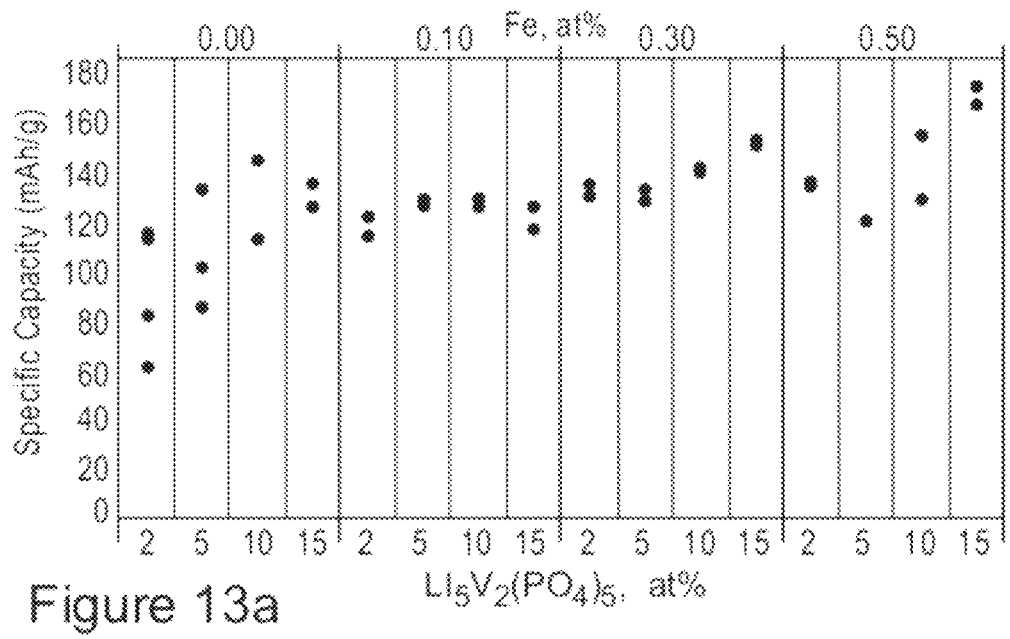
Figure 13a
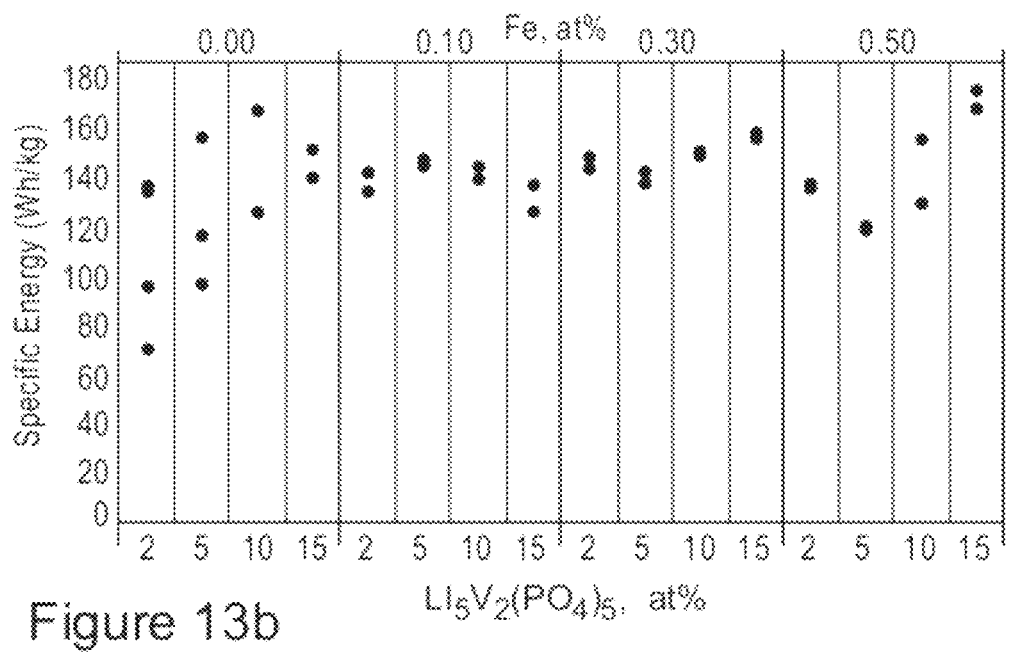
Figure 13b

Figure 14
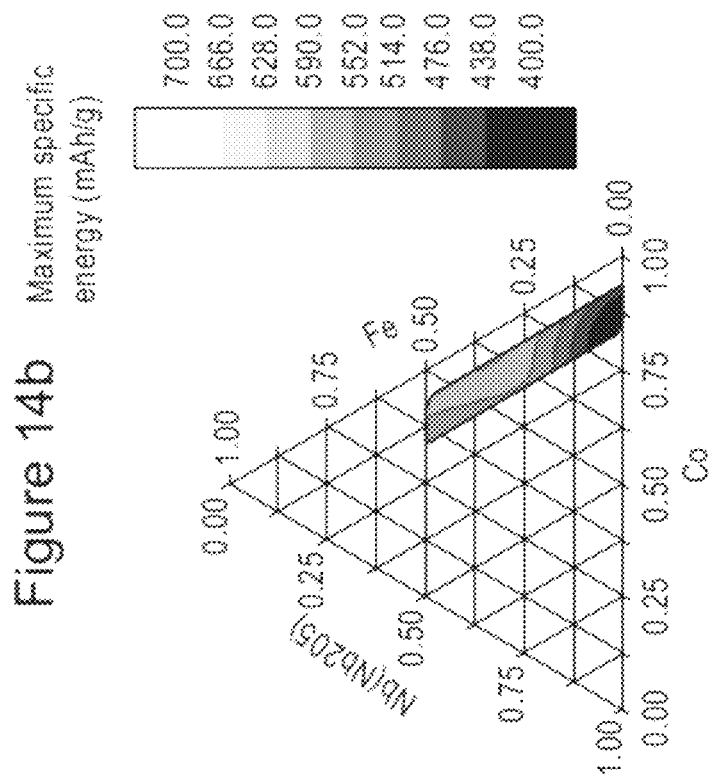
Figure 14b
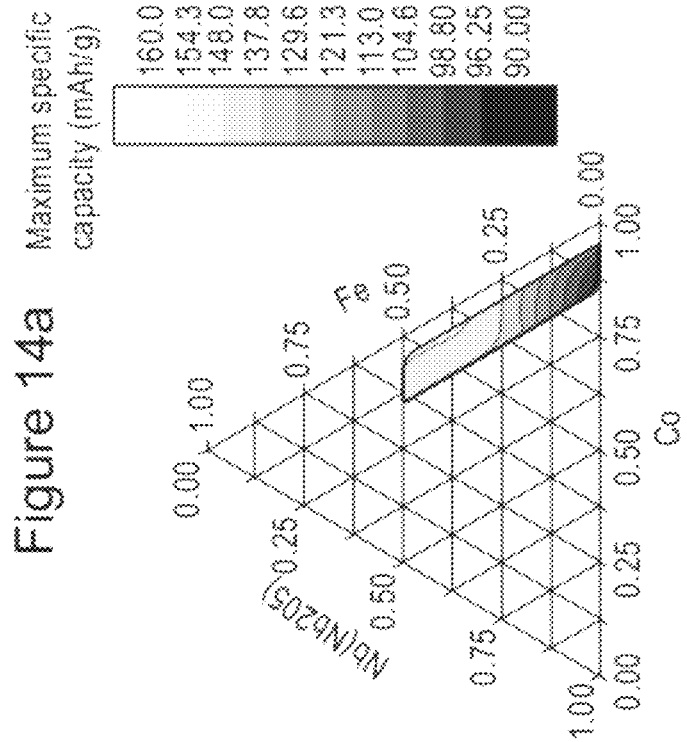
Figure 14a

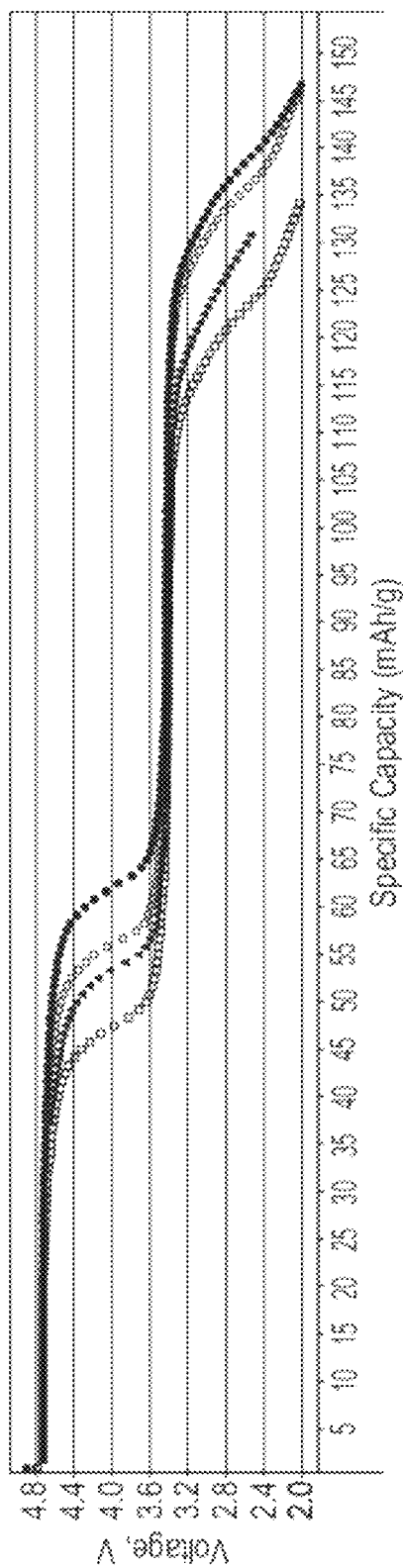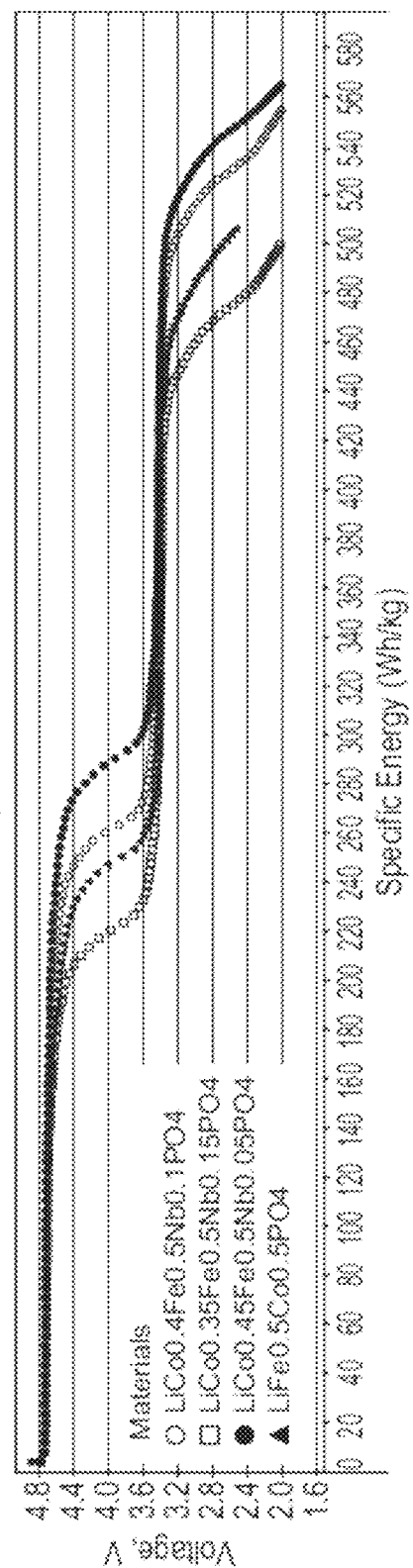
Figure 16a
Figure 16b

Figure 19
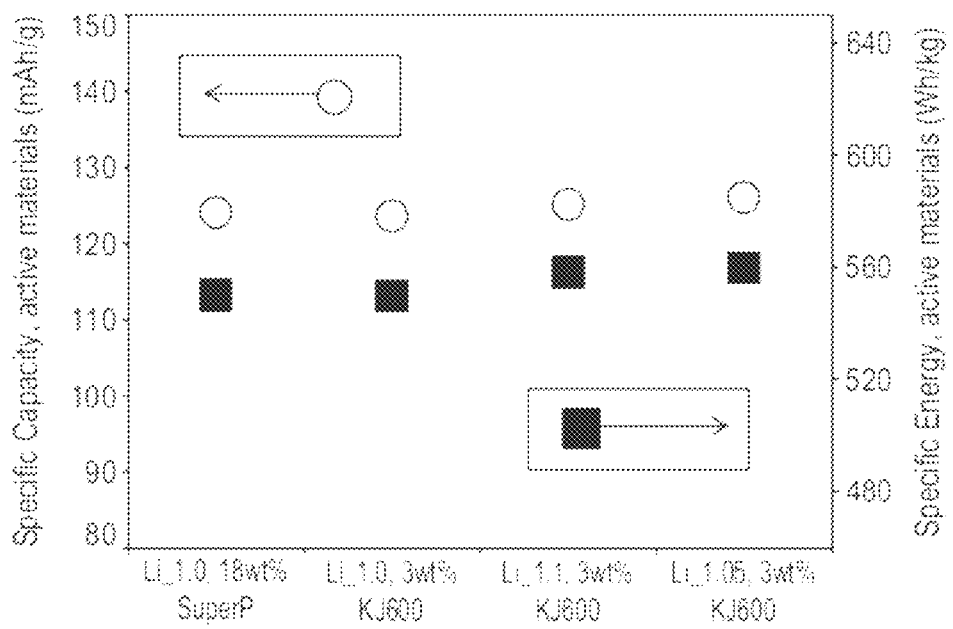
Figure 19 (a)
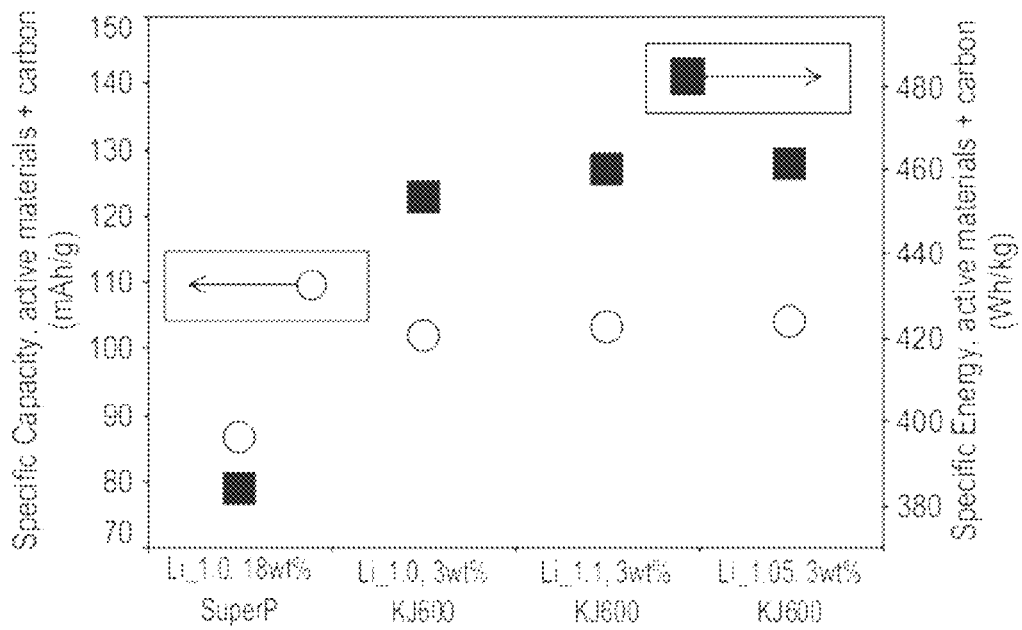
Figure 19 (b)

Figure 20
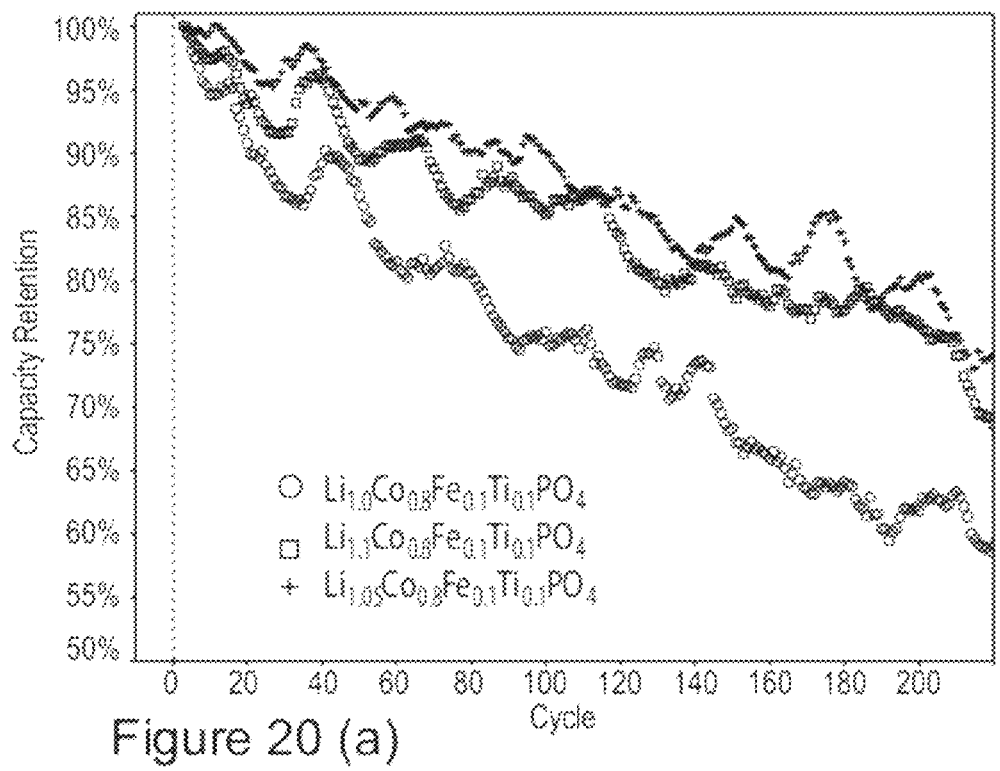
Figure 20 (a)
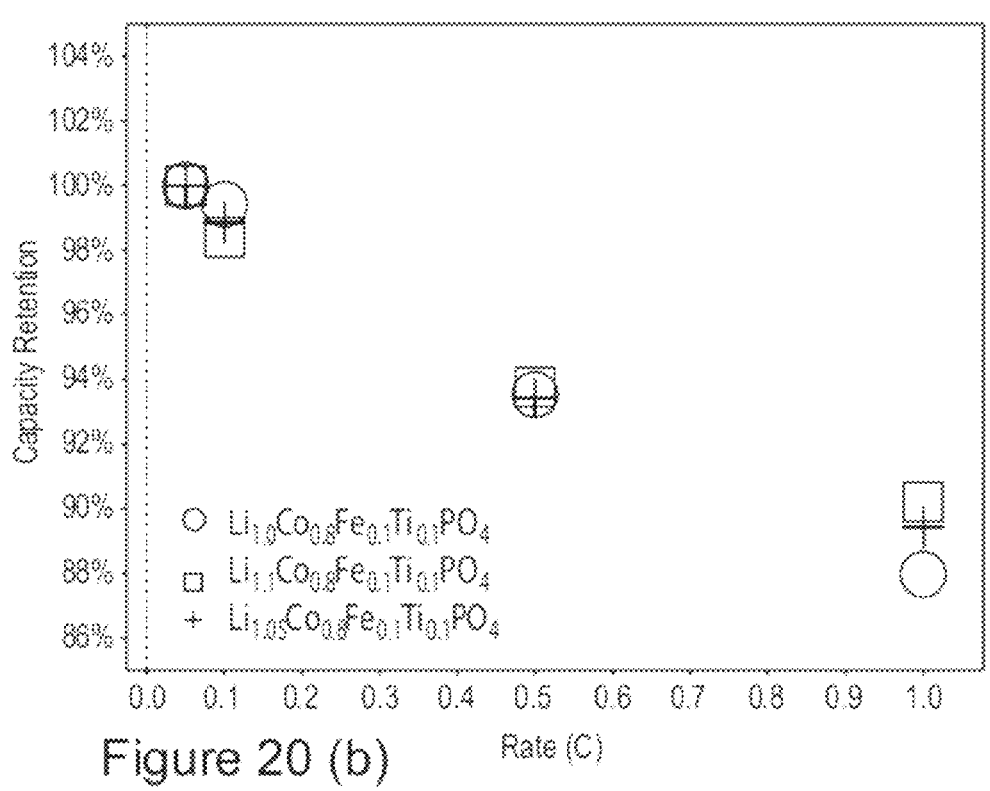
Figure 20 (b)

LITHIUM-ION BATTERY MATERIALS WITH IMPROVED PROPERTIES

CROSS REFERENCE TO RELATED APPLICATIONS

This application claims priority to and the benefit of U.S. Provisional Application Ser. No. 61/426,733, filed Dec. 23, 2010, and U.S. Provisional Application Ser. No. 61/543,254, filed Oct. 4, 2011, the disclosures of which are hereby incorporated by reference in their entirety.

FIELD OF THE INVENTION

Embodiments of this invention generally relate to electrode active materials, electrodes, and batteries. In particular, embodiments of this invention relate to electrode active materials comprising lithium, alternatively or optionally additionally other alkali metals, cobalt, and other metals such as transition metals, and phosphates or similar moieties. Preferred embodiments of this invention relate to electrode active materials comprising lithium, optionally additionally other alkali metals, cobalt, iron and (an) other metal(s) such as a transition metal, and phosphates or similar moieties.

BACKGROUND

In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources.

Batteries can be generally described as comprising three components: an anode that contains a material that is oxidized during discharge of the battery; a cathode that contains a material that is reduced during discharge of the battery; and an electrolyte that provides for transfer of ions between the cathode and anode. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is not reversed, so that the battery becomes unusable once discharged; and "secondary," where the electrochemical reaction is, at least in part, reversible so that the battery can be "recharged" and used more than once. Secondary batteries are increasingly used in many applications, because of their convenience (particularly in applications where replacing batteries can be difficult), reduced cost (by reducing the need for replacement), and environmental benefits (by reducing the waste from battery disposal).

Among the most common secondary battery systems are lead-acid, nickel-cadmium, nickel-zinc, nickel-iron, silver oxide, nickel metal hydride, rechargeable zinc-manganese dioxide, zinc-bromide, metal-air, and lithium batteries. Systems containing lithium and sodium afford many potential benefits, because these metals are light in weight, while possessing high standard potentials. In fact, contemporary portable electronic appliances rely almost exclusively on rechargeable lithium ("Li")-ion batteries as the source of power, because of their high specific energy, high cell voltages, and long shelf-life.

Li-ion batteries are prepared from one or more lithium electrochemical cells containing electrochemically active (or electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically nonaqueous aprotic organic solvents. Other electrolytes are solid electrolytes that contain an ionic conductive medium (typically a lithium containing salt dissolved in organic solvents) in combination with a polymer that itself may be ionically conductive but electrically insulating.

A variety of materials are used commercially as the cathode active materials in Li-ion batteries. Of these, olivine-type $LiFePO_4$ is commonly accepted as one of the most promising cathode material for large-scale Li-ion batteries because of its low-cost, non-toxicity, and extremely high stability. However, this cathode material has very poor conductivity, and also has a low theoretical specific energy of ~530 Wh/Kg due to a low operating voltage of ~3.4 V. Compared to $LiFePO_4$, $LiCoPO_4$ with higher operating voltage (4.7V) is predicted to have ~1.5 times the specific energy of $LiFePO_4$. Moreover, $LiCoPO_4$ is also expected to have higher electrical and lithium ion conductivity than $LiFePO_4$ potentially enabling the achievement of an even higher volumetric energy density by using thicker electrodes, less carbon coating, or larger particle size. In addition, olivine-type cathode materials are generally safer than more commonly used $LiTMO_2$-type cathodes because of their greater thermal stability resulting from the strong covalent bonding between the oxygen and $P^{5+}$ to form $(PO_4)^{3-}$ tetrahedral polyanion. However, $LiCoPO_4$ materials generally have low electronic conductivity and relatively poor $Li^+$ diffusivity, which causes low charge/discharge capacity and large degradation of capacity. Several approaches have been used to improve performance of olivine-type cathodes, such as coating with electrically conductive materials (typically carbon), reducing particle size and doping. However, due to differences in their Li-electrochemical behavior, the approaches used to improve conductivity cannot be universally applied to all materials. To date, cathode materials comprising combinations of Fe and Co as dopants in lithium materials have shown relatively poor battery properties relative to both $LiFePO_4$ and the theoretical performance. (FIG. 1)

Ideally, a Li-ion cathode material would exhibit a high voltage potential and capacity, the ability to be recharged over multiple cycles with high efficiency, and would be economically practical to produce. However, many of the cathode materials known in the art lack one or more of these characteristics. As new and existing battery applications demand continuous improvements in battery capabilities, there is an unmet need for battery materials that can provide desirable battery properties.

SUMMARY

An object of an embodiment of the present invention is to provide a material having improved battery properties. In one embodiment, the improved battery properties are discharge capacity, (maximum or total) specific capacity, (maximum or total) specific energy, rate capability, cycling capability, and/or discharge rate.

Another object of an embodiment of the present invention is to provide a nonaqueous electrolyte secondary battery comprising a positive electrode containing the material having improved battery properties.

In a first aspect, the invention is directed to cobalt-containing phosphate materials (alternatively referred to herein as cobalt-rich phosphate materials).

In a second aspect, the invention is directed to electrode materials, such as cathode materials, which comprise an active material comprising a cobalt-containing phosphate material, including without limitation cobalt-containing phosphate materials of the first aspect of the invention. This aspect is also directed to electrodes, such as cathodes, comprising such electrode materials.

As described herein, various cobalt-containing phosphate materials of the first aspect of the invention can be considered in connection with the second aspect of the invention, as well as with other aspects of the invention (described hereinafter) which include such cobalt-containing phosphate materials of the first aspect or which include such electrode materials of the second aspect of the invention.

A cobalt-rich phosphate material can comprise lithium (or, alternatively or additionally other alkali metal(s)) and cobalt, and can incorporate additional electrochemically active or inactive elements (e.g., as dopants).

Hence, in a first general embodiment of the first aspect, a cobalt-containing phosphate material can comprise lithium (Li) (or, alternatively or additionally other alkali metal(s)), cobalt (Co), phosphate ($PO_4$), and at least two additional metals other than Li and Co (e.g., as dopants and/or metal oxides), and can have a molar ratio of Co to a total amount of Co and the additional metals (e.g., as dopants and/or metal oxides) of at least 0.2. Preferably in such embodiment, the cobalt-containing phosphate material can have a molar ratio of Co to a total amount of Co and the additional metals (e.g., as dopants and/or metal oxides) of at least 0.3, at least 0.5, or at least 0.7, or at least about 0.75. Preferably in such embodiment, the cobalt-containing phosphate material can have a molar ratio of Co to a total amount of Co and the additional metals (e.g., as dopants and/or metal oxides) ranging from 0.2 to 0.98, preferably from 0.3 to 0.98, or from 0.3 to 0.94, preferably from 0.5 to 0.98, or from 0.5 to 0.94, or alternatively from 0.5 to 0.9, from 0.7 to 0.9, or from 0.75 to 0.85.

In a second general embodiment of the first aspect, a cobalt-containing phosphate material can comprise lithium (Li) (or, alternatively or additionally other alkali metal(s)), cobalt (Co), phosphate ($PO_4$), and at least two additional transition metals selected from iron (Fe), titanium (Ti), vanadium (V), niobium (Nb), zirconium (Zr), hafnium (Hf), molybdenum (Mo), tantalum (Ta), tungsten (W), manganese (Mn), copper (Cu), chromium (Cr), nickel (Ni), and zinc (Zn) (e.g., as dopants and/or metal oxides), and can have a molar ratio of Co to a total amount of Co and the additional transition metals (e.g., as dopants and/or metal oxides) of at least 0.5. Preferably in such embodiment, the at least two additional transition metals are selected from iron (Fe), titanium (Ti), vanadium (V) and niobium (Nb) (e.g., as dopants and/or oxides thereof). Preferably in such embodiment, the at least two additional transition metals are iron (Fe) (e.g., as a dopant and/or an oxide thereof), and a transition metal selected from titanium (Ti), vanadium (V), and niobium (Nb) (e.g., as dopants and/or oxides thereof). Preferably in such embodiment, the cobalt-containing phosphate material can have a molar ratio of Co to a total amount of Co and the additional transition metals (e.g., as dopants and/or metal oxides) of at least 0.7, or at least about 0.75. Preferably in such embodiment, the cobalt-containing phosphate material can have a molar ratio of Co to a total amount of Co and the additional transition metals (e.g., as dopants and/or metal oxides) ranging from 0.5 to 0.98, or alternatively from 0.5 to 0.9, from 0.7 to 0.9, or from 0.75 to 0.85.

In such first or such second general embodiments of the first aspect, the cobalt-containing phosphate material can have, in at least one operational state (e.g., in a discharged state), a molar ratio of Li (or, alternatively or additionally other alkali metal(s)) to the total amount of Co and the additional (transition) metals (e.g., as dopants and/or metal oxides) of greater than 0.5, preferably greater than 0.7, preferably greater than 0.9, and preferably greater than 1.0. Such molar ratio of Li (or, alternatively or additionally other alkali metal(s)) to the total amount of Co and the additional (transition) metals (e.g., as dopants and/or metal oxides) can be from 0.5 to 1.5, preferably from 0.7 to 1.3 or preferably from 0.9 to 1.3. Alternatively, such molar ratio of Li (or, alternatively or additionally other alkali metal(s)) to the total amount of Co and the additional (transition) metals (or metal oxides) can, in a discharged state, be at least 1.0, and can range, for example, in some (sub)embodiments, from 1.0 to 1.3, from 1.0 to 1.2, or from 1.0 to 1.1.

In a third general embodiment of the first aspect, the cobalt-containing phosphate material can comprise lithium (Li), cobalt (Co), a first transition metal (M), a second transition metal (M') different from M, and phosphate ($PO_4$), where M and M' are each selected from iron (Fe), titanium (Ti), vanadium (V), niobium (Nb), zirconium (Zr), hafnium (Hf), molybdenum (Mo), tantalum (Ta), tungsten (W), manganese (Mn), copper (Cu), chromium (Cr), nickel (Ni), and zinc (Zn) (e.g., as dopants and/or oxides thereof), and can have molar ratios of Li:Co:M:M':$PO_4$ defined by $(1-x):(1-y-z):y:z:(1-a)$, respectively, optionally represented (as a shorthand notation) as

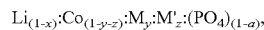

$$Li_{(1-x)}:Co_{(1-y-z)}:M_y:M'_z:(PO_4)_{(1-a)},$$

where: $-0.3 \le x \le 0.3$; $0.01 \le y \le 0.5$; $0.01 \le z \le 0.3$; $-0.5 \le a \le 0.5$; and $0.2 \le 1-y-z \le 0.98$. Preferably in such embodiment, M and M' are each selected from iron (Fe), titanium (Ti), vanadium (V) and niobium (Nb) (e.g., as dopants and/or oxides thereof). Preferably in such embodiment, M is iron (Fe) (e.g., as a dopant and/or oxide thereof), M' is selected from titanium (Ti), vanadium (V), and niobium (Nb) (e.g., as dopants and/or oxides thereof). Preferably, in such embodiment, $-0.3 \le x \le 0$, $-0.2 \le x \le 0$, or $-0.1 \le x \le 0$. Preferably, in such embodiment, M' is Ti, and $0.05 \le z \le 0.25$ or $0.05 \le z \le 0.2$. Preferably, in such embodiment, M' is V, and $0.03 \le z \le 0.25$ or $0.05 \le z \le 0.2$. Preferably, in such embodiment, $0.3 \le 1-y-z \le 0.98$, $0.5 \le 1-y-z \le 0.98$, or $0.7 \le 1-y-z \le 0.98$. Preferably, in such embodiment, $0.3 \le 1-y-z \le 0.94$, $0.5 \le 1-y-z \le 0.94$, or $0.7 \le 1-y-z \le 0.94$.

In a fourth general embodiment of the first aspect of the present invention, a cobalt-containing (cobalt-rich) phosphate material is provided which has the formula:

$$Li_{1-x-y}Co_{1-y}(N_w)^p(M_y)^q(PO_4)_{1-a} \qquad (I)$$

wherein:

a) each M is independently one or more of a Group IIA (or Group 2), Group IIIA (or Group 3), Group IIIB (or Group 13), transition metal, or rare earth element;

b) q is an integer or non-integer that can independently vary from q=1 to q=8;

c) y can independently vary from $0 \le y \le 0.9$;

d) each N is independently one or more of a Group IA (or Group 1), Group IIA (or Group 2), IIIA (or Group 3), Group IIIB (or Group 13), transition metal, or rare earth element;

e) p is an integer or non-integer that can independently vary from p=0 to p=2;

f) w can independently vary from $0 \le w \le 0.3$;

g) x can independently vary from $-0.3 \le x \le 0.3$; and h) a can independently vary from $-0.5 \le a \le 0.5$, $-0.3 \le a \le 0.3$, $0 \le a \le 0.5$, or $0.05 \le a \le 0.5$.

Preferably, in such embodiment, q varies from q=1 to q=3, such as where q is 1 or 2 or where q is 2 or 3. Preferably, in such embodiment, p is 0 or 1. Preferably, in such embodiment, $-0.3 \le x \le 0.1$, $-0.3 \le x \le 0$, or $-0.2 \le x \le 0$. Preferably, in such embodiment, $-0.3 \le a \le 0.1$.

In another fifth general embodiment of the first aspect of the present invention, a cobalt-containing (cobalt-rich) phosphate material is provided which has the formula:

$$Li_{1-x}Co_{1-y-z}M_yM'_z(PO_4)_{1-a} \quad (II)$$

wherein
a) each M/M' is independently one or more of Fe, Mn, V, Cr, Ni, Ti, Cu, Ce, Hf, Mo, Ta, W, Nb, Zr, and Zn;
b) $-0.3 \le x \le 0.3$;
c) $0.01 \le y \le 0.5$ or $0.05 \le y \le 0.5$;
d) $0.01 \le z \le 0.3$ or $0.05 \le z \le 0.5$;
e) $-0.5 \le a \le 0.5$, $-0.3 \le a \le 0.3$, $0 \le a \le 0.5$, or $0.05 \le a \le 0.5$;
f) with the condition that $0.15 \le 1-y-z$, $0.18 \le 1-y-z$, $0.2 \le 1-y-z$, or $0.2 \le 1-y-z \le 0.98$.

Preferably, in such embodiment, M is Fe, and M' is selected from Ti, V, Nb, Zr, Hf, Mo, Ta, and W. Preferably, in such embodiment, M' is Ti, and $0.05 \le z \le 0.25$ or $0.05 \le z \le 0.2$. Preferably, in such embodiment, M' is V, and $0.03 \le z \le 0.25$ or $0.05 \le z \le 0.2$. Preferably, in such embodiment, $-0.3 \le x \le 0$, $-0.2 \le x \le 0$, or $-0.1 \le x \le 0$. Preferably, in such embodiment, $0.3 \le 1-y-z \le 0.98$, $0.5 \le 1-y-z \le 0.98$, or $0.7 \le 1-y-z \le 0.98$.

In a sixth general embodiment of the first aspect of the invention, a cobalt-containing (cobalt-rich) phosphate material can comprise lithium (Li), cobalt (Co), a first transition metal (M), a second transition metal (M') different from M, and phosphate ($PO_4$), where M and M' are each selected from iron (Fe), titanium (Ti), and vanadium (V) (e.g., as dopants and/or oxides thereof), and can have molar ratios of Li:Co:M:M':$PO_4$ defined by $(1-x):(1-y-z):y:z:(1-a)$, respectively, represented as $$Li_{(1-x)}:Co_{(1-y-z)}:M_y:M'_z:(PO_4)_{(1-a)}$$

where $-0.3 \le x \le 0.3$, $0.01 \le y \le 0.5$, $0.01 \le z \le 0.3$, $-0.5 \le a \le 0.5$, and $0.2 \le 1-y-z \le 0.98$. Preferably, in such embodiment, M is Fe, M' is Ti, and $0.05 \le z \le 0.25$ or $0.05 \le z \le 0.2$. Preferably, in such embodiment, M is Fe, M' is V, and $0.03 \le z \le 0.25$ or $0.05 \le z \le 0.2$. Preferably, in such embodiment, $-0.3 \le x \le 0$, $-0.2 \le x \le 0$, or $-0.1 \le x \le 0$. Preferably, in such embodiment, $0.3 \le 1-y-z \le 0.98$, $0.5 \le 1-y-z \le 0.98$, or $0.7 \le 1-y-z \le 0.98$.

In a seventh general embodiment of the first aspect of the invention, a cobalt-containing (cobalt-rich) phosphate material can comprise a material prepared by a method of synthesis as described hereinafter in connection with the fifth aspect of the invention.

In first through seventh general embodiments of the second aspect of the invention, the electrode materials, such as cathode materials, can comprise an active material comprising a cobalt-containing phosphate material defined by the first through seventh general embodiments of the first aspect of the invention, respectively.

In an eighth general embodiment of the second aspect of the invention, the electrode materials, such as cathode materials, can comprise an active material comprising a cobalt-containing phosphate material, and the cobalt-containing phosphate material can comprise two or more phases. Preferably in such embodiment, at least one of such two or more phases can be an olivine phase.

In a ninth general embodiment of the second aspect of the invention, the electrode materials, such as cathode materials, can comprise an active material comprising a cobalt-containing phosphate material, and the cobalt-containing phosphate material can comprise (1) a first olivine phase including lithium (Li), cobalt (Co), M, and phosphate ($PO_4$), where M is a first transition metal other than Co, the olivine phase having molar ratios of Li:Co:M:$PO_4$ defined by $(1-x):(1-y):y:(1-a)$, respectively, optionally represented (as a shorthand notation) as $$Li_{(1-x)}:Co_{(1-y)}:M_y:(PO_4)_{(1-a)}$$

where: $-0.3 \le x \le 0.3$; $0.01 \le y \le 0.5$; and $-0.5 \le a \le 0.5$; and (2) a second (secondary) phase including M', wherein M' is a second transition metal other than Co and M. Preferably, in such embodiment, the secondary phase includes one or more of an oxide of M', a phosphate of M', a hydroxide of M', a carbonate of M', and a nitrate of M'. Preferably, in such embodiment, M and M' are selected from iron (Fe), titanium (Ti), vanadium (V), niobium (Nb), zirconium (Zr), hafnium (Hf), molybdenum (Mo), tantalum (Ta), tungsten (W), manganese (Mn), copper (Cu), chromium (Cr), nickel (Ni), and zinc (Zn). Preferably, in such embodiment, M is Fe, and M' is selected from Ti, V, Nb, Zr, Hf, Mo, Ta, and W. Preferably, in such embodiment, M' is selected from Ti and V. Preferably, in such embodiment, $0.3 \le 1-y \le 0.98$, $0.5 \le 1-y \le 0.98$, or $0.7 \le 1-y \le 0.98$.

In such eighth or such ninth general embodiments of the second aspect, the electrode materials, such as cathode materials, can comprise an active material comprising a cobalt-containing phosphate material, and the cobalt-containing phosphate material can comprise a first olivine phase including lithium and an additional nasicon phase (i.e., an additional phase having a nasicon structure).

In a tenth general embodiment of the second aspect of the invention, the electrode materials, such as cathode materials, can comprise an active material comprising a cobalt-containing phosphate material, and the cobalt-containing (cobalt-rich) phosphate material can comprise lithium (Li) (or, alternatively or additionally other alkali metal(s)), cobalt (Co), phosphate ($PO_4$), and at least two additional transition metals (e.g., as dopants) having a larger elemental radii than cobalt (Co), whereby a larger unit cell results from incorporating such at least two additional transition metals as dopants on the cobalt (Co) site. Preferably, in such embodiment, the at least two additional transition metals are selected from iron (Fe), titanium (Ti), vanadium (V), and niobium (Nb). Preferably, in such embodiment, the at least two additional transition metals are iron (Fe), and at least one additional transition metal selected from titanium (Ti), vanadium (V), and niobium (Nb).

In any of such eighth, ninth or tenth general embodiments of the second aspect, an electrode active material can comprise two phases: a first phase comprising a component which is a cobalt-rich phosphate material of the first aspect, and a second phase comprising a second component. In one (sub) embodiment, the second component can be a metal oxide, metal phosphate, metal hydroxide, metal carbonate, metal nitrate or mixture thereof. In another (sub)embodiment, the second component can correspond to, or can be derived from, a conductive additive, such as a carbon-based additive. In one (sub)embodiment, the second component is coated on the first component. In another (sub)embodiment, the second component is dispersed through the bulk of the first component. In another (sub)embodiment, the second component is reacted with the first component.

In additional general embodiments of the second aspect, the electrode materials, such as cathode materials, can comprise an active material comprising a cobalt-containing phosphate material (e.g., electrode materials as defined in the aforementioned first through tenth general embodiments of the second aspect) and further, such electrode materials can have one or more properties which are beneficial for use in connection with further aspects of the invention, such as electrochemical cells or batteries, each of which are described hereinafter as a third aspect and fourth aspect of the invention, respectfully. Such one or more properties can include, for example, one or more improved battery properties selected from discharge capacity, (maximum or total) specific capacity, (maximum or total) specific energy, rate capability, cycling capability, discharge rate, lithium ion conductivity, electrical conductivity, and/or lithium ion diffusivity.

Accordingly, in an eleventh general embodiment of the second aspect, the electrode materials, such as cathode materials, can comprise an active material comprising a cobalt-containing phosphate material (e.g., electrode materials as defined in the aforementioned first through tenth general embodiments of the second aspect) and can have a specific capacity of at least 50 mAh/g as measured upon discharge at a rate of 0.05 C (e.g., a current of 7.5 mA/g) from 4.95 V to 4.5 V versus a Li/Li$^+$ counterelectrode. Preferably, such electrode materials can have a specific capacity of at least 60 mAh/g, at least 70 mAh/g, at least 80 mAh/g, at least 90 mAh/g, at least 100 mAh/g, at least 110 mAh/g, at least 120 mAh/g, or at least 130 mAh/g.

In a twelfth general embodiment of the second aspect, the electrode materials, such as cathode materials, can comprise an active material comprising a cobalt-containing phosphate material (e.g., electrode materials as defined in the aforementioned first through tenth general embodiments of the second aspect) and can have a specific capacity at a voltage of 4.5 V which is at least 10% of its specific capacity at a voltage of 2.0 V, as measured upon discharge at a rate of 0.05 C (e.g., a current of 7.5 mA/g) from 4.95 V to 2.0 V versus a Li/Li$^+$ counterelectrode. Preferably, such electrode materials can have a specific capacity at a voltage of 4.5 V which is at least 20%, at least 30%, at least 40%, at least 50%, at least 60%, at least 70%, at least 80%, at least 85%, or at least 90%, in each case, of its specific capacity at a voltage of 2.0 V.

In a thirteenth general embodiment of the second aspect, the electrode materials, such as cathode materials, can comprise an active material comprising a cobalt-containing phosphate material (e.g., electrode materials as defined in the aforementioned first through tenth general embodiments of the second aspect) and can have a specific energy of at least 500 Wh/kg, as measured upon discharge at a rate of 0.05 C (e.g., a current of 7.5 mA/g) from 4.95 V to 2.0 V versus a Li/Li+ counterelectrode. Preferably, such electrode materials can have a specific energy of at least 550 Wh/kg, at least 600 Wh/kg, or at least 650 Wh/kg.

In any of such eleventh through thirteenth general embodiments of the second aspect (including in preferred (sub)embodiments thereof), the electrode materials can have such specific capacity or such specific energy, as measured at a higher or lower discharge rate, such as at a rate of 0.1 C (e.g., a current of 15 mA/g), at a rate of 0.5 C (e.g., a current of 75 mA/g), or at a rate of 1 C (e.g., a current of 150 mA/g).

In a fourteenth general embodiment of the second aspect, the electrode materials, such as cathode materials, can comprise an active material comprising a cobalt-containing phosphate material (e.g., electrode materials as defined in the aforementioned first through tenth general embodiments of the second aspect) and can have a capacity retention defined by retaining, after at least 100 cycles or at least 200 cycles from an initial cycle (e.g., 1$^{st}$ cycle, 2$^{nd}$ cycle, 3$^{rd}$ cycle, 4$^{th}$ cycle, 5$^{th}$ cycle, 6$^{th}$ cycle, 7$^{th}$ cycle, 8$^{th}$ cycle, or 10$^{th}$ cycle), at least 50% of its specific capacity upon discharge during the initial cycle, as measured by cycling at a rate of 1 C (e.g., a current of 150 mA/g) between 4.95 V and 2.0 V versus a reference counterelectrode, such as a graphite anode. Preferably, such electrode materials can retain at least 60%, at least 70%, at least 80%, at least 90%, or at least 95% of its specific capacity upon discharge during an initial cycle after at least 100 cycles, such as after 200 cycles, after 300 cycles, after 400 cycles, after 500 cycles, or after 600 cycles. The electrode materials can have such capacity retention, as measured at a higher or lower cycling rate, such as at a rate of 0.1 C (e.g., a current of 15 mA/g), at a rate of 0.5 C (e.g., a current of 75 mA/g), or at a rate of 0.05 C (e.g., a current of 7.5 mA/g).

In a fifteenth general embodiment of the second aspect, the electrode materials, such as cathode materials, can comprise an active material comprising a cobalt-containing phosphate material (e.g., electrode materials as defined in the aforementioned first through tenth general embodiments of the second aspect) and further, such electrode materials can have a rate capability defined by having a specific capacity at a higher rate of 20 C (e.g., a current of 3,000 mA/g) which is at least 30% of a specific capacity at a lower rate of 0.05 C (e.g., a current of 7.5 mA/g), in each case as measured upon discharge from 4.95 V to 2.0 V versus a Li/Li$^+$ counterelectrode or another reference counterelectrode. Preferably, such higher-rate (20 C) specific capacity can be at least 40%, at least 50%, or at least 60% of such lower-rate (0.05 C) specific capacity. Such electrode materials can also have a rate capability defined by having such higher-rate (20 C) specific capacity that is at least 50 mAh/g, such as at least 60 mAh/g, at least 70 mAh/g, at least 80 mAh/g, or at least 90 mAh/g. Such electrode materials can also have a rate capability defined by having a specific capacity at a higher rate of 10 C (e.g., a current of 1,500 mA/g) which is at least 50% of a specific capacity at a lower rate of 0.05 C (e.g., a current of 7.5 mA/g), in each case as measured upon discharge from 4.95 V to 2.0 V versus a Li/Li$^+$ counterelectrode or another reference counterelectrode. Preferably, such higher-rate (10 C) specific capacity can be at least 60%, at least 70%, or at least 80% of such lower-rate (0.05 C) specific capacity. Such electrode materials can also have a rate capability defined by having such higher-rate (10 C) specific capacity that is at least 70 mAh/g, such as at least 80 mAh/g, at least 90 mAh/g, at least 100 mAh/g, or at least 110 mAh/g. Such electrode materials can also have a rate capability defined by having a specific capacity at a higher rate of 5 C (e.g., a current of 750 mA/g) which is at least 60% of a specific capacity at a lower rate of 0.05 C (e.g., a current of 7.5 mA/g), in each case as measured upon discharge from 4.95 V to 2.0 V versus a Li/Li$^+$ counterelectrode or another reference counterelectrode. Preferably, such higher-rate (5 C) specific capacity can be at least 70%, at least 80%, or at least 90% of such lower-rate (0.05 C) specific capacity. Such electrode materials can also have a rate capability defined by having such higher-rate (5 C) specific capacity that is at least 80 mAh/g, such as at least 90 mAh/g, at least 100 mAh/g, at least 110 mAh/g, or at least 120 mAh/g. Such electrode materials can also have a rate capability defined by having a specific capacity at a higher rate of 1 C (e.g., a current of 150 mA/g) which is at least 70% of a specific capacity at a lower rate of 0.05 C (e.g., a current of 7.5 mA/g), in each case as measured upon discharge from 4.95 V to 2.0 V versus a Li/Li$^+$ counterelectrode or another reference counterelectrode. Preferably, such higher-rate (1 C) specific capacity can be at least 80%, at least 90%, or at least 95% of such lower-rate (0.05 C) specific capacity. Such electrode materials can also have a rate capability defined by having such higher-rate (1 C) specific capacity that is at least 90 mAh/g, such as at least 100 mAh/g, at least 110 mAh/g, at least 120 mAh/g, or at least 130 mAh/g. Rate capability can also be measured at other voltage ranges, such as upon discharge from 4.9 V to 2.0 V versus a Li/Li$^+$ counterelectrode or another reference counterelectrode.

In a sixteenth general embodiment of the second aspect, the electrode materials, such as cathode materials, can comprise an active material comprising a cobalt-containing phosphate material (e.g., electrode materials as defined in the aforementioned first through tenth general embodiments of the second aspect) and further, such electrode materials can have properties defined by one or more of the eleventh through fifteenth general embodiments in combination, including all permutations thereof. In one such preferred embodiment, for example, a cobalt-containing (cobalt-rich) phosphate material is provided which has one or more battery properties which include, but are not limited to, specific capacity (e.g., eleventh general embodiment), high-voltage specific capacity (e.g., twelfth general embodiment), specific energy (e.g., thirteenth general embodiment), capacity retention (e.g., fourteenth general embodiment) and/or rate capability (fifteenth general embodiment), in each case as described herein (each individually or in various combinations). As an example, an electrode material can comprise a cobalt-containing (cobalt-rich) phosphate material which has a (maximum) specific capacity of at least 130 mAh/g and can have a specific capacity at a voltage of 4.5 V which is at least 13 mAh/g—representing at least 10% of its (maximum) specific capacity at a voltage of 2.0 V, in each case as measured upon discharge at a rate of 0.05 C (e.g., a current of 7.5 mA/g) from 4.95 V to 2.0 V versus a Li/Li$^+$ counterelectrode.

In another preferred such embodiment of the sixteenth general embodiment of the second aspect, for example, a cobalt-containing (cobalt-rich) phosphate material is provided which comprises an olivine phase and which has one or more battery properties which include, but are not limited to, specific capacity (e.g., eleventh general embodiment), high-voltage specific capacity (e.g., twelfth general embodiment), specific energy (e.g., thirteenth general embodiment), capacity retention (e.g., fourteenth general embodiment) and/or rate capability (fifteenth general embodiment), in each case as described herein. In a further preferred embodiment, a cobalt-containing (cobalt-rich) phosphate material comprises an olivine phase and at least one additional phase, and has one or more battery properties which include, but are not limited to, specific capacity (e.g., eleventh general embodiment), high-voltage specific capacity (e.g., twelfth general embodiment), specific energy (e.g., thirteenth general embodiment), capacity retention (e.g., fourteenth general embodiment) and/or rate capability (fifteenth general embodiment), in each case as described herein.

In a seventeenth general embodiment of the second aspect, the electrode materials, such as cathode materials, can comprise a composite particle comprising a core substrate and a coating (e.g., a metal oxide coating) situated over at least a portion of an outer surface of the core substrate. The core substrate can comprise a cobalt-containing phosphate material (e.g., electrode materials as defined in the aforementioned first through tenth general embodiments of the second aspect). The coating can be an electrochemically inert material. The coating can be a metal oxide. The metal oxide coating can comprise an oxide of one or more transition elements, and preferably an oxide of one or more elements selected from silicon (Si), zirconium (Zr), aluminum (Al) and titanium (Ti). Preferred oxide coatings can include $SiO_2$, $ZrO_2$, $Al_2O_3$ and $TiO_2$. In some (sub)embodiments, the composite particle can comprise a core substrate and an oxide coating of 0.1% to 2.0% (preferably 0.2% to 1.5%, yet preferably 0.25% to 1.0%), by weight relative to weight of the composite particle, over at least a portion of an outer surface of the core substrate. In some (sub)embodiments, the composite particle can comprise a core substrate and an oxide coating over substantially the entire outer surface of the core substrate electrode materials of this seventeenth general embodiment of the second aspect can have one or more properties which are beneficial for use in connection with further aspects of the invention, such as electrochemical cells or batteries, each of which are described hereinafter as a third aspect and fourth aspect of the invention, respectfully. Such one or more properties can include, for example, one or more improved battery properties selected from discharge capacity, (maximum or total) specific capacity, (maximum or total) specific energy, rate capability, cycling capability, discharge rate, lithium ion conductivity, electrical conductivity, and/or lithium ion diffusivity. In particular, such electrode materials can have properties defined by one or more of the eleventh through fifteenth general embodiments in combination, including all permutations thereof. For example, such electrode materials can have properties as recited in connection with the sixteenth general embodiment of this second aspect of the invention.

In a third aspect, the invention is directed to electrochemical cells comprising electrodes which comprise electrode materials of the second aspect, and an electrolyte.

In a fourth aspect, the invention is directed to a battery comprising an anode, a cathode comprising an electrode material of the second aspect of the invention, and an electrolyte disposed between the anode and the cathode.

In a fifth aspect, the invention is directed to methods of preparing or synthesizing the electrode materials of the second aspect of the invention. Preferably, such electrode materials are prepared by milling a set of precursor materials of the electrode materials, and calcining the milled materials to form the electrode materials.

In a sixth aspect, the invention is directed to methods of conditioning an electrode material, such as a cathode material, of the second aspect, conditioning an electrochemical cell of the third aspect, or conditioning a battery of the fourth aspect. A method of conditioning a battery can, for example, comprise conditioning a battery for commercial sale. Such methods can comprise, for example, providing a battery of the fourth aspect, and cycling such battery through at least 1, at least 2, at least 3, at least 4, or at least 5 cycles, each cycle comprising charging the battery and discharging the battery at a rate of 0.05 C (e.g., a current of 7.5 mA/g) between 4.95 V and 2.0 V versus a reference counterelectrode, such as a graphite anode. Charging and discharging can be carried out at a higher or lower rate, such as at a rate of 0.1 C (e.g., a current of 15 mA/g), at a rate of 0.5 C (e.g., a current of 75 mA/g), or at a rate of 1 C (e.g., a current of 150 mA/g).

In a seventh aspect, the invention is directed to methods of using a battery of the fourth aspect. Such methods can comprise, for example, providing a battery of the fourth aspect, and cycling such battery to supply power for consumer electronics, portable electronics, hybrid vehicles, electrical vehicles, power tools, power grid, military applications, and aerospace applications. Cycling can comprise charging the battery and discharging the battery at a rate of 0.05 C (e.g., a current of 7.5 mA/g) between 4.95 V and 2.0 V versus a reference counterelectrode, such as a graphite anode. Charging and discharging can be carried out at a higher or lower rate, such as at a rate of 0.1 C (e.g., a current of 15 mA/g), at a rate of 0.5 C (e.g., a current of 75 mA/g), or at a rate of 1 C (e.g., a current of 150 mA/g).

It has been found that the novel cobalt-containing phosphate materials, electrode materials, electrodes, and batteries of embodiments of this invention afford a number of benefits. Such benefits include one or more of increased capacity, enhanced cycling capability, enhanced reversibility, reduced overpotential, increased coulombic efficiency, and reduced costs. Specific benefits and embodiments of the present invention are apparent from the detailed description set forth herein. It should be understood, however, that the detailed description and specific examples, while indicating embodiments among those preferred, are intended for purposes of illustration only and are not intended to limit the scope of the invention.

BRIEF DESCRIPTION OF THE FIGURES

FIG. 3a illustrates (maximum) specific capacity as a function of number of cycles for cobalt-rich phosphate materials having compositions comprising Li, Fe, Co, an additional metal, "M", and $PO_4$, where M is a transition metal selected from Nb, Ti, and V. (See Example 4). FIG. 3b compares % capacity as a function of current for such cobalt-rich phosphate materials. As a control, a composition comprising Li, Fe, Co, and $PO_4$ was also evaluated. (See Example 4). In FIG. 3b, "% capacity" refers to the observed specific capacity as a percentage of a low-rate specific capacity at 0.05 C, and "Rate (C)" refers to the discharge current as a fraction or multiple relative to a "1 C" current value under which the battery (in a substantially fully charged state) would substantially fully discharge in one hour against a $Li/Li^+$ counterelectrode or another reference counterelectrode. For this data, the "1 C" current value was about 150 mA/g.

FIGS. 5a and 5b illustrate ternary maps comparing (maximum) specific capacity (FIG. 5a, mAh/g) and (maximum) specific energy (FIG. 5b, Wh/kg) as a function of relative molar ratios of cobalt, iron, and titanium (titanium dioxide) in cobalt-rich phosphate materials having compositions comprising Li, Fe, Co, Ti, and $PO_4$. (See Example 6).

FIG. 6 illustrates a voltage trace comparison of specific capacity (FIG. 6a) and specific energy (FIG. 6b) in constant current discharge experiments for cobalt-rich phosphate materials having compositions comprising Li, Fe, Co, Ti, and $PO_4$ in various molar ratios. (See Example 7).

FIGS. 8a and 8b illustrate ternary maps comparing (maximum) specific capacity (FIG. 8a, mAh/g) and (maximum) specific energy (FIG. 8b, Wh/kg) as a function of relative molar ratios of cobalt, iron and vanadium ($V_2O_5$) in cobalt-rich phosphate materials having compositions comprising Li, Fe, Co, V, and $PO_4$. (See Example 9).

FIG. 11 illustrates a voltage trace comparison of specific capacity (FIG. 11a) and specific energy (FIG. 11b) in constant current discharge experiments for cobalt-rich phosphate materials having compositions comprising Li, Fe, Co, V, and $PO_4$ in various molar ratios. A composition comprising Li, Fe, Co, and $PO_4$ was evaluated as a control. (See Example 11).

FIGS. 12a and 12b illustrate X-ray crystal structures for cobalt-rich phosphate materials having compositions comprising Li, Fe, Co, V, and $PO_4$ in various molar ratios. (See Example 12).

FIG. 13 illustrates properties of the cobalt-rich phosphate materials including a material phase, $Li_3V_2(PO_4)_3$, showing (maximum) specific capacity (FIG. 13a) and (maximum) specific energy (FIG. 13b) of materials comprising Li, Fe, Co, V, and $PO_4$ in various molar ratios. (See Example 13). The x-axis refers to the molar ratio of Fe (top) and the molar ratio of the $Li_3V_2(PO_4)_3$ phase (bottom).

FIG. 14 illustrate ternary maps comparing (maximum) specific capacity (FIG. 14a, mAh/g) and (maximum) specific energy (FIG. 14b, Wh/kg) as a function of relative molar ratios of cobalt, iron, and niobium (niobium oxide) in cobalt-rich phosphate materials having compositions comprising Li, Fe, Co, Nb, and $PO_4$. (See Example 14)

FIG. 16 illustrates a voltage trace comparison of specific capacity (FIG. 16a) and specific energy (FIG. 16b) in constant current discharge experiments for cobalt-rich phosphate materials having compositions comprising Li, Fe, Co, Nb, and $PO_4$ in various molar ratios. A composition comprising Li, Fe, Co, and $PO_4$ was evaluated as a control. (See Example 16).

FIGS. 19(a) and 19(b) illustrates (maximum) specific capacity (circles) and (maximum) specific energy (squares) upon discharge during the first cycle based on weight of active material only (FIG. 19(a)) and based on combined weight of active material and a carbon-based additive (FIG. 19(b)), as a function of various relative molar amounts of Li and with either 3 wt % carbon-based additive or 18 wt % carbon-based additive of SuperP or KJ600, as indicated. In each case, the active material included a composition comprising Li, Fe, Co, Ti, and $PO_4$ in relative molar ratios of 1.05:0.1:0.8:0.1:1, respectively. (See Example 18).

FIG. 20(a) compares capacity retention, determined as (maximum) specific capacity as a function of number of cycles (normalized on a percentage basis to the (maximum) specific capacity determined for the $3^{rd}$ cycle), for cobalt-rich phosphate materials having compositions comprising Li, Fe, Co, Ti, and $PO_4$, with various molar amounts of Li, as indicated. FIG. 20(b) demonstrates rate capability by illustration of capacity retention as a function of current for such materials, as measured upon discharge in signature quick rate tests. Measurements were carried out in cobalt-rich phosphate cathode//mesocarbon microbeads anode full cells. "Rate (C)" refers to the discharge current as a fraction or multiple relative to a "1 C" current value under which the battery (in a substantially fully charged state) would substantially fully discharge in one hour. For this data, the "1 C" current value was about 150 mA/g.

DETAILED DESCRIPTION

Definitions

Figure 1:
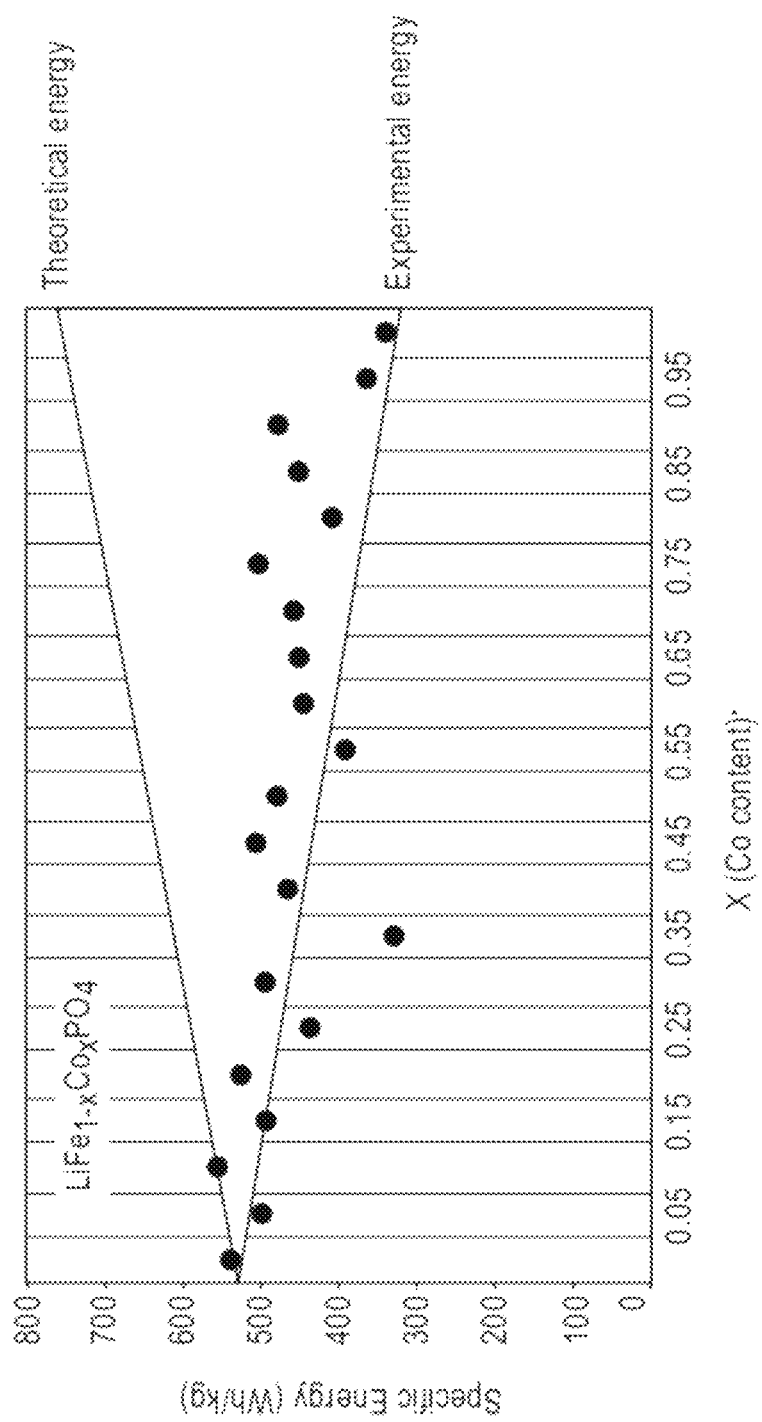
FIG. 1 compares (maximum) specific energy as a function of cobalt content in $LiFe_{1-x}Co_xPO_4$ compounds, where "x" represents the molar ratio of Co to the total amount of Fe and Co. As can be seen in the graph, while the theoretical specific energy increases with increasing Cobalt content ("Co content"), the actual specific energy obtained for such materials is less than the corresponding theoretical value.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise. The use of the term "a" or "an" when used in conjunction with the term "comprising" in the specification may mean "one," but it is also consistent with the meaning of "one or more," "at least one," and "one or more than one."

The term "about" references all terms in the range unless otherwise stated. For example, about 1, 2, or 3 can refer to about 1, about 2, or about 3, and can also refer to from about 1-3, from about 1-2, and from about 2-3.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the term "sub-micron range" refers to a general range of dimensions less than about 1 µm or less than about 1,000 nm, such as less than about 999 nm, less than about 900 nm, less than about 800 nm, less than about 700 nm, less than about 600 nm, less than about 500 nm, less than about 400 nm, less than about 300 nm, or less than about 200 nm, and down to about 1 nm or less. In some instances, the term can refer to a particular sub-range within the general range, such as from about 1 nm to about 10 nm, from about 1 nm to about 100 nm, from about 100 nm to about 200 nm, from about 200 nm to about 300 nm, from about 300 nm to about 400 nm, from about 400 nm to about 500 nm, from about 500 nm to about 600 nm, from about 400 nm to about 600 nm, from about 600 nm to about 700 nm, from about 700 nm to about 800 nm, from about 800 nm to about 900 nm, or from about 900 nm to about 999 nm.

As used herein, the term "main group element" refers to a chemical element in any of Group IA (or Group 1), Group IIA (or Group 2), Group IIIA (or Group 13), Group IVA (or Group 14), Group VA (or Group 15), Group VIA (or Group 16), Group VIIA (or Group 17), and Group VIIIA (or Group 18). A main group element is also sometimes referred to as a s-block element or a p-block element.

As used herein, the term "alkali metals" refers to any chemical element in Group 1, such as lithium, sodium, potassium, rubidium, cesium, or francium.

As used herein, the term "alkali earth metals" refers to any chemical element in Group 2, such as beryllium, magnesium, calcium, strontium, barium, or radium.

As used herein, the term "transition metal" refers to a chemical element in any of Group IVB (or Group 4), Group VB (or Group 5), Group VIB (or Group 6), Group VIIB (or Group 7), Group VIIIB (or Groups 8, 9, and 10), Group IB (or Group 11), and Group IIB (or Group 12). A transition metal is also sometimes referred to as a d-block element.

As used herein, the term "rare earth element" refers to any of Sc, Y, La, Ce, Pr, Nd, Pm, Sm, Eu, Gd, Tb, Dy, Ho, Er, Tm, Yb, or Lu.

As used herein, the terms "battery properties" or "electrochemical properties" refers to one or more properties such as specific capacity, high-voltage specific capacity, volumetric capacity, specific energy, volumetric energy density, potential, capacity retention, rate capability, cycling capability, irreversible capacity, coulombic efficiency, thermal stability, energy efficiency, and cycling voltage, among other properties known in the art. To the extent certain battery properties can vary with temperature, such properties are specified at room temperature (or 25° C.), unless the context clearly dictates otherwise.

As used herein, the term "specific capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge analysis which includes discharge at a defined rate over a defined voltage range against a defined counterelectrode. For example, specific capacity can be measured upon discharge at a rate of about 0.05 C (e.g., about 7.5 mA/g) from 4.95 V to 2.0 V versus a Li/Li$^+$ counterelectrode. For example, high-voltage discharge capacity can be measured upon discharge at a rate of about 0.05 C (e.g., about 7.5 mA/g) from 4.95V to 4.5 V versus a Li/Li$^+$ counterelectrode. Other discharge rates also can be used, such as a rate of about 0.1 C (e.g., about 15 mA/g), or about 0.5 C (e.g., about 75 mA/g), or about 1.0 C (e.g., about 150 mA/g).

As used herein, the term "specific energy" refers to the amount (e.g., total or maximum amount) of electrical energy stored per unit weight. Specific energy can be expressed in units of Wh/kg. In certain aspects and embodiments, specific energy can be measured in a constant current discharge analysis which includes discharge at a defined rate over a defined voltage range against a defined counterelectrode. For example, specific energy can be measured upon discharge at a rate of about 0.05 C (e.g., about 7.5 mA/g) from 4.95 V to 2.0 V versus a Li/Li$^+$ counterelectrode. Other discharge rates also can be used, such as a rate of about 0.1 C (e.g., about 15 mA/g), or about 0.5 C (e.g., about 75 mA/g), or about 1.0 C (e.g., about 150 mA/g).

As used herein, a rate "(C)" refers to the discharge current as a fraction or multiple relative to a "1 C" current value under which a battery (in a substantially fully charged state) would substantially fully discharge in one hour.

As used herein, the term "rate capability" refers to the amount of electrical charge a material can transport as a function of current. Rate capability can be expressed in units of mAh/g at 1 C, but may be expressed at other currents or rates. In certain aspects and embodiments, rate capability can be evaluated by determining specific capacity (e.g., as measured in a constant current discharge analysis) at a defined relatively higher rate (e.g., 1 C, 2 C, 5 C, 10 C, or 20 C), and comparing (e.g., as a percentage basis) to specific capacity determined at a defined relatively lower rate (e.g., 0.05 C, 0.1 C, or 0.5 C).

As used herein, the terms "cycle" or "cycling" refer to complementary discharging and charging processes.

As used herein, the term "capacity retention" refers to an extent of retention of a (maximum) specific capacity over multiple defined number of cycles. In certain aspects and embodiments, capacity retention can be evaluated by determining (maximum) specific capacity (e.g., as measured in a constant current discharge analysis) of an "n$^{th}$" cycle relative (e.g., on a percentage basis) to a determined specific capacity of an initial cycle or another reference cycle (e.g., 1$^{st}$ cycle, 2$^{nd}$ cycle, 3$^{rd}$ cycle, 4$^{th}$ cycle, 5$^{th}$ cycle, 6$^{th}$ cycle, 7$^{th}$ cycle, 8$^{th}$ cycle, 9$^{th}$ cycle, or 10$^{th}$ cycle).

As used herein, the term "structural properties" refers to any physical property of an embodiment of the present invention, including, but not limited to, crystal structure or crystallographic properties, thermal properties, melting point, and so forth. In some instances, the term is directed to changes in crystal structure and/or crystallographic properties.

As used herein, the term "composite" refers to a combination of two or more materials differing in form or composition. In some instances, the constituents substantially retain their identities, meaning, they do not dissolve or merge completely into one another although they act in concert. Normally, the components can be identified through experimental means.

As used herein, the term "blend" refers to a mixture of multiple components. In some instances, the components are mixed in such a way that the combination or constituent parts are substantially indistinguishable from one another, and, in other instances, the components substantially retain their identities or remain distinguishable. A "blend" can be used to describe a uniform or nonuniform mixture of two or more components or materials.

As used herein, the term "dopant" refers to an element or a molecule introduced into a material as a relatively minor component thereof on molar basis. A dopant may alter the structural or electrochemical properties of the material. In an embodiment of the present invention, the elements or molecules of the dopant may take the place of elements that were in the crystal lattice of the material or may alter the structural properties of the crystal lattice of the material.

As used herein, the terms "alloy" or "alloying" refer to a homogeneous mixture, intermetallic compound, or solid solution of two or more metals and/or nonmetals. In some instances, atoms of one element can replace or occupy interstitial positions between atoms of another element.

As used herein, the term "calcination" refers to a thermal treatment process applied to materials in order to bring about a chemical, physical, or structural change in the material, but may also refer to thermal decomposition, phase transition, or removal of a volatile fraction in a material. The calcination process normally takes place at temperatures below the melting point of the product materials.

As used herein, the term "Co capacity" refers to an extent (e.g., on a percentage basis) of a (maximum or total) specific capacity arising from oxidation or reduction of cobalt atoms in a material. For example, Co capacity can be measured by determining (maximum) specific capacity (e.g., as measured in a constant current discharge analysis) upon discharge from 4.5 V to 4.3 V relative (e.g., on a percentage basis) to a determined specific capacity upon discharge from 4.95 V to 2.0 V.

As used herein, the terms "anode" and "cathode" refer to the electrodes at which oxidation and reduction occur, respectively, during battery discharge. During charging of the battery, the sites of oxidation and reduction are typically reversed.

Also, as used herein, the words "preferred," "preferably," and "more preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

Cobalt-Rich Phosphate Material

Embodiments of the present invention improve the battery properties of cobalt-based phosphate materials by forming a cobalt-rich phosphate material that incorporates Li, Co, $PO_4$ and additional components. The additional components may be coated on, mixed in, dispersed through the bulk of, or reacted with the base $LiCoPO_4$ material. The combination of additional components and base $LiCoPO_4$ may form a composite, blend, alloy, or the additional components may act as dopants.

Embodiments of the present invention improve the battery properties of electrodes comprising cobalt-based phosphate materials. In one preferred approach, electrode materials are prepared by forming a composite material comprising a first component, which is a cobalt-based phosphate material, and a second component, which is a metal phosphate, metal fluoride, metal oxide, metal hydroxide, metal carbonate, metal nitrate or mixture thereof. The second component can be coated on, or dispersed through the bulk of, or otherwise combined with the first component. The presence of the second component improves the performance of batteries fabricated from the materials, and electrochemical activity can be observed from the second component depending on the particular composition. Also disclosed is a method for preparing the materials as well as electrodes fabricated from the materials and Li-ion cells which include such electrodes.

A cobalt-rich phosphate material is provided which includes at least one phase (e.g., an olivine-type phase) or component having the formula:

$$Li_{1-x-w}Co_{1-y}(N_w)^p(M_y)^q(PO_4)_{1-a} \quad (I)$$

wherein:

a) each M is independently one or more of a Group IIA (or Group 2), Group IIIA (or Group 3), Group IIIB (or Group 13), transition metal, or rare earth element;

b) q is an integer or non-integer that can independently vary from q=1 to q=8;

c) y can independently vary from $0 \le y \le 0.9$;

d) each N is independently one or more of a Group IA (or Group 1), Group IIA (or Group 2), Group IIIA (or Group 3), Group IIIB (or Group 13), transition metal, or rare earth element;

e) p is an integer or non-integer that can independently vary from p=0 to p=2;

f) w can independently vary from $0 \le w \le 0.3$;

g) x can independently vary from $-0.3 \le x \le 0.3$; and h) a can independently vary from $-0.5 \le a \le 0.5$ or $-0.3 \le a \le 0.3$.

In formula (I), M is one or more, as defined by q, Group IIA, IIIA, IIIB, transition metal elements, or rare earth elements. M is preferably Fe, Ti, V, Ta, W, Cr, Cu, Zn, Zr, Y, La, Ag, Al, Nb, Hf, Mo, Mn, Ni, or Mg, and more preferably Fe, Mn, V, Cr, Ni, Ti, Cu, Nb, Zr, Hf, Mo, Ta, W, or Zn, and more preferably Fe, V, Ti, or Nb. Preferably, q, the number of additional, unique M dopants, is 2, 3, or 4. In some embodiments, q is from 1 to 8, and, in some embodiments, q is from 1 to 6, from 1 to 5, from 1 to 4, from 1 to 3, from 1 to 2, from 2 to 7, from 2 to 6, from 2 to 5, from 2 to 4, or from 2 to 3. More preferably, q is 2 or 3, or q is 1 or 2. The doping content or amount of each M in the composition is defined by y, and can independently vary from about $0 \le y \le 0.9$. Preferably, y is about $0.01 \le y \le 0.7$ or about $0.05 \le y \le 0.7$. More preferably, y is about $0.01 \le y \le 0.5$, about $0.05 \le y \le 0.5$, about $0.1 \le y \le 0.5$, $0.01 \le y \le 0.3$, about $0.05 \le y \le 0.3$, about $0.1 \le y \le 0.3$, $0.01 \le y \le 0.2$, about $0.05 \le y \le 0.2$, or about $0.1 \le y \le 0.2$. The number of additional unique N dopants is 0 to 2, as defined by p. Preferably, p is 0 or 1. The doping content or amount of each N in the composition is defined by w, and can independently vary from about $0 \le w \le 0.3$. Preferably, w is about $0 \le w \le 0.2$, about $0 \le w \le 0.1$, about $0.01 \le w \le 0.2$, about $0.05 \le w \le 0.2$, about $0.01 \le w \le 0.1$, about $0.05 \le w \le 0.1$. The value of x can vary from about $-0.3 \le x \le 0.3$, and is preferably about $-0.3 \le x \le 0.1$, and more preferably about $-0.3 \le x \le 0$, about $-0.2 \le x \le 0$, about $-0.1 \le x \le 0$, about $-0.3 \le x \le 0$, about $-0.2 \le x \le 0$, or about $-0.1 \le x \le 0$. In some embodiments, the value of x may also specifically be about 0.3, 0.28, 0.25, 0.23, 0.2, 0.18, 0.15, 0.12, 0.1, 0.8, 0.5, 0.3, 0.2, 0.15, 0.1, 0.08, 0.05, 0.03, 0.02, 0.01, 0, −0.01, −0.02, −0.03, −0.05, −0.08, −0.1, −0.12, −0.15, −0.18, −0.2, −0.22, −0.25, −0.28, or −0.3. The value of a can vary from about $-0.3 \le a \le 0.3$, and is preferably about $-0.3 \le a \le 0.1$, about $-0.2 \le a \le 0.1$, about $-0.1 \le a \le 0.1$, about $-0.2 \le a \le 0$, or about $0 \le a \le 0.1$, and, in some embodiments, a is about 0. More generally, a can take on any value to satisfy valence and charge balance requirements with respect to positively charged elements in formula (I). In some embodiments, formula (I) contains the condition that $0.2 \le 1-y \le 1.0$ or $0.2 \le 1-y \le 0.98$. In some embodiments, 1-y is preferably about $0.3 \le 1-y \le 0.9$ or about $0.3 \le 1-y \le 0.98$, and more preferably about $0.35 \le 1-y \le 0.75$, about $0.35 \le 1-y \le 0.98$, about $0.5 \le 1-y \le 0.98$, or about $0.7 \le 1-y \le 0.98$. In some embodiments, y is such that an overall composition of the cobalt-rich phosphate material has a molar ratio of Co, relative to a combined molar amount of Co and the additional M's, that is at least about 0.2, at least about 0.3, at least about 0.4, at least about 0.5, at least about 0.6, at least about 0.7, at least about 0.75, and up to about 0.98 or more. In some embodiments, the cobalt-rich phosphate material also includes a secondary phase including at least one M, and y is such that an overall composition of the cobalt-rich phosphate material has a molar ratio of Co, relative to a combined molar amount of Co and the additional M's within the olivine phase and the secondary phase, that is at least about 0.2, at least about 0.3, at least about 0.4, at least about 0.5, at least about 0.6, at least about 0.7, at least about 0.75, and up to about 0.98 or more.

Cobalt-rich phosphate materials of formula (I) show improved battery properties when used as positive electrode active materials. In some embodiments, the improved battery properties are discharge capacity, specific capacity, specific energy, rate capability, cycling capability, cycling voltage, and improved discharge rate characteristics. Without limitation, for example, and with reference to FIG. 3, cobalt-rich phosphate materials having compositions comprising Li, Fe, Co, an additional metal, "M", and $PO_4$, where M is a transition metal selected from Nb, Ti, and V, demonstrate relatively high specific capacity and strong capacity retention over 5 cycles, (FIG. 3(a)), and equivalent or improved rate capability (FIG. 3(b)) relative to a control composition comprising Li, Fe, Co, and $PO_4$ (See also Example 4).

In some embodiments of the present invention, when charged, discharged, or cycled at a rate of 0.05 C (or another rate higher or lower than 0.05 C, such as 1 C) between 2.0 V and 4.95 V versus $Li/Li^+$, specific capacity is about 90 mAh/g or greater, or preferably about 100 mAh/g or greater. Preferably, specific capacity is about 130 mAh/g or greater at 0.05 C (or another rate higher or lower than 0.05 C, such as 1 C), or about 140 mAh/g or greater at 0.05 C (or another rate higher or lower than 0.05 C, such as 1 C). More preferably, specific capacity is about 150 mAh/g or greater at 0.05 C (or another rate higher or lower than 0.05 C, such as 1 C). The stated values or ranges of specific capacity can be based on a weight of an active material alone, but also can be based on, or adjusted to account for, a combined weight of the active material and another one or more components, such as a set of conductive additives as further explained below.

In some embodiments of the present invention, when charged, discharged, or cycled at a rate of 0.05 C (or another rate higher or lower than 0.05 C, such as 1 C) between 4.5 V and 4.95 V versus $Li/Li^+$, specific capacity is about 50 mAh/g or greater, or preferably about 60 mAh/g or greater. Preferably, specific capacity is about 90 mAh/g or greater at 0.05 C (or another rate higher or lower than 0.05 C, such as 1 C), or about 100 mAh/g or greater at 0.05 C (or another rate higher or lower than 0.05 C, such as 1 C). More preferably, specific capacity is about 110 mAh/g or greater, about 120 mAh/g or greater, or about 130 mAh/g or greater at 0.05 C (or another rate higher or lower than 0.05 C, such as 1 C). The stated values or ranges of specific capacity can be based on a weight of an active material alone, but also can be based on, or adjusted to account for, a combined weight of the active material and another one or more components, such as a set of conductive additives as further explained below.

In some embodiments of the present invention, when charged, discharged, or cycled at a rate of 0.05 C (or another rate higher or lower than 0.05 C, such as 1 C) between 2.0 V and 4.95 V versus $Li/Li^+$, specific capacity at a voltage of 4.5 V is at least 10% of specific capacity at a voltage of 2.0 V. Preferably, specific capacity at a voltage of 4.5 V is at least 20%, at least 30%, at least 40%, at least 50%, at least 60%, at least 70%, or at least 80% of specific capacity at a voltage of 2.0 V.

In some embodiments of the present invention, when charged, discharged, or cycled at a rate of 0.05 C (or another rate higher or lower than 0.05 C, such as 1 C) between 2.0 V and 4.95 V versus $Li/Li^+$, specific energy is about 400 Wh/kg or greater. Preferably, specific energy is about 500 Wh/kg or greater at 0.05 C (or another rate higher or lower than 0.05 C, such as 1 C), or about 550 Wh/kg or greater at 0.05 C (or another rate higher or lower than 0.05 C, such as 1 C). More preferably, specific energy is about 600 Wh/kg or greater at 0.05 C (or another rate higher or lower than 0.05 C, such as 1 C), or about 650 Wh/kg or greater at 0.05 C (or another rate higher or lower than 0.05 C, such as 1 C). The stated values or ranges of specific energy can be based on a weight of an active material alone, but also can be based on, or adjusted to account for, a combined weight of the active material and another one or more components, such as a set of conductive additives as further explained below.

In some embodiments of the present invention, rate capability at 1 C is about 100 mAh/g or greater. Preferably, rate capability at 1 C is about 130 mAh/g or greater, or about 140 mAh/g or greater. More preferably, rate capability at 1 C is about 150 mAh/g or greater. In some embodiments, rate capability is such that, at 1 C, at 5 C, or even at 10 C, at least about 60%, at least about 70%, at least about 80%, at least about 85%, or at least about 90%, and up to about 95%, up to about 98%, or more of a low-rate discharge capacity (e.g., at C/20) is retained. The stated values or ranges of rate capability can be based on a weight of an active material alone, but also can be based on, or adjusted to account for, a combined weight of the active material and another one or more components, such as a set of conductive additives as further explained below.

In some embodiments, cycling capability or capacity retention is such that, after 100 cycles, after 200 cycles, after 300 cycles, after 400 cycles, after 500 cycles, after 600 cycles, after 1,000 cycles, or even after 5,000 cycles, at least about 50%, at least about 60%, at least about 70%, at least about 75%, or at least about 80%, and up to about 85%, up to about 90%, or more of an initial or maximum discharge capacity is retained.

In some embodiments, when charged, discharged, or cycled at a rate of 0.05 C (or another rate higher or lower than 0.05 C, such as 1 C) between 2.0 V and 4.95 V versus $Li/Li^+$, the cobalt-rich phosphate material has at least 10% of its (maximum) specific capacity at a voltage of at least 4.5 V, at least 30% of its (maximum) specific capacity at the voltage of at least 4.5 V, at least 50% of its (maximum) specific capacity at the voltage of at least 4.5 V, at least 10% of its (maximum) specific capacity at the voltage of at least 4.6 V, at least 30% of its (maximum) specific capacity at the voltage of at least 4.6 V, at least 50% of its (maximum) specific capacity at the voltage of at least 4.6 V, at least 10% of its (maximum) specific capacity at the voltage of at least 4.7 V, at least 30% of its (maximum) specific capacity at the voltage of at least 4.7 V, at least 10% of its (maximum) specific capacity at the voltage of at least 4.8 V, or at least 30% of its (maximum) specific capacity at the voltage of at least 4.8 V.

Figures 2, 2A, 2B:
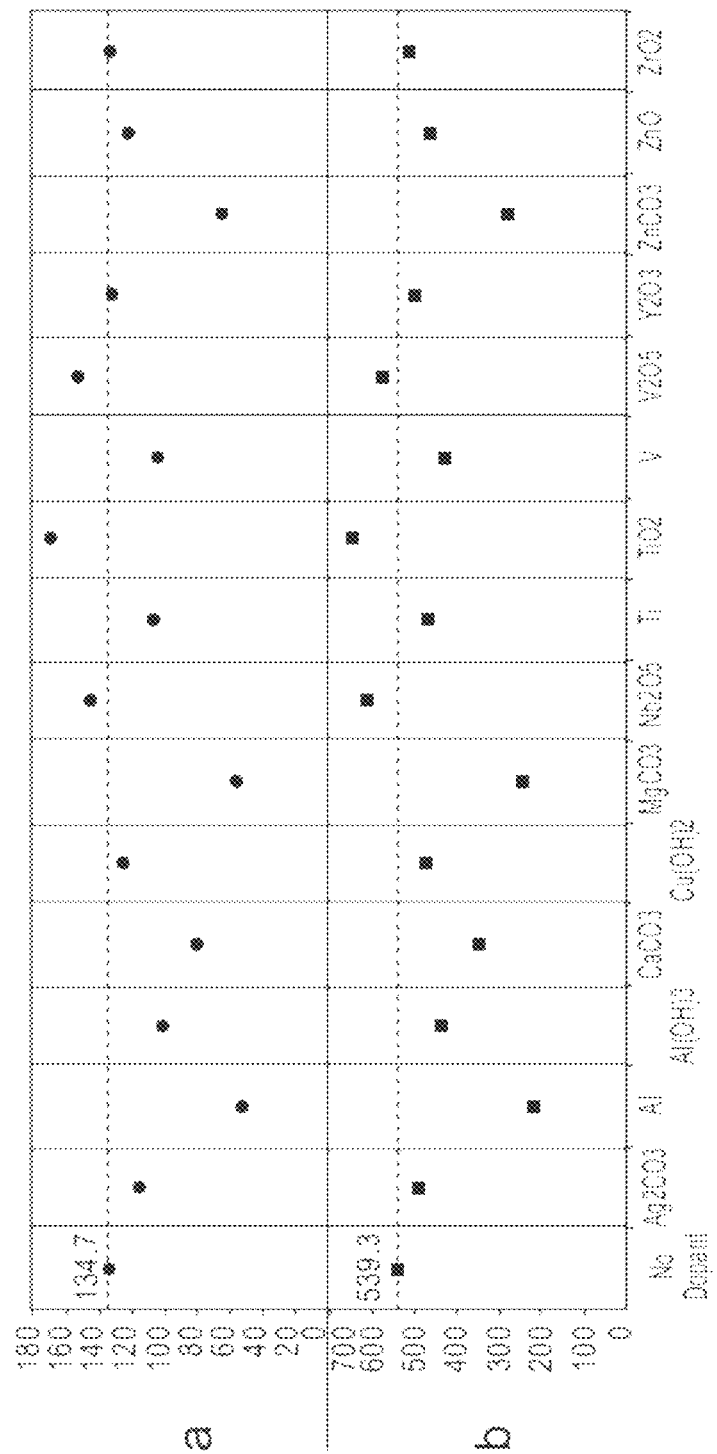
FIG. 2 illustrates (maximum) specific capacity (FIG. 2a) and (maximum) specific energy (FIG. 2b) as a function of composition for various electrode materials comprising Li, Fe, Co, an additional metal, "M", and $PO_4$, where M is a metal selected from Ag, Al, Ca, Cu, Mg, Nb, Ti, V, Y, Zn, and Zr as prepared from a precursor (or metal source) as indicated on the x-axis. As a control, a composition comprising Li, Fe, Co, and $PO_4$ (indicated as "no dopant") was also evaluated. (See Example 3).

Embodiments of the present invention, can be seen in FIG. 2, which illustrates (maximum) specific capacity (FIG. 2(a)) and (maximum) specific energy (FIG. 2(b)) as a function of composition for electrode materials comprising Li, Fe, Co, an additional metal, "M", and $PO_4$, where M is a metal selected from Ag, Al, Ca, Cu, Mg, Nb, Ti, V, Y, Zn and Zr as prepared from a precursor (or metal source) as indicated on the x-axis. (See Example 3). In the embodiments shown, electrode active compositions comprising Nb, V, and Ti prepared from the indicated oxides showed significant improvements in both (maximum) specific capacity and (maximum) specific energy as compared to undoped $LiFe_xCo_yPO_4$.

In one embodiment, one M is Fe, and another M is Ti. In this embodiment, the molar ratio of Fe, relative to a combined molar amount of Co, Fe, and Ti, can vary from about 0.01-0.5, and the molar ratio of Ti, relative to the combined molar amount of Co, Fe, and Ti, can vary from about 0.05-0.3. The molar ratio of Co, relative to the combined molar amount of Co, Fe, and Ti, varies between about 0.2 and 0.98 as a function of Fe and Ti, with the total of Fe, Ti, and Co equal to 1.0. (FIG. 5)

Titanium doping (or the molar ratio of titanium) in some embodiments of the present invention can vary from about 0.01 to 0.3. Preferably, Ti doping is about 0.05 to 0.25. More preferably, Ti doping is about 0.05 to 0.20. In some embodiments, Ti doping can be about 0.01-0.3, 0.02-0.3, 0.05-0.3, 0.1-0.3, 0.15-0.3, 0.2-0.3, 0.25-0.3, 0.05-0.25, 0.05-0.20, 0.05-0.15, 0.05-0.1, 0.01-0.15, 0.01-0.1, 0.01-0.08, or 0.01-0.05. In some embodiments, Ti doping can be about 0.01, 0.02, 0.03, 0.05, 0.08, 0.10, 0.12, 0.15, 0.18, 0.20, 0.25, or 0.30. (FIG. 6)

Battery properties for Ti doped embodiments of the present invention are at least or greater than about 500 Wh/kg, and/or 120 mAh/g and/or 140 mAh/g at 0.05 C (or another rate higher or lower than 0.05 C, such as 1 C), when charged, discharged, or cycled between 2.0 V and 4.95 V versus Li/Li+. In some embodiments, battery properties can vary from about 500 to 800 Wh/kg, 120-160 mAh/g, or 140-170 mAh/g at 0.05 C (or another rate higher or lower than 0.05 C, such as 1 C). Preferably, battery properties for Ti doped materials can be about 550-750 Wh/kg, 140-160 mAh/g, or 150-170 mAh/g at 0.05 C (or another rate higher or lower than 0.05 C, such as 1 C). In some embodiments, specific energy is at least or greater than about 500 Wh/kg. In some embodiments, specific energy is at least or greater than about 550 Wh/kg. In some embodiments, specific energy is at least or greater than about 600 Wh/kg. In some embodiments, specific energy is at least or greater than about 650 Wh/kg. In some embodiments, specific energy is at least or greater than about 675 Wh/kg. In some embodiments, specific energy is at least or greater than about 700 Wh/kg. In some embodiments, specific energy is at least or greater than about 725 Wh/kg. In some embodiments, specific capacity is at least or greater than about 120 mAh/g. In some embodiments, specific capacity is at least or greater than about 130 mAh/g. In some embodiments, specific capacity is at least or greater than about 140 mAh/g. In some embodiments, specific capacity is at least or greater than about 150 mAh/g. In some embodiments, specific capacity is at least or greater than about 160 mAh/g. In some embodiments, specific capacity is about 170 mAh/g or greater than about 170 mAh/g. In some embodiments, rate capability is at least or greater than about 120 mAh/g at 1 C. In some embodiments, rate capability is at least or greater than about 130 mAh/g at 1 C. In some embodiments, rate capability is at least or greater than about 140 mAh/g at 1 C. In some embodiments, rate capability is at least or greater than about 150 mAh/g at 1 C. In some embodiments, rate capability is at least or greater than about 160 mAh/g at 1 C. In some embodiments, rate capability is about, or greater than about, 170 mAh/g at 1 C. In some embodiments, battery properties for Ti doped materials can be about 500, 525, 550, 575, 600, 625, 650, 675, or 700 Wh/kg, about 120, 125, 130, 135, 140, 145, 150, 155, 160, 165, or 167 mAh/g at 1 C (or another rate higher or lower than 1 C, such as 0.05 C). (FIG. 6) The stated values or ranges of battery properties can be based on a weight of an active material alone, but also can be based on, or adjusted to account for, a combined weight of the active material and another one or more components, such as a set of conductive additives as further explained below.

Figure 9:
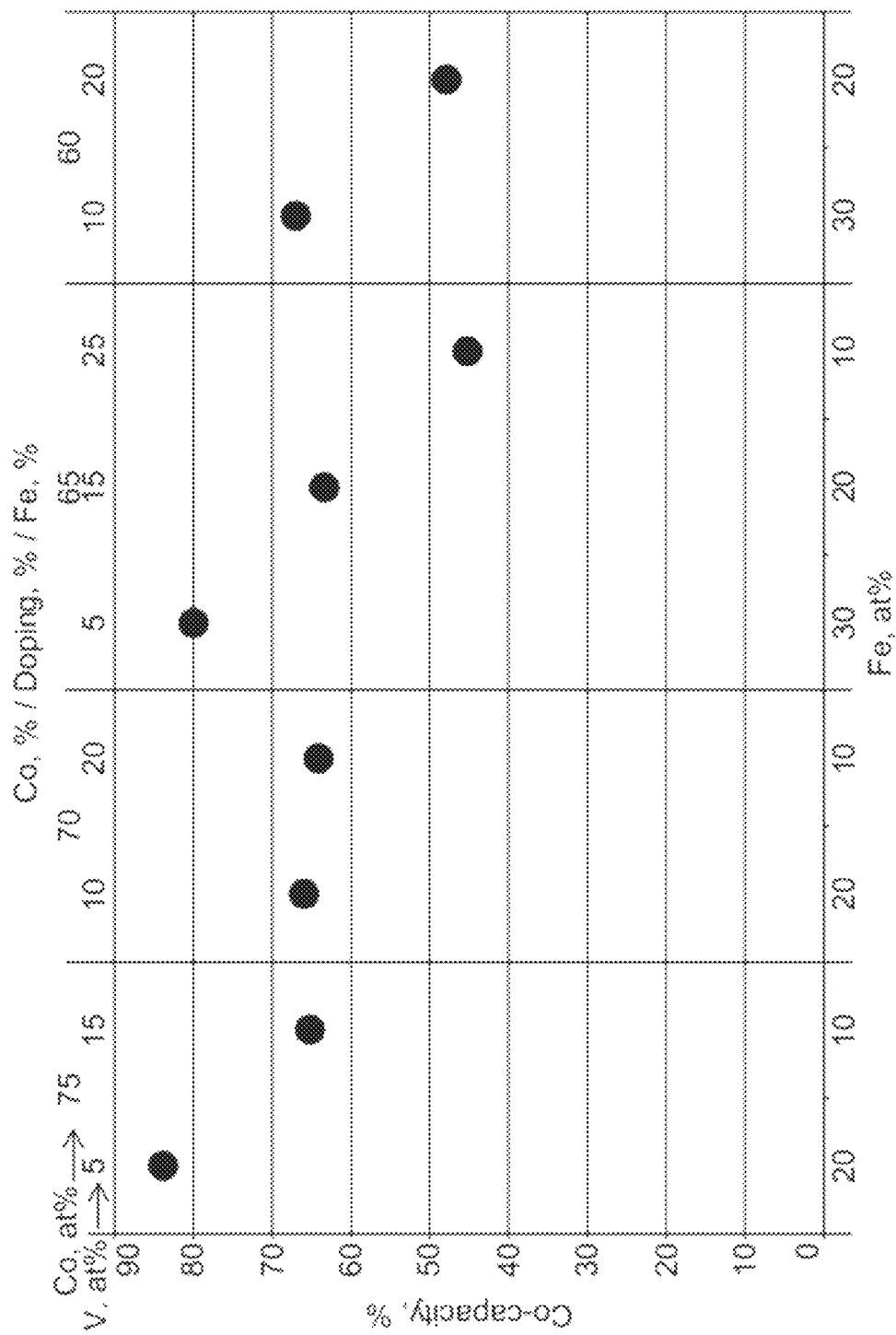
FIG. 9 illustrates Co-capacity for cobalt-rich phosphate materials having compositions comprising Li, Fe, Co, V, and $PO_4$ with varying molar ratios, as indicated, of iron, cobalt, and vanadium. (See Example 10).
Figure 10:
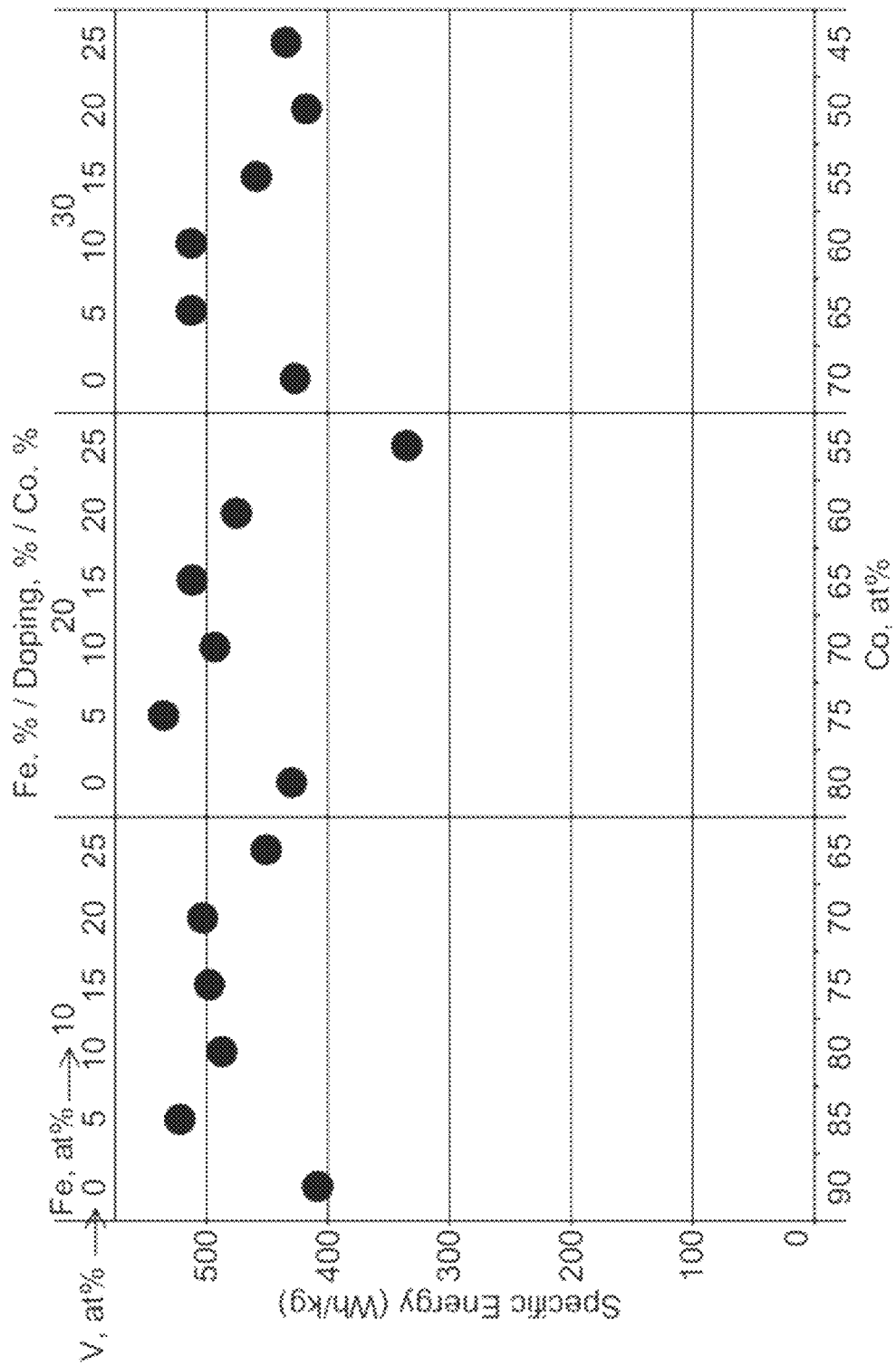
FIG. 10 illustrates (maximum) specific energy for materials having compositions comprising Li, Fe, Co, V, and $PO_4$ with varying molar ratios, as indicated, of iron, cobalt, and vanadium (data indicated as circles). Corresponding compositions comprising Li, Fe, Co, and $PO_4$ (data indicated as triangles) were evaluated as controls. (See Example 10).

In one embodiment, one M is Fe, and another M is V. In this embodiment, the molar ratio of Fe, relative to a combined molar amount of Co, Fe, and V, can vary from about 0.01-0.5, and the molar ratio of V, relative to the combined molar amount of Co, Fe, and V, can vary from about 0.01-0.3. The molar ratio of Co, relative to the combined molar amount of Co, Fe, and V, varies between about 0.2 and 0.98 as a function of Fe and V, with the total of Fe, V, and Co equal to 1.0. Preferably, when Fe is about 0.10±0.05, V is about 0.05±0.05; when Fe is about 0.20±0.05, V is about 0.05±0.05; and when Fe is about 0.30±0.05, V is about 0.05±0.05 or 0.10±0.05. (FIGS. 8-10)

Vanadium doping (or the molar ratio of vanadium) in some embodiments of the present invention can vary from about 0.01 to 0.3. Preferably, V doping is about 0.03 to 0.25. More preferably, V doping is about 0.05 to 0.20. In some embodiments, V doping can be about 0.01-0.3, 0.02-0.3, 0.05-0.3, 0.1-0.3, 0.15-0.3, 0.2-0.3, 0.25-0.3, 0.05-0.25, 0.05-0.20, 0.05-0.15, 0.05-0.1, 0.01-0.15, 0.01-0.1, 0.01-0.08, or 0.01-0.05. In some embodiments, V doping can be about 0.01, 0.02, 0.03, 0.05, 0.08, 0.10, 0.12, 0.15, 0.18, 0.20, 0.25. (FIG. 11)

Battery properties for V doped embodiments of the present invention are at least or greater than about 400 Wh/kg and/or 100 mAh/g at 0.05 C (or another rate higher or lower than 0.05 C, such as 1 C). In some embodiments, battery properties can vary from about 400 to 700 Wh/kg, or 100-150 mAh/g at 0.05 C (or another rate higher or lower than 0.05 C, such as 1 C). In some embodiments, specific energy is at least or greater than about 400 Wh/kg. In some embodiments, specific energy is at least or greater than about 450 Wh/kg. In some embodiments, specific energy is at least or greater than about 500 Wh/kg. In some embodiments, specific energy is at least or greater than about 550 Wh/kg. In some embodiments, specific energy is at least or greater than about 575 Wh/kg. In some embodiments, specific energy is at least or greater than about 600 Wh/kg. In some embodiments, specific energy is at least or greater than about 625 Wh/kg. In some embodiments, specific capacity is at least or greater than about 100 mAh/g. In some embodiments, specific capacity is at least or greater than about 110 mAh/g. In some embodiments, specific capacity is at least or greater than about 120 mAh/g. In some embodiments, specific capacity is at least or greater than about 130 mAh/g. In some embodiments, specific capacity is at least or greater than about 140 mAh/g. In some embodiments, specific capacity is at least or greater than about 150 mAh/g. In some embodiments, battery properties for V doped materials can be about 400, 425, 450, 475, 500, 525, 550, 575, 600, 625, 650, 675, or 700 Wh/kg, or about 100, 105, 110, 115, 120, 125, 130, 135, 140, 145, 150, 155, 160, 165, or 167 mAh/g at 1 C (or another rate higher or lower than 1 C, such as 0.05 C). (FIG. 11) The stated values or ranges of battery properties can be based on a weight of an active material alone, but also can be based on, or adjusted to account for, a combined weight of the active material and another one or more components, such as a set of conductive additives as further explained below.

Figure 15:
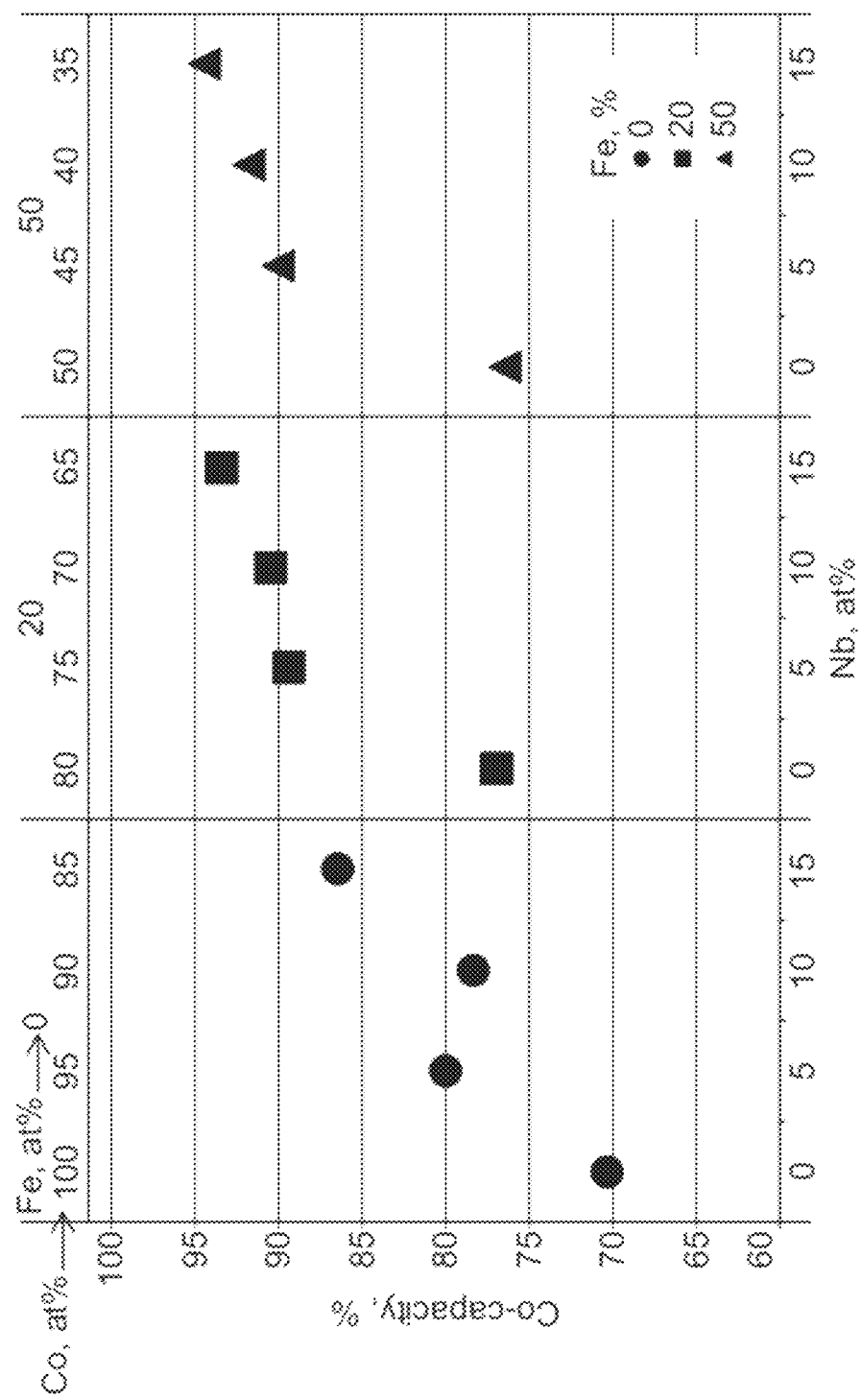
FIG. 15 illustrates Co-capacity for cobalt-rich phosphate materials having compositions comprising Li, Fe, Co, Nb, and $PO_4$ with varying molar ratios, as indicated, of iron, cobalt, and niobium. (See Example 15).

In one embodiment, one M is Fe, and another M is Nb. In this embodiment, the molar ratio of Fe, relative to a combined molar amount of Co, Fe, and Nb, can vary from about 0.01-0.5, and the molar ratio of Nb, relative to the combined molar amount of Co, Fe, and Nb, can vary from about 0.01-0.3. The molar ratio of Co, relative to the combined molar amount of Co, Fe, and Nb, varies between about 0.2 and 0.98 as a function of Fe and Nb, with the total of Fe, Nb, and Co equal to 1.0. (FIGS. 14-15)

Niobium doping (or the molar ratio of Niobium) in some embodiments of the present invention can vary from about 0.01 to 0.30. Preferably, Nb doping is about 0.01 to 0.20. More preferably, Nb doping is about 0.01 to 0.15. In some embodiments, Nb doping can be about 0.01-0.3, 0.02-0.3, 0.05-0.3, 0.1-0.3, 0.15-0.3, 0.2-0.3, 0.25-0.3, 0.01-0.25, 0.01-0.20, 0.01-0.15, 0.01-0.1, 0.01-0.08, 0.01-0.05, 0.02-0.15, 0.05-0.15, 0.02-0.10, 0.03-0.08, or 0.03-0.12. In some embodiments, Nb doping can be about 0.01, 0.02, 0.03, 0.05, 0.08, 0.10, 0.12, 0.15, 0.18, 0.20, 0.25 or 0.30. (FIG. 16)

Battery properties for Nb doped embodiments of the present invention are at least or greater than about 400 Wh/kg and/or 100 mAh/g at 0.05 C (or another rate higher or lower than 0.05 C, such as 1 C). In some embodiments, battery properties for Nb doped materials can vary from about 400 to 700 Wh/kg, or 120-170 mAh/g at 0.05 C (or another rate higher or lower than 0.05 C, such as 1 C). In some embodiments, specific energy is at least or greater than about 400 Wh/kg. In some embodiments, specific energy is at least or greater than about 450 Wh/kg. In some embodiments, specific energy is at least or greater than about 500 Wh/kg. In some embodiments, specific energy is at least or greater than about 550 Wh/kg. In some embodiments, specific energy is at least or greater than about 575 Wh/kg. In some embodiments, specific energy is at least or greater than about 600 Wh/kg. In some embodiments, specific energy is at least or greater than about 625 Wh/kg. In some embodiments, specific capacity is at least or greater than about 100 mAh/g. In some embodiments, specific capacity is at least or greater than about 110 mAh/g. In some embodiments, specific capacity is at least or greater than about 120 mAh/g. In some embodiments, specific capacity is at least or greater than about 130 mAh/g. In some embodiments, specific capacity is at least or greater than about 140 mAh/g. In some embodiments, specific capacity is at least or greater than about 150 mAh/g. In some embodiments, battery properties for Nb doped materials can be about 400, 425, 450, 475, 500, 525, 550, 575, 600, 625, 650, 675, or 700 Wh/kg, or about 120, 125, 130, 135, 140, 145, 150, 155, 160, 165, or 167 mAh/g at 1 C (or another rate higher or lower than 1 C, such as 0.05 C). (FIG. 16) The stated values or ranges of battery properties can be based on a weight of an active material alone, but also can be based on, or adjusted to account for, a combined weight of the active material and another one or more components, such as a set of conductive additives as further explained below.

Figure 17:
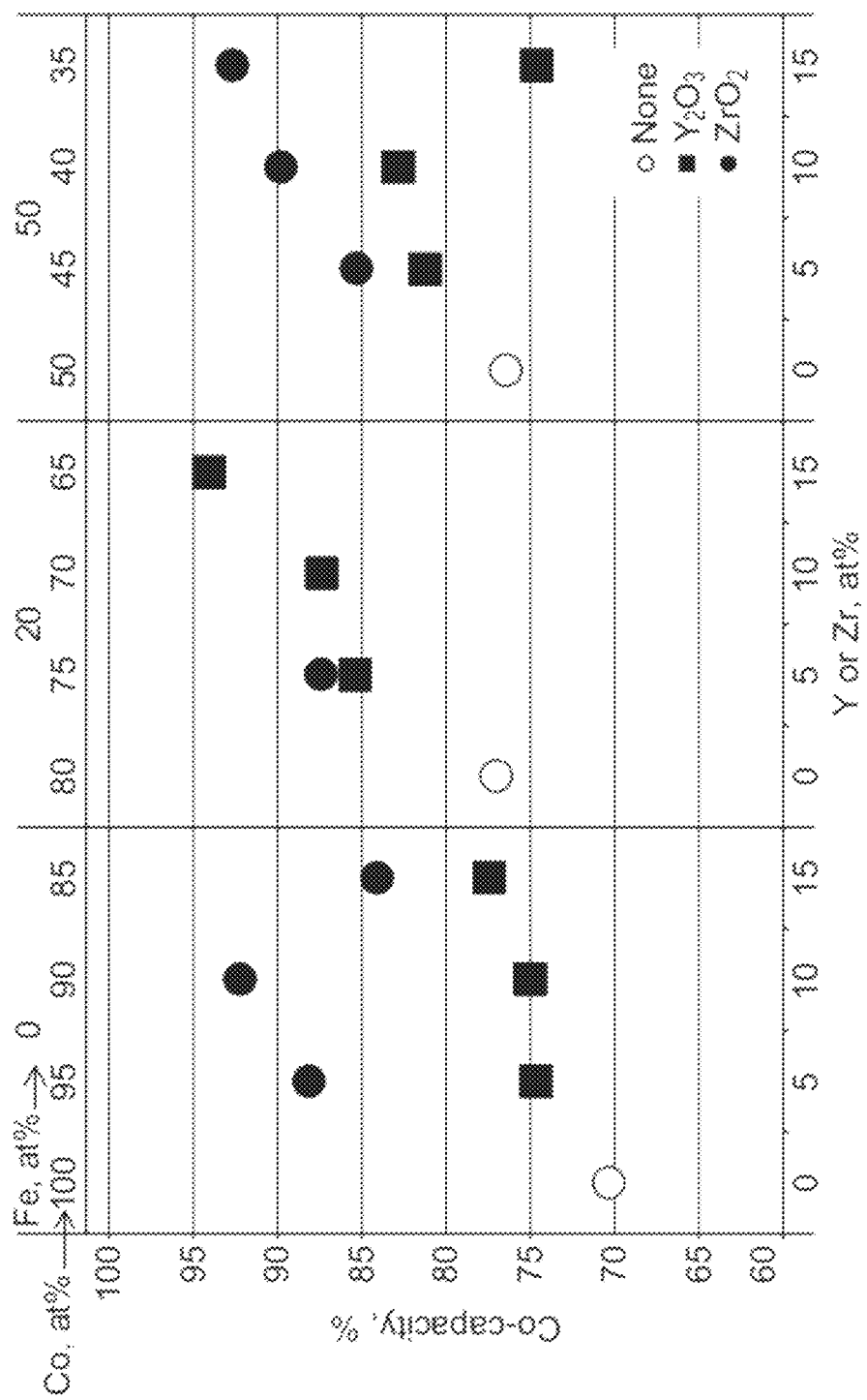
FIG. 17 illustrates Co-capacity for cobalt-rich phosphate materials having compositions comprising Li, Fe, Co, Y, and $PO_4$ (data indicated as irregular rectangles) or compositions comprising Li, Fe, Co, Zr, and $PO_4$ (data indicated as diamonds), in each case with varying molar ratios, as indicated, of iron, cobalt and either yttrium or zirconium. Compositions comprising Li, Fe, Co, and $PO_4$ (data indicated as circles) were evaluated as controls. (See Example 17).

In one embodiment, one M is Fe, and another M is Y. In this embodiment, the molar ratio of Fe, relative to a combined molar amount of Co, Fe, and Y, can vary from about 0.01-0.5, and the molar ratio of Y, relative to the combined molar amount of Co, Fe, and Y, can vary from about 0.02-0.2. The molar ratio of Co, relative to the combined molar amount of Co, Fe, and Y, varies between 0.3 and 0.97 as a function of Fe and Y, with the total of Fe, Y, and Co equal to 1.0. (FIG. 17)

In one embodiment, one M is Fe, and another M is Zr. In this embodiment, the molar ratio of Fe, relative to a combined molar amount of Co, Fe, and Zr, can vary from about 0.01-0.5, and the molar ratio of Zr, relative to the combined molar amount of Co, Fe, and Zr, can vary from about 0.02-0.2. The molar ratio of Co, relative to the combined molar amount of Co, Fe, and Zr, varies between 0.3 and 0.97 as a function of Fe and Zr, with the total of Fe, Zr, and Co equal to 1.0. (FIG. 17)

In one embodiment, one M is Fe, and another M is Ce. In this embodiment, the molar ratio of Fe can vary from about 0.01-0.5, and the molar ratio of Ce can vary from about 0.02-0.2. The molar ratio of Co varies between 0.3 and 0.97 as a function of Fe and Ce, with the total of Fe, Ce, and Co equal to 1.0.

In one embodiment, one M is Fe, and another M is Hf. In this embodiment, the molar ratio of Fe can vary from about 0.01-0.5, and the molar ratio of Hf can vary from about 0.02-0.2. The molar ratio of Co varies between 0.3 and 0.97 as a function of Fe and Hf, with the total of Fe, Hf, and Co equal to 1.0.

In one embodiment, one M is Fe, and another M is Mo. In this embodiment, the molar ratio of Fe can vary from about 0.01-0.5, and the molar ratio of Mo can vary from about 0.02-0.2. The molar ratio of Co varies between 0.3 and 0.97 as a function of Fe and Mo, with the total of Fe, Mo, and Co equal to 1.0.

In one embodiment, one M is Fe, and another M is Ta. In this embodiment, the molar ratio of Fe can vary from about 0.01-0.5, and the molar ratio of Ta can vary from about 0.02-0.2. The molar ratio of Co varies between 0.3 and 0.97 as a function of Fe and Ta, with the total of Fe, Ta, and Co equal to 1.0.

In one embodiment, one M is Fe, and another M is W. In this embodiment, the molar ratio of Fe can vary from about 0.01-0.5, and the molar ratio of W can vary from about 0.02-0.2. The molar ratio of Co varies between 0.3 and 0.97 as a function of Fe and W, with the total of Fe, W, and Co equal to 1.0.

Figure 27:
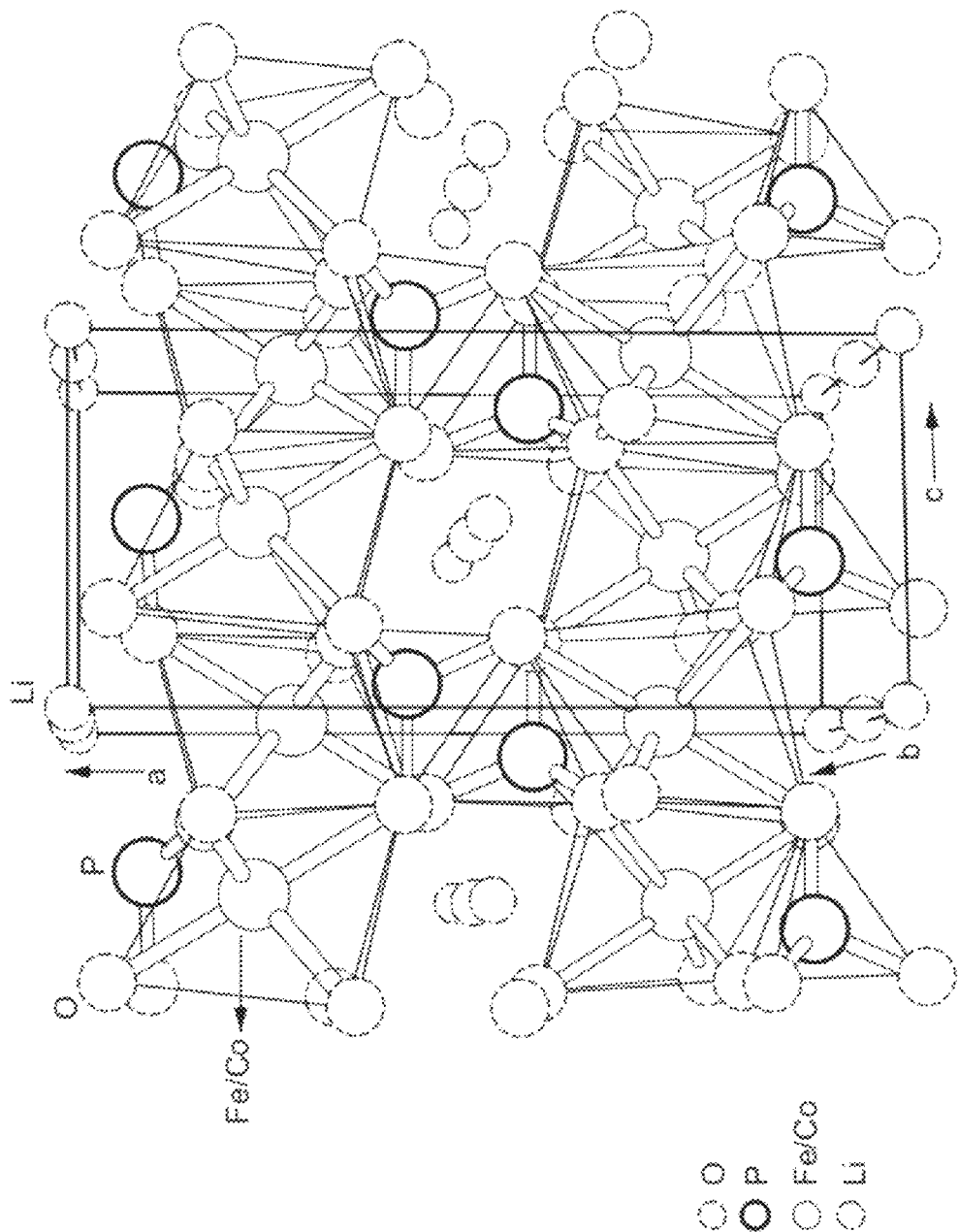
FIG. 27 is a schematic representation which illustrates an olivine phase according to an embodiment of the invention.

FIG. 27 is a schematic representation which illustrates an olivine phase according to an embodiment of the invention. Specifically, the illustrated $Li(Fe,Co)PO_4$ orthorhombic-type crystal structure has one-dimensional Li ion diffusion channels along the b axis. The crystal structure includes Fe/Co octahedra sites, P tetrahedra sites, Li sites, and O sites. Doping elements, in general, can occupy any of these sites, such as Fe/Co sites, Li sites, or P sites.

Materials of formula (I) are useful as positive electrode active materials in nonaqueous electrolyte secondary batteries. In another aspect, an embodiment of the present invention provides a battery which comprises an electrolyte; a negative electrode having an insertion active material; and a positive electrode comprising a compound of formula (I), characterized by an ability to release lithium ions for insertion into the negative electrode active material.

In one aspect of the present invention, a cobalt-rich phosphate material is provided which includes at least one olivine-type phase or component having the formula:

$$Li_{1-x}Co_{1-y-z}M_yM'_z(PO_4)_{1-a} \quad (II)$$

or

$$Li_{1-x}Co_{1-y}M_y(PO_4)_{1-a} \quad (III)$$

wherein:

a) each M/M' is independently one or more of Fe, Mn, V, Cr, Ni, Ti, Cu, Ce, Hf, Mo, Ta, W, Nb, Zr, and Zn;

b) $-0.3 \leq x \leq 0.3$;

c) $0.01 \leq y \leq 0.5$ or $0.05 \leq y \leq 0.5$;

d) $0.01 \leq z \leq 0.5$ or $0.05 \leq z \leq 0.5$;

e) $-0.5 \leq a \leq 0.5$ or $-0.3 \leq a \leq 0.3$;

f) with the condition that $0.15 \leq 1-y-z$, $0.18 \leq 1-y-z$, or $0.2 \leq 1-y-z$ (or $0.15 \leq 1-y$, $0.18 \leq 1-y$, or $0.2 \leq 3-y$).

In formulas (II) and (III), M and M' are preferably different from Co and different from one another. In some embodiments, at least one of M and M' is a metal having an oxidation state in the range of +2 to +5 in a discharged state of the cobalt-rich phosphate material, such as +2, +3, +4, or +5. For example, M is Fe having an oxidation state of +2, and M' is Ti or another metal having an oxidation state of +4. In some embodiments, M is Fe, and M' is Ti, V, Nb, Zr, Hf, Mo, Ta, or W. For example, M is Fe, and M' is Ti, V, or Nb. Preferably, y is about $0.01 \leq y \leq 0.5$, about $0.05 \leq y \leq 0.5$, about $0.1 \leq y \leq 0.5$, $0.01 \leq y \leq 0.3$, about $0.05 \leq y \leq 0.3$, about $0.1 \leq y \leq 0.3$, $0.01 \leq y \leq 0.2$, about $0.05 \leq y \leq 0.2$, or about $0.1 \leq y \leq 0.2$. Preferably, z is about $0.01 \leq z \leq 0.5$, about $0.05 \leq z \leq 0.5$, about $0.1 \leq z \leq 0.5$, $0.01 \leq z \leq 0.3$, about $0.05 \leq z \leq 0.3$, about $0.1 \leq z \leq 0.3$, $0.01 \leq z \leq 0.2$, about $0.05 \leq z \leq 0.2$, or about $0.1 \leq z \leq 0.2$. The value of x can vary from about $-0.3 \leq x \leq 0.3$, and is preferably about $-0.3 \leq x \leq 0.1$, and more preferably about $-0.3 \leq x \leq 0$, about $-0.2 \leq x \leq 0$, about $-0.1 \leq x \leq 0$, about $-0.3 \leq x \leq 0$, about $-0.2 \leq x \leq 0$, or about $-0.1 \leq x \leq 0$. In some embodiments, the value of x may also specifically be about 0.3, 0.28, 0.25, 0.23, 0.2, 0.18, 0.15, 0.12, 0.1, 0.8, 0.5, 0.3, 0.2, 0.15, 0.1, 0.08, 0.05, 0.03, 0.02, 0.01, 0, −0.01, −0.02, −0.03, −0.05, −0.08, −0.1, −0.12, −0.15, −0.18, −0.2, −0.22, −0.25, −0.28, or −0.3. The value of a can vary from about $-0.3 \leq a \leq 0.3$, and is preferably about $-0.3 \leq a \leq 0.1$, about $-0.2 \leq a \leq 0.1$, $-0.1 \leq a \leq 0.1$, about $-0.2 \leq a \leq 0$, or about $0 \leq a \leq 0.1$, and, in some embodiments, a is about 0. More generally, a can take on any value to satisfy valence and charge balance requirements with respect to positively charged elements in formulas (II) and (III). In some embodiments, formulas (II) and (III) contain the condition that $0.2 \leq 1-y-z \leq 1.0$ (or $0.2 \leq 1-y \leq 1.0$) or $0.2 \leq 1-y-z \leq 0.98$ (or $0.2 \leq 1-y \leq 0.98$). In some embodiments, 1-y-z is preferably about $0.3 \leq 1-y-z \leq 0.9$ or about $0.3 \leq 1-y-z \leq 0.98$, and more preferably about $0.35 \leq 1-y-z \leq 0.75$, about $0.35 \leq 1-y-z \leq 0.98$, about $0.5 \leq 1-y-z \leq 0.98$, or about $0.7 \leq 1-y-z \leq 0.98$, and 1-y is preferably about $0.3 \leq 1-y \leq 0.9$ or about $0.3 \leq 1-y \leq 0.98$, and more preferably about $0.35 \leq 1-y \leq 0.75$, about $0.35 \leq 1-y \leq 0.98$, about $0.5 \leq 1-y \leq 0.98$, or about $0.7 \leq 1-y \leq 0.98$. In some embodiments for formula (II), y and z are such that an overall composition of the cobalt-rich phosphate material has a molar ratio of Co, relative to a combined molar amount of Co, M, and M', that is at least about 0.2, at least about 0.3, at least about 0.4, at least about 0.5, at least about 0.6, at least about 0.7, at least about 0.75, and up to about 0.98 or more. In some embodiments for formula (II), the cobalt-rich phosphate material also includes a secondary phase including M', and y and z are such that an overall composition of the cobalt-rich phosphate material has a molar ratio of Co, relative to a combined molar amount of Co, M, and M' within the olivine phase and the secondary phase, that is at least about 0.2, at least about 0.3, at least about 0.4, at least about 0.5, at least about 0.6, at least about 0.7, at least about 0.75, and up to about 0.98 or more. In some embodiments for formula (III), the cobalt-rich phosphate material also includes a secondary phase including M', and y is such that an overall composition of the cobalt-rich phosphate material has a molar ratio of Co, relative to a combined molar amount of Co, M, and M' within the olivine phase and the secondary phase, that is at least about 0.2, at least about 0.3, at least about 0.4, at least about 0.5, at least about 0.6, at least about 0.7, at least about 0.75, and up to about 0.98 or more.

Cobalt-rich phosphate materials of formulas (II) and (III) show improved battery properties when used as positive electrode active materials. In some embodiments, the improved battery properties are similar to those set forth above for formula (I), and those battery properties are also applicable for formulas (II) and (III).

Formulas (I), (II) and (III) describe embodiments of the cobalt-rich phosphate material wherein the material is in its "discharged" state (e.g., substantially fully lithiated state). As the battery is charged from its discharged state into a charged state, an amount lithium is removed from the active material as described in Formulas (I), (II), or (III). The resulting structure, containing less lithium than in the as-prepared state as well as one or more transition metals in a higher oxidation state than in the as-prepared state, is characterized by lower values of x. The active materials of embodiments of this invention include such materials in their nascent state (i.e., as manufactured prior to inclusion in an electrode) and materials formed during operation of the battery (i.e., by insertion or removal of Li or other alkaline metal).

In one aspect of the present invention, a cobalt-rich phosphate material is provided which comprises multiple phases as a result of doping with or incorporation of additional materials. In one embodiment, the additional phases provide improved electrical conductivity and/or lithium ion diffusivity.

In one aspect of the present invention, an electrode material is provided which comprises two components or two phases: a first component which is a cobalt-rich phosphate material and a second component which is a metal oxide, a metal phosphate, metal hydroxide, metal carbonate, metal nitrate or mixture thereof. In one embodiment, the second component is coated on the first component. In another embodiment, the second component is dispersed through the bulk of the first component. In another embodiment, the second component is reacted with the first component. In one embodiment, the electrode material improves battery performance.

In one aspect of the present invention, an electrode material is provided which comprises two components or two phases, wherein the composition of the first component comprises a cobalt-rich phosphate material of formula (I), and the composition of the second component comprises oxides, phosphates, hydroxides, carbonates, or nitrates of alkali, alkali earth, and transition metals, such as Ti, V, Na, Ta, W, Cr, Cu, Zn, Zr, Y, La, Ag, or Mg. In one embodiment, M is two or more of Fe, Mn, V, Cr, Ni, Ti, Cu, or Zn. In another embodiment, the second component is one or more compounds that react with the first component to form a solid solution in which the metal of the second component occupies the partial Li or Co/M sites. In another embodiment, the second component is one or more compounds that react with the phosphate in the first component to form other phases like Nasicon or pyrophosphate. In another embodiment, the second component is one or more compounds that are coated on or dispersed through the bulk of the first component. In some embodiments, the second component includes at least one M, and may also include at least one N. For example, the second component can include an oxide, a phosphate, a hydroxide, a carbonate, or a nitrate of at least one M.

In one aspect of the present invention, an electrode material is provided which comprises two components or two phases, wherein the composition of the first component comprises a cobalt-rich phosphate material with formula (II) or (III), and the composition of the second component comprises oxides, hydroxides, carbonates, or nitrates of alkali, alkali earth, and transition metals, such as Ti, V, Na, Ta, W, Cr, Cu, Zn, Zr, Y, La, Ag, or Mg. In one embodiment, M/M' are one or more of Fe, Mn, V, Cr, Ni, Ti, Cu, or Zn. In another embodiment, the second component is one or more compounds that react with the first component to form a solid solution in which the metal of the second component occupies the partial Li or Co/M/M' sites. In another embodiment, the second component is one or more compounds that react with the phosphate in the first component to form other phases like Nasicon or pyrophosphate. In another embodiment, the second component is one or more compounds that are coated on or dispersed through the bulk of the first component. In some embodiments, the second component includes M'. For example, the second component can include an oxide, a phosphate, a hydroxide, a carbonate, or a nitrate of M'.

In one aspect of the present invention, an electrode material is provided which has been coated with a layer of oxide material. In one embodiment, the oxide layer can improve the capacity retention and cycle life in comparison to uncoated electrode material with a limited loss of capacity. In some embodiments, oxide candidates and modification conditions are selected to coat a layer of oxide or dope oxides into available high voltage electrode materials on the basis of Cobalt containing phosphates. Examples of oxides that can be used to coat the electrode material include, for example, $SiO_2$, $ZrO_2$, $Al_2O_3$ and $TiO_2$. In general, the process of coating the electrode material includes mixing the oxide precursor with uncoated electrode material, and then annealing the mixture to form an oxide layer on the electrode material. In some embodiments, the mixing step can include, for example, sonication (sometimes called aging), stirring, magnetic stirring, ball milling, or other methods that involve high shear (mixing). In some embodiments, ball milling provided the coated electrode materials with the best cycle life. In some embodiments, the layer of oxide on the electrode material can minimize the reaction between the electrolyte and electrode materials. In some embodiments, the oxide precursor's addition process, such as high speed mixing or ball milling, to the electrode material changes the crystallinity of the electrode material, so the electrode materials are post-treated (e.g., annealed) to increase crystallinity of the electrode materials.

In some embodiments, the oxide coated electrode material is produced by a two-step process. After the uncoated electrode material is prepared, oxide precursors (Tetraethyl orthosilicate (TEOS) for $SiO_2$, Zirconium(IV) propoxide solution 70% for $ZrO_2$, Aluminum isopropoxide for $Al_2O_3$, Titanium (IV) isopropoxide for $TiO_2$) are added to the uncoated electrode material along with iso-propanol in a glove box. The percentage of oxides corresponding to the initial precursor loadings can be calculated based on 100% transfer from the precursors to the oxides. The uncoated electrode material and oxide precursor are mixed as described herein, dried under vacuum at 70-100° C. for approximately 2 hours, and then transferred to $N_2$ filled glove box. The milled and dried precursors are then heated at approximately at 5° C./min for 12 h under $N_2$ flow, and then cooled to room temperature at approximately 5° C./min. In some embodiments, the second heating step (annealing) is performed in the range of 350-800° C. In some embodiments, the coated electrode materials are annealed in the range of 400-500° C. Annealing is performed under 800° C. avoid a lost in Co capacity, and therefore, the electrode material capacity.

In some embodiments, the coated electrode material includes particles having a core and coating surrounding at least portion of the core. The core comprises an active material comprising lithium (Li), cobalt (Co), phosphate ($PO_4$), and at least two additional metals other than Li and Co, and the coating surrounding the core is made as described herein. In some embodiments, the particles contain multiple cores surrounded by the coating. In some embodiments, the coating is an oxide coating.

The core and coating may have different structures (e.g., different degrees of crystallinity) and different morphologies. The structure and morphologies of the particles vary in function of the thickness of the coating around the core. Coulombic efficiency and capacity retention are also affected by the thickness of the coating in the electrode material. In some embodiments, the weight percentage of oxide coating on the electrode material is about 0.25-1 wt %. Higher weight percentage of oxide coating material (e.g. 2.5-5 wt %) can reduce capacity and coulombic efficiency. In some embodiments, the coated electrode material is crystalline, or at least essentially crystalline. In some embodiments, the coated electrode material may not be fully crystalline, and may appear amorphous. Such coatings may be amorphous or may have some degrees of crystal structure.

Additional improvements in battery properties can be attained by optimizing the composition of a cobalt-rich phosphate material of formula (I), (II), or (III). Specifically, further improvements in properties such as specific energy, rate capability, and capacity retention can be attained by optimizing or otherwise adjusting for an amount of lithium, an amount and type of a set of conductive additives, or both.

In one aspect, a cobalt-rich phosphate material is provided with an excess amount of lithium to yield a lithium-rich electrode material that provides improved battery properties, including high specific energy, excellent rate capability, and excellent capacity retention. Without wishing to be bound by a particular theory, excess lithium can mitigate against, or decrease the occurrence of, cation antisite defects by reducing aliovalent M (or M') ions on Li sites, so as to improve Li+ diffusivity as well as electronic conductivity. A cation antisite defect refers to a type of defect in which Li and M (or M') ions exchange positions. Aliovalent antisite cations on Li sites, such as M2+ cations on Li sites, can lead to trapping of migrating Li+ vacancies and blocking of Li+ diffusion pathways, thereby reducing electrochemical capacity. In some instances, excess lithium also can compensate for potential loss of lithium during synthesis at high temperatures.

For example, in the case of $Li1-xCo1-y-zM_yM'_z(PO_4)1-a$ of formula (II) or $Li1-x Co1-yM_y(PO_4)1-a$ of formula (III), excess lithium can be attained by adjusting the value of x to be $x \leq 0$ (or 1-x>1), such as about $-0.3 \leq x \leq 0$, about $-0.3 \leq x \leq -0.2$, about $-0.2 \leq x \leq -0.1$, about $-0.2 \leq x \leq 0$, or about $-0.1 \leq x \leq 0$. In some embodiments, the value of x may also specifically be about $-0.01$, $-0.02$, $-0.03$, $-0.05$, $-0.08$, $-0.1$, $-0.12$, $-0.15$, $-0.18$, $-0.2$, $-0.22$, $-0.25$, $-0.28$, or $-0.3$. In some embodiments, x is such that an overall composition of the cobalt-rich phosphate material has a molar ratio of Li, relative to a combined molar amount of Co, M, and M', that is greater than about 1 and up to about 1.1, up to about 1.2, up to about 1.3, or more.

In another aspect, a cobalt-rich phosphate material is provided as a combination of a lithium-rich electrode material along with a set of conductive additives, which can correspond to a single conductive additive, a pair of different conductive additives, or a combination of three or more different conductive additives. Without wishing to be bound by a particular theory, the inclusion of a conductive additive can improve battery properties through one or more of the following mechanisms: (1) the conductive additive can enhance electrical conductivity; (2) the conductive additive can improve electrical coupling between particles of an active material and a current collector as well as inter-particle coupling; and (3) the presence of the conductive additive can control electrode porosity for optimized electrolyte access to the active material and improved Li+ transport. In some instances, synergistic effects of excess lithium along with an optimized amount and type of conductive additive can yield further improved battery properties, including further improvements in specific energy, rate capability, and capacity retention.

Suitable conductive additives include those in a particulate form, and having a surface area greater than about 1 $m^2/g$ and up to about 3,000 $m^2/g$ or more, such as from about 10 $m^2/g$ to about 100 $m^2/g$, from about 100 $m^2/g$ to about 500 $m^2/g$, from about 500 m²/g to about 1,000 m²/g, from about 1,000 m²/g to about 2,000 m²/g, or from about 2,000 m²/g to about 3,000 m²/g. An average particle size or an average grain size can be about 1 µm or greater, or can be in the sub-micron range, such as from about 1 nm to about 100 nm or from about 1 nm to about 10 nm. In some embodiments, a conductive additive is electrically conductive, and can have an electrical conductivity of at least about 10-2 S/cm, such as at least about 10-1 S/cm, at least about 1 S/cm, at least about 10 S/cm, or at least about 100 S/cm, and up to about 10,000 S/cm or more. Examples of suitable conductive additives include carbon-based additives, such as carbon black, acetylene black, graphite, and fullerenic carbon nanotubes. Specific examples of carbon-based additives include Super P Li (about 60 m²/g available from Timcal), KJ600 (about 1,400 m²/g available from Akzo Nobel), KJ300 (about 800 m²/g available from Akzo Nobel), SFG6 (available from Timcal), and Timrex HSAG300 (available from Timcal).

An amount of a particular conductive additive can be expressed in terms of a weight percent of the additive relative to a combined weight of an active material and a set of conductive additives (or wt %). For example, an amount of a conductive additive can be in the range of about 0.1 wt % to about 20 wt %, such as from about 0.1 wt % to about 18 wt %, from about 0.1 wt % to about 15 wt %, from about 0.5 wt. % to about 10 wt %, from about 0.5 wt % to about 8 wt %, from about 0.5 wt % to about 5 wt %, or from about 0.5 wt % to about 3 wt %, and, in the case of a combination of multiple conductive additives, a total amount of the additives can be in the range of about 0.1 wt % to about 20 wt %, such as from about 0.1 wt % to about 18 wt %, from about 0.1 wt % to about 15 wt %, from about 0.5 wt. % to about 10 wt %, from about 0.5 wt % to about 8 wt %, from about 0.5 wt % to about 5 wt %, or from about 0.5 wt % to about 3 wt %.

Resulting battery properties can depend upon the identity of a particular conductive additive used, an amount of the conductive additive used, and, in the case of a combination of multiple conductive additives, a relative amount of each additive within the combination. Accordingly, the resulting battery properties can be fine-tuned or optimized by proper selection of a set of conductive additives and adjusting amounts of those additives. For some embodiments, a relatively small amount of a conductive additive can be desirable, such as in the range of about 0.5 wt % to about 5 wt % or from about 0.5 wt % to about 3 wt %. In the case of a carbon-based additive, synergistic effects between excess lithium and reduced carbon content can yield further improved battery properties, including further improvements in specific energy, rate capability, and capacity retention. Improvements at reduced carbon content are further magnified when battery properties are expressed at a whole cell level, such as when specific capacity and specific energy are expressed in terms of a combined weight of an active material and a carbon-based additive.

In one aspect of the present invention, a method of making a cobalt-rich phosphate material with one or more improved battery properties is provided. Methods of making cobalt-rich phosphate materials as embodiments of the present invention include high energy milling processes, such as ball or attritor milling, grinding, sol-gel, hydrothermal, solvothermal, or synthesis from a melt, all with or without subsequent heat treatment. The products are then calcinated under high temperatures. These methods produce compositions wherein the dopants may form a solid solution with the $LiCoPO_4$, other novel phases, similar to Nasicon or pyrophosphate, or the dopants are dispersed within the $LiCoPO_4$ base material.

In one aspect of the present invention, a nonaqueous electrolyte secondary battery is provided, comprising: a positive electrode containing a positive electrode active material containing a cobalt-rich phosphate material; a negative electrode; and a nonaqueous electrolyte, wherein the cobalt-rich phosphate material comprises formula (I). A set of conductive additives also can be included along with the cobalt-rich phosphate material.

In one aspect of the present invention, a nonaqueous electrolyte secondary battery is provided, comprising: a positive electrode containing a positive electrode active material containing a cobalt-rich phosphate material; a negative electrode; and a nonaqueous electrolyte, wherein the cobalt-rich phosphate material comprises formula (II) or (III). A set of conductive additives also can be included along with the cobalt-rich phosphate material.

In one aspect of the present invention, a nonaqueous electrolyte secondary battery is provided, comprising: a positive electrode containing a positive electrode active material which comprises two components or two phases; a negative electrode; and a nonaqueous electrolyte, wherein the two component positive electrode active material comprises the formula (I), and the composition of the second component comprises oxides, phosphates, hydroxides, carbonates, or nitrates of alkali, alkali earth, and transition metals, such as Ti, V, Na, Ta, W, Cr, Cu, Zn, Zr, Y, La, Ag, Mg. In one embodiment, M is two or more of Fe, Mn, V, Cr, Ni, Ti, Cu, Zn. In another embodiment, the second component is one or more compounds that react with the first component to form a solid solution in which the metal of the second component occupies the partial Li or Co/M sites. In another embodiment, the second component is one or more compounds that react with the phosphate in the first component to form other phases like Nasicon or pyrophosphate. In another embodiment, the second component is one or more compounds that are coated on or dispersed through the bulk of the first component. A set of conductive additives also can be included along with the positive electrode active material.

In one aspect of the present invention, a nonaqueous electrolyte secondary battery is provided, comprising: a positive electrode containing a positive electrode active material which comprises two components or two phases; a negative electrode; and a nonaqueous electrolyte, wherein the two component positive electrode active material comprises the formula (II) or (III), and the composition of the second component comprises oxides, hydroxides, carbonates, or nitrates of alkali, alkali earth, and transition metals, such as Ti, V, Na, Ta, W, Cr, Cu, Zn, Zr, Y, La, Ag, Mg. In one embodiment, M/M' are one or more of Fe, Mn, V, Cr, Ni, Ti, Cu, Zn. In another embodiment, the second component is one or more compounds that react with the first component to form a solid solution in which the metal of the second component occupies the partial Li or Co/M/M' sites. In another embodiment, the second component is one or more compounds that react with the phosphate in the first component to form other phases like Nasicon or pyrophosphate. In another embodiment, the second component is one or more compounds that are coated on or dispersed through the bulk of the first component. A set of conductive additives also can be included along with the positive electrode active material.

Transition metals and rare earth elements useful herein, in addition to Fe and Co, include the elements of Groups 3-11 of the Periodic Table, including those selected from the group consisting of Ti (Titanium), V (Vanadium), Mn (Manganese), Cu (Copper), Zn (Zinc), Y (Yttrium), Zr (Zirconium), Nb (Niobium), Mo (Molybdenum), Ag (Silver), La (Lanthanum), Hf (Hafnium), Ta (Tantalum), W (Tungsten), and mixtures thereof. Preferred are those selected from the group consisting of Ti, V, Mn, Ni, Cu, Zn, Y, Zr, Nb, Ag, La, and mixtures thereof. Particularly useful transition metals include Co, Fe, Nb, Mn, V, Ti and mixtures thereof. A preferred embodiment comprises a mixture of Co, Fe, and Mn. Another preferred embodiment comprises a mixture of Co, Fe, and Ti. Another preferred embodiment comprises a mixture of Co, Fe, and V. Another preferred embodiment comprises a mixture of Co, Fe, and Nb. Although a variety of oxidation states for such transition metals is available, in some embodiments it is most preferable that the transition metals have a +2 oxidation state.

Alkali metals useful herein include the elements of Group 1. Preferred are Na and K. Particularly preferred is Na.

Alkali earth metals useful herein include the elements of Group 2. Preferred are Be, Mg, and Ca. Particularly preferred are Mg and Ca.

Rare earth metals useful herein include Yttrium (Y), Scandium (Sc), Lanthanum (La), Cerium (Ce), Praseodymium (Pr), Neodymium (Nd), Samarium (Sm), Europium (Eu), Gadolinium (Gd), or Terbium (Tb). Preferred are Y and La. Embodiments incorporating rare earth metals include, but are not limited to: $LiFe_{0.2}Co_{0.65}Y_{0.15}PO_4$, $LiFe_{0.2}Co_{0.75}Y_{0.05}PO_4$, $LiFe_{0.2}Co_{0.70}Y_{0.10}PO_4$, $LiFe_{0.5}Co_{0.45}Y_{0.05}PO_4$, $LiFe_{0.5}Co_{0.40}Y_{0.10}PO_4$, and $LiFe_{0.5}Co_{0.35}Y_{0.15}PO_4$.

M may further comprises one or more Group 13 or 14 elements. Preferably, such elements do not include C (carbon), N (nitrogen), and P (phosphorus). Preferred Group 13 or 14 elements include Al (Aluminum), Ga (Gallium), In (Indium), Tl (Thallium), Si (Silicon), and Ge (Germanium). Particularly preferred is Al.

Non-limiting examples of cobalt-rich phosphate materials include the following:

$LiCo_{0.4}Fe_{0.5}Nb_{0.1}PO_4$
$LiCo_{0.35}Fe_{0.5}Ti_{0.15}PO_4$
$LiCo_{0.35}Fe_{0.5}V_{0.15}PO_4$
$LiCo_{0.35}Fe_{0.5}V_{0.15}PO_4$
$LiCo_{0.8}Fe_{0.1}Ti_{0.1}PO_4$
$LiCo_{0.75}Fe_{0.1}Ti_{0.15}PO_4$
$Li_{1.3}Co_{0.35}Fe_{0.5}V_{0.3}(PO_4)_{1.3}$
$Li_{1.3}Co_{0.55}Fe_{0.3}V_{0.3}(PO_4)_{1.3}$
$LiFe_{0.2}Co_{0.75}Ce_{0.05}PO_4$
$LiFe_{0.2}Co_{0.7}Ce_{0.1}PO_4$
$LiFe_{0.2}Co_{0.65}Ce_{0.15}PO_4$
$LiFe_{0.2}Co_{0.75}Hf_{0.05}PO_4$
$LiFe_{0.2}Co_{0.7}Hf_{0.1}PO_4$
$LiFe_{0.2}Co_{0.65}Hf_{0.15}PO_4$
$LiFe_{0.2}Co_{0.75}Mo_{0.05}PO_4$
$LiFe_{0.2}Co_{0.7}Mo_{0.1}PO_4$
$LiFe_{0.2}Co_{0.65}Mo_{0.1}PO_4$
$LiFe_{0.2}Co_{0.75}Ta_{0.05}PO_4$
$LiFe_{0.2}Co_{0.7}Ta_{0.1}PO_4$
$LiFe_{0.2}Co_{0.65}Ta_{0.15}PO_4$
$LiFe_{0.2}Co_{0.75}W_{0.05}PO_4$
$LiFe_{0.2}Co_{0.7}W_{0.1}PO_4$
$LiFe_{0.2}Co_{0.65}W_{0.15}PO_4$
$LiFe_{0.2}Co_{0.75}Ti_{0.05}PO_4$
$LiFe_{0.2}Co_{0.7}Ti_{0.1}PO_4$
$LiFe_{0.2}Co_{0.65}Ti_{0.15}PO_4$
$LiFe_{0.2}Co_{0.75}V_{0.05}PO_4$
$LiFe_{0.2}Co_{0.7}V_{0.1}PO_4$
$LiFe_{0.2}Co_{0.65}V_{0.15}PO_4$
$LiFe_{0.2}Co_{0.65}Y_{0.15}PO_4$
$LiFe_{0.2}Co_{0.75}Y_{0.05}PO_4$
$LiFe_{0.2}Co_{0.70}Y_{0.10}PO_4$
$LiFe_{0.5}Co_{0.45}Y_{0.05}PO_4$
$LiFe_{0.5}Co_{0.40}Y_{0.10}PO_4$
$LiFe_{0.5}Co_{0.35}Y_{0.15}PO_4$
$LiFe_{0.2}Co_{0.65}Zr_{0.15}PO_4$
$LiFe_{0.2}Co_{0.75}Zr_{0.05}PO_4$
$LiFe_{0.2}Co_{0.70}Zr_{0.10}PO_4$
$LiFe_{0.5}Co_{0.45}Zr_{0.05}PO_4$
$LiFe_{0.5}Co_{0.40}Zr_{0.10}PO_4$
$LiFe_{0.5}Co_{0.35}Zr_{0.15}PO_4$
$LiFe_{0.1}Co_{0.8}Ti_{0.1}PO_4$
$LiFe_{0.2}Co_{0.7}Nb_{0.1}PO_4$
$Li1Fe_{0.2}Co_{0.65}Ti_{0.15}(PO_4)_{1.03}$
$Li_{1.23}Fe_{0.2}Co_{0.65}Ti_{0.15}PO_4$
$Li_{1.13}Fe_{0.2}Co_{0.65}Ti_{0.15}PO_4$
$Li_{1.03}Fe_{0.2}Co_{0.65}Ti_{0.15}PO_4$
$LiFe_{0.45}Co_{0.25}Mn_{0.3}PO_4$
$LiFe_{0.4}Co_{0.05}Mn_{0.55}PO_4$
$LiFe_{0.2}Co_{0.65}Ti_{0.15}PO_4$
$LiFe_{0.1}Co_{0.75}Ti_{0.15}PO_4$
$LiCo_{0.55}Mn_{0.3}Ti_{0.15}PO_4$
$LiCo_{0.45}Mn_{0.3}Ti_{0.25}PO_4$
$Li1Fe_{0.2}Co_{0.65}Ti_{0.15}(PO_4)_{0.94}$
$LiFe_{0.2}Co_{0.7}Ti_{0.1}PO_4$
$Li_{1.3}Fe_{0.5}Co_{0.35}V_{0.3}(PO_4)1.3$
$Li_{1.3}Fe_{0.3}Co_{0.55}V_{0.3}(PO_4)1.3$
$Li_{1.2}Fe_{0.2}Co_{0.65}Ti_{0.15}PO_4$
$Li_{1.2}Fe_{0.2}Co_{0.7}Ti_{0.1}Ta_4$
$Li_{1.2}Fe_{0.1}Co_{0.75}Ti_{0.15}PO_4$
$Li_{1.1}Fe_{0.2}Co_{0.65}Ti_{0.15}PO_4$
$Li_{1.1}Fe_{0.2}Co_{0.7}Ti_{0.1}PO_4$
$Li_{1.1}Fe_{0.1}Co_{0.75}Ti_{0.15}PO_4$
$Li_{1.1}Fe_{0.1}Co_{0.8}Ti_{0.1}PO_4$
$Li_{1.1}Fe_{0.1}Co_{0.85}Ti_{0.05}PO_4$
$LiFe_{1.1}Co_{0.85}Nb_{0.05}PO_4$
$Li_{1.05}Fe_{0.2}Co_{0.65}Ti_{0.15}PO_4$
$Li_{1.05}Fe_{0.2}Co_{0.7}Ti_{0.1}PO_4$
$Li_{1.05}Fe_{0.1}Co_{0.75}Ti_{0.15}PO_4$
$Li_{1.05}Fe_{0.1}Co_{0.8}Ti_{0.1}PO_4$
$Li_{1.05}Fe_{0.1}Co_{0.85}Ti_{0.05}PO_4$
$LiFe_{0.1}Co_{0.65}Ti_{0.25}PO_4$
$LiCo_{0.75}Mn_{0.1}Ti_{0.15}PO_4$
$LiCo_{0.65}Mn_{0.3}Ti_{0.05}PO_4$
$LiCo_{0.55}Mn_{0.2}Ti_{0.25}PO_4$
$LiCo_{0.7}Mn_{0.2}Ti_{0.1}PO_4$
$LiCo_{0.7}Mn_{0.1}Ti_{0.2}PO_4$
$LiCo_{0.6}Mn_{0.3}Ti_{0.1}PO_4$
$Li1Fe_{0.2}Co_{0.75}Ti_{0.05}PO_4$
$Li1Fe_{0.2}Co_{0.65}Ti_{0.15}PO_4$
$Li1Fe_{0.2}Co_{0.7}Ti_{0.1}PO_4$
$LiFe_{0.4}Co_{0.55}V_{0.05}PO_4$
$LiFe_{0.4}Co_{0.45}V_{0.05}PO_4$
$Li1Fe_{0.2}Co_{0.75}Ta_{0.05}PO_4$
$Li_{1.04}Fe_{0.3}Co_{0.68}V_{0.04}(PO_4)_{1.04}$
$Li_{1.3}Fe_{0.15}Co_{0.85}V_{0.3}(PO_4)_{1.3}$
$Li_{1.2}Fe_{0.1}Co_{0.9}V_{0.2}(PO_4)_{1.2}$
$Li_{1.2}Fe_{0.5}Co_{0.35}V_{0.2}(PO_4)_{1.2}$
$Li_{1.2}Fe_{0.3}Co_{0.55}V_{0.2}(PO_4)_{1.2}$
$Li_{1.1}Fe_{0.05}Co_{0.95}V_{0.1}(PO_4)_{1.1}$
$Li_{1.05}Co_{0.8}Fe_{0.1}V_{0.1}PO_4$
$Li_{1.1}Co_{0.8}Fe_{0.1}V_{0.1}PO_4$
$Li_{1.05}Co_{0.85}Fe_{0.1}V_{0.05}PO_4$
$Li_{1.1}Co_{0.85}Fe_{0.1}V_{0.05}PO_4$
$LiFe_{0.1}Co_{0.85}Ti_{0.05}PO_4$
$LiFe_{0.1}Co_{0.7}Ti_{0.2}PO_4$
$LiCo_{0.25}Pe_{0.2}V_{0.05}PO_4$
$LiCo_{0.2}Fe_{0.2}CH_{0.1}PO_4$
$LiFe_{0.4}Co_{0.45}Ti_{0.15}PO_4$
$LiFe_{0.3}Co_{0.45}Ti_{0.25}PO_4$ $LiFe_{0.3}Co_{0.5}Ti_{0.2}PO_4$
$LiFe_{0.2}Co_{0.6}Ti_{0.2}PO_4$
$LiCo_{0.25}Fe_{0.2}Nb_{0.05}PO_4$
$LiCo_{0.45}Fe_{0.5}Nb_{0.05}PO_4$
$LiCo_{0.4}Fe_{0.5}Nb_{0.1}PO_4$
$LiCo_{0.65}Fe_{0.2}Ti_{0.15}PO_4$
$LiCo_{0.35}Fe_{0.5}V_{0.15}PO_4$
$LiCo_{0.35}Fe_{0.5}Ti_{0.15}PO_4$
$LiCo_{0.7}Fe_{0.2}Ti_{0.1}PO_4$
$LiCo_{0.4}Fe_{0.5}Ti_{0.1}PO_4$
$LiFe_{0.33}Co_{0.33}Mn_{0.33}PO_4$
$LiFe_{0.2}Co_{0.8}PO_4$
$LiFe_{0.5}Co_{0.5}PO_4$
$LiFe_{0.2}Co_{0.65}Y_{0.15}PO_4$
$LiFe_{0.2}Co_{0.75}Y_{0.05}PO_4$
$LiFe_{0.2}Co_{0.70}Y_{0.10}PO_4$
$LiFe_{0.5}Co_{0.45}Y_{0.05}PO_4$
$LiFe_{0.5}Co_{0.40}Y_{0.10}PO_4$
$LiFe_{0.5}Co_{0.35}Y_{0.15}PO_4$
$LiFe_{0.2}Co_{0.65}Zr_{0.15}PO_4$
$LiFe_{0.2}Co_{0.75}Zr_{0.05}PO_4$
$LiFe_{0.2}Co_{0.70}Zr_{0.10}PO_4$
$LiFe_{0.5}Co_{0.45}Zr_{0.05}PO_4$
$LiFe_{0.5}CO_{0.40}Zr_{0.10}PO_4$
$LiFe_{0.5}Co_{0.35}Zr_{0.15}PO_4$
$LiFe_{0.2}Co_{0.75}Ce_{0.05}PO_4$
$LiFe_{0.2}Co_{0.7}Ce_{0.1}PO_4$
$LiFe_{0.2}Co_{0.65}Ce_{0.15}PO_4$
$LiFe_{0.2}Co_{0.75}Hf_{0.05}PO_4$
$LiFe_{0.2}Co_{0.7}Hf_{0.1}PO_4$
$LiFe_{0.2}Co_{0.65}Hf_{0.15}PO_4$
$LiFe_{0.2}Co_{0.75}Mo_{0.05}PO_4$
$LiFe_{0.2}Co_{0.7}Mo_{0.1}PO_4$
$LiFe_{0.2}Co_{0.65}Mo_{0.1}PO_4$
$LiFe_{0.2}Co_{0.75}Ta_{0.05}PO_4$
$LiFe_{0.2}Co_{0.7}Ta_{0.1}PO_4$
$LiFe_{0.2}Co_{0.65}Ta_{0.15}PO_4$
$LiFe_{0.2}Co_{0.75}W_{0.05}PO_4$
$LiFe_{0.2}Co_{0.7}W_{0.1}PO_4$
$LiFe_{0.2}Co_{0.65}W_{0.15}PO_4$
$LiCo_{0.4}Fe_{0.5}Nb_{0.1}PO_4$

Method of Synthesis

The synthesis of the cobalt-rich phosphate materials can be carried out using a variety of techniques, including solid-state chemistry techniques such as solid-state synthesis, mechanochemical activation, carbothermal reduction, or microwave processing, and solution chemistry techniques such as hydrothermal processing, sol-gel processing, precipitation methods, emulsion-drying methods, and spray pyrolysis. (See Jugovic et al., *J. Power Sources* 190:538-544 (2009), which is hereby incorporated by reference in its entirety).

One preferable method for the synthesis of the cobalt-rich phosphate materials is to use high energy milling processes to produce a fine powder, such as using ball or attritor milling, or by grinding. (Franger et al., J. Phys. Chem. Solids 67:1338-1342 (2006); Kim et al. *J. Phys. Chem. Solids* 69:2371-2377 (2008), which are hereby incorporated by reference in their entirety). One desirable technique is ball milling, which can involve forming an alloy or a substantially homogeneous blend from a mixture of precursor materials in a ball milling device. In some embodiments, stoichiometric amounts of the precursor materials are used, based on a desired composition of the resulting cobalt-rich phosphate material. The precursor materials along with a set of conductive additives can be provided as powders, and, during ball milling, particles of the powders can undergo repeated collisions with grinding ball bearings, causing deformation, welding, and fracture of the particles that can result in micro-structural and chemical composition changes. Ball milling can be carried out in an inert gas atmosphere, such as one including helium, neon, argon, krypton, xenon, or a mixture thereof, or in a reactive gas atmosphere, such as one including a reactive component that contributes to micro-structural and chemical composition changes. As a result of ball milling, the precursor materials are mixed such that a resulting particulate material is an alloy, a blend, or a combination of an alloy and a blend. Depending upon ball milling conditions used, the resulting particulate material can include particles of an active material having a relatively small particle or crystallite size, such as having an average particle size or an average grain size in the range of about 1 nm to about 10 μm, such as in the sub-micron range. In some instances, smaller particle sizes can yield superior battery properties relative to larger particle sizes, as a result of surface area effects. A conductive additive can be coated on, dispersed with, or otherwise combined or reacted with the particles of the active material. In some instances, a conductive additive can be added to the active material subsequent to synthesis of the active material, instead of, or in conjunction with, during synthesis of the active material. Addition of the conductive additive subsequent to synthesis can be carried out by a high energy milling process, such as ball or attritor milling.

Milling conditions to obtain embodiments of the present invention may be varied depending upon the particular machine used. The ball milling time to produce embodiments of the present invention can vary from about 0 hours to 10 hours. In some embodiments, the ball milling time to produce cobalt-rich phosphate materials is from about 1-10 hours, 2-9 hours, 3-8 hours, 4-6 hours, 1-8 hours, 1-6 hours, 1-5 hours, 1-3 hours, 2-10 hours, 3-10 hours, 5-10 hours, 7-10 hours, 8-10 hours, 3-6 hours, 4-8 hours, or 3-7 hours. In some embodiments, the ball milling time is about 1 hour, 2 hours, 3 hours, 4 hours, 5 hours, 6 hours, 7 hours, 8 hours, 9 hours, or 10 hours.

Compounds added to a $LiCoPO_4$ base material to produce embodiments of the present invention may be added in any form, such as, but not exclusively, oxides, nitrides, hydroxides, hydrides, or salts. For example, compounds may be added as oxides, such as $Nb_2O_5$, $TiO_2$, $V_2O_5$, $MoO_2$, $WO_3$, $V_2O_3$, $Ta_2O_5$, $HfO_2$, or $CeO_2$.

Referring to formula (I), precursor materials can include a source of Li, a source of Co, a source of each N, a source of each M, and a source of $PO_4$. Referring to formulas (II) and (III), precursor materials can include a source of Li, a source of Co, a source of M, a source of M', and a source of $PO_4$. Sources of Li, Co, N, M, and M' include metal-containing salts or other metal-containing compounds, such as fluorides, chlorides, bromides, iodides, nitrates, nitrites, nitrides, sulfates, sulfites, bisulfites, carbonates, bicarbonates, borates, phosphates, silicates, antimonates, arsenates, germanates, oxides, hydroxides, hydrides, acetates, oxalates, and so forth. Metal-containing salts can be used in a hydrated or dehydrated form. Examples of lithium sources include lithium dihydrogen phosphate ($LiH_2PO_4$), lithium carbonate ($Li_2CO_3$), lithium hydroxide (LiOH), or mixtures thereof. Examples of cobalt sources include cobalt carbonate ($CoCO_3$), cobalt hydroxide ($Co(OH)_2$), or mixtures thereof. Examples of titanium sources include oxides, such as $TiO_2$, $Ti_2O_3$, TiO, and mixtures thereof. Examples of iron sources include oxalates, such as $FeC_2O_4.2H_2O$. Examples of phosphate sources include $LiH_2PO_4$, ammonium dihydrogenphosphate ($NH_4H_2PO_4$), or mixtures thereof.

In some embodiments, a source of one element also can serve as a source of at least one other element. For example, $LiH_2PO_4$ can serve as a source of both lithium and phosphate, and can be used in place of separate sources of lithium and phosphate, such as LiOH and $NH_4H_2PO_4$, thereby reducing material cost. If excess lithium is desired, $Li_2CO_3$ can be used as a secondary source of lithium. In some embodiments, the use of $LiH_2PO_4$ as a source of lithium and phosphate and $CoCO_3$ as a source of cobalt can provide a number of advantages, including improvements in specific capacity and specific energy (FIGS. 25 and 26) as well as reducing the formation of undesirable by-products during milling (e.g., $H_2O$).

After compounds are milled, ground and/or otherwise mixed, they are then calcinated under high temperatures. High temperature methods that can be used to form compounds of embodiments of the present invention include those found in Padhi et al., *J. Electrochem. Soc.* 144:1609-1613 (1997) and Yun et al., *J. Power Sources* 1361-1368 (2006), which are hereby incorporated by reference in their entirety. Calcination produces compositions wherein the dopants may form a solid solution with the $LiCoPO_4$, other novel phases, similar to Nasicon or pyrophosphate, or the dopants are dispersed within the $LiCoPO_4$ base material.

Calcination temperatures to produce embodiments of the present invention are greater than about 300° C. In some embodiments, calcination temperatures are from about 400° C. to 800° C. In some embodiments, calcination temperatures are greater than about 450° C. In some embodiments, calcination temperatures are greater than about 500° C. In some embodiments, calcination temperatures are greater than about 550° C. In some embodiments, calcination temperatures are greater than about 600° C. In some embodiments, calcination temperatures are greater than about 650° C. In some embodiments, calcination temperatures are greater than about 700° C. In some embodiments, calcination temperatures are greater than about 750° C. In some embodiments, calcination temperatures can be about 400-800° C., 450-750° C., 500-700° C., 550-650° C., 400-750° C., 400-700° C., 400-600° C., 400-550° C., 400-500° C., 400-450° C., 450-800° C., 500-800° C., 550-800° C., 600-800° C., 650-800° C., 700-800° C., 500-650° C., 500-600° C., 450-500° C., 500-550° C., 550-600° C., 600-650° C., 650-700° C., or 700-750° C. In some embodiments, calcination temperatures may be about 400° C., 450° C., 500° C., 550° C., 600° C., 650° C., 700° C., 750° C., or 800° C.

Calcination times to produce embodiments of the present invention can vary from about 30 minutes to 30 hours. In some embodiments, calcination times are greater than 10 hours. In some embodiments, calcination times are greater than 12 hours. In some embodiments, calcination times are greater than 15 hours. In some embodiments, calcination times are greater than 10 hours. In some embodiments, calcination times are greater than 18 hours. In some embodiments, calcination times are greater than 20 hours. In some embodiments, calcination times are greater than 24 hours. In some embodiments, calcination times are greater than 28 hours. In some embodiments, calcination times can be about 12-28 hours, 15-24 hours, 18-20 hours, 10-28 hours, 15-28 hours, 15-20 hours, 18-24 hours, 12-30 hours, 12-24 hours, 12-20 hours, 12-18 hours, 15-30 hours, 20-30 hours, 24-30 hours, 10-15 hours, 10-18 hours, or 18-24 hours. In some embodiments, calcination times may be about 10, 12, 15, 18, 20, 24, 28, or 30 hours.

Depending upon the particular set of additives used and conditions during the synthesis, the resulting electrode material can include the set of additives as a coating, as a set of dispersed components within a blend, as a set of alloying components or a set of dopants, or as a combination thereof. Irrespective of the ultimate form the final material takes, the electrode material can be represented by the formulas (I), (II), or (III).

Conditioning of Cobalt-Rich Phosphate Materials

The cobalt-rich phosphate materials described herein can be conditioned prior to sale or use in a commercial application. For example, an electrode, such as a cathode, comprising an electrode material, an electrochemical cell, or a battery can be conditioned by cycling prior to commercial sale or use in commerce. A method of conditioning a battery can, for example, comprise conditioning a battery for commercial sale. Such method can comprise, for example, providing a battery, and cycling such battery through at least 1, at least 2, at least 3, at least 4, or at least 5 cycles, each cycle comprising charging the battery and discharging the battery at a rate of 0.05 C (e.g., a current of 7.5 mA/g) between 4.95 V and 2.0 V versus a reference counterelectrode, such as a graphite anode. Charging and discharging can be carried out at a higher or lower rate, such as at a rate of 0.1 C (e.g., a current of 15 mA/g), at a rate of 0.5 C (e.g., a current of 75 mA/g), or at a rate of 1 C (e.g., a current of 150 mA/g).

Uses of Cobalt-Rich Phosphate Materials

The cobalt-rich phosphate materials described herein can be used for a variety of battery applications—essentially for any application where it would be advantageous to use a low cost, low-toxicity material that has superior electrochemical performance, high specific capacity, and improved cycling. For example, the materials can be substituted in place of conventional Li-ion battery materials for consumer applications.

Figure 18:
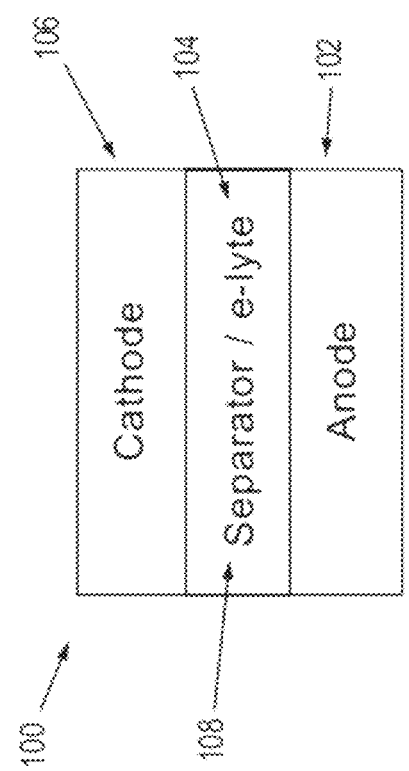
FIG. 18 is a schematic representation which illustrates a Li-ion battery implemented in accordance with an embodiment of the invention.

FIG. 18 illustrates a Li-ion battery 100 implemented in accordance with an embodiment of the invention. The battery 100 includes an anode 102, a cathode 106, an electrolyte 104, which is disposed between the anode 102 and the cathode 106, and a separator 108, which is disposed between the anode 102 and the cathode 106.

The operation of the battery 100 is based upon reversible intercalation and de-intercalation of Li ions into and from materials of the anode 102 and the cathode 106. Other implementations of the battery 100 are contemplated, such as those based on conversion chemistry. Referring to FIG. 18, the voltage of the battery 100 is based on redox potentials of the anode 102 and the cathode 106, where Li ions are accommodated or released at a lower potential in the former and a higher potential in the latter. To allow both a higher specific energy and a higher voltage platform to deliver that energy, the cathode 106 includes an active cathode material for operations at or above 4.2 V. Examples of suitable cathode materials include the cobalt-rich phosphate materials described herein. Examples of suitable anode materials include conventional anode materials used in Li-ion batteries, such as lithium, graphite ("$Li_xC_6$"), and other carbon, silicate, or oxide-based anode materials. Examples of suitable electrolytes include those described in U.S. Provisional Application No. 61/495,318, entitled "Battery Electrolytes for High Voltage Cathode Materials", filed Jun. 9, 2011, and U.S. Provisional Application No. 61/543,262, entitled "Battery Electrolytes for High Voltage Cathode Materials", filed Oct. 4, 2011, the disclosures of which are incorporated herein by reference in their entirety.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Stoichiometric ratios of LiOH, Co(OH)$_2$, FeC$_2$O$_4$.2H$_2$O, NH$_4$H$_2$PO$_4$, TiO$_2$, and carbon-based additive (Super P Li) were added into reaction vessels along with 288 g of 5 mm diameter chrome steel ball bearings. The total mass of materials was 7.7 g. The wells were sealed, removed from glove box, then milled at 38 g for 4 h in a planetary ball mill. The milled precursors were heated to 700° C. at 5° C./min for 18 h under N$_2$ flow, and finally cooled to room temperature at 4° C./min. A preferred stoichiometric ratio was LiOH: FeC$_2$O$_4$.2H$_2$O:Co(OH)$_2$:NH$_4$H$_2$PO$_4$:TiO$_2$=1:0.1:0.8:0.1 with 18 wt % carbon. The batteries were assembled in a high purity argon filled glove box (M-Braun, O$_2$ and humidity contents <0.1 ppm). Samples of powder were formulated into slurries with poly(vinylidene fluoride) (Sigma-Aldrich) and Super P Li (TIMCAL, 85:7.5:7.5) in 1-methyl-2-pyrrolidinone (Sigma-Aldrich, anhydrous, 99.5%), and were deposited and dried on aluminum current collectors prior to battery assembly. Cells were made using lithium as an anode, glass fiber filters (Millipore) as separators, and electrolyte including 1M LiPF$_6$ in a EC:EMC=1:2 solution. Cells were cycled at room temperature from 2.0 V to 4.95 V, unless otherwise specified. Cell testing protocol was:
  Cycle 1: charging C/20, discharging C/10
  Cycle 2-5: charging C/10, discharging C/10
  Cycle 6: charging: 2C, OCV (0.5 h), 1C, OCV (0.5 h), 0.5C, OCV (0.5 h), 0.1C, OCV (0.5 h), 0.05C, OCV (0.5 h); discharging 2C, OCV (0.5 h), 1C, OCV (0.5 h), 0.5C, OCV (0.5 h), 0.1C, OCV (0.5 h), 0.05C, OCV (0.5 h)

Example 2

Stoichiometric ratios of LiOH, Co(OH)$_2$, FeC$_2$O$_4$.2H$_2$O, NH$_4$H$_2$PO$_4$, TiO$_2$, and carbon-based additive (Super P Li) were added into a reaction tank along with 1842 g of 5 mm diameter chrome steel ball bearings. The total mass of materials was 42.2 g. The tank was sealed, removed from glove box, attached to an attritor mill and milled at 600 rpm for 6 h. The milled precursors were heated to 700° C. at 5° C./min for 18 h under N$_2$ flow, and finally cooled to room temperature at 4° C./min. A preferred stoichiometric ratio was LiOH: FeC$_2$O$_4$.2H$_2$O:Co(OH)$_2$:NH$_4$H$_2$PO$_4$:TiO$_2$=1:0.1:0.8:0.1 with 18 wt % carbon. The same cell making sample and testing procedures were applied as in Example 1.

Example 3

FIG. 2 illustrates (maximum) specific capacity (FIG. 2a) and (maximum) specific energy (FIG. 2b) on 1$^{st}$ cycle as a function of composition for various electrode materials comprising Li, Fe, Co, an additional metal, and PO$_4$. The cobalt-rich phosphate materials were formed using similar conditions as set forth in Examples 1 and 2. As can be seen by the compounds listed on the x-axis, a variety of materials were used as dopants in a cobalt-rich phosphate material (described by LiFe$_{1-x-y}$Co$_x$TM$_y$PO$_4$ (0.35≤x≤1.0, 0≤y≤0.25)) wherein TM represents the metal listed on the x-axis.

Example 4

FIG. 3a illustrates specific capacity as a function of number of cycles (cycle 1-5) for cobalt-rich phosphate materials having compositions comprising Li, Fe, Co, an additional metal, and PO$_4$. Materials were formed using similar conditions as set forth in Examples 1 and 2, and were cycled from 2 to 4.95 V at 0.1 C(C-rate based on expected capacity of 150 mAh/g or with 1 C corresponding to 150 mA/g). FIG. 3b compares % capacity as a function of current (cycle 6) for such cobalt-rich phosphate materials.

Example 5

Figure 4:
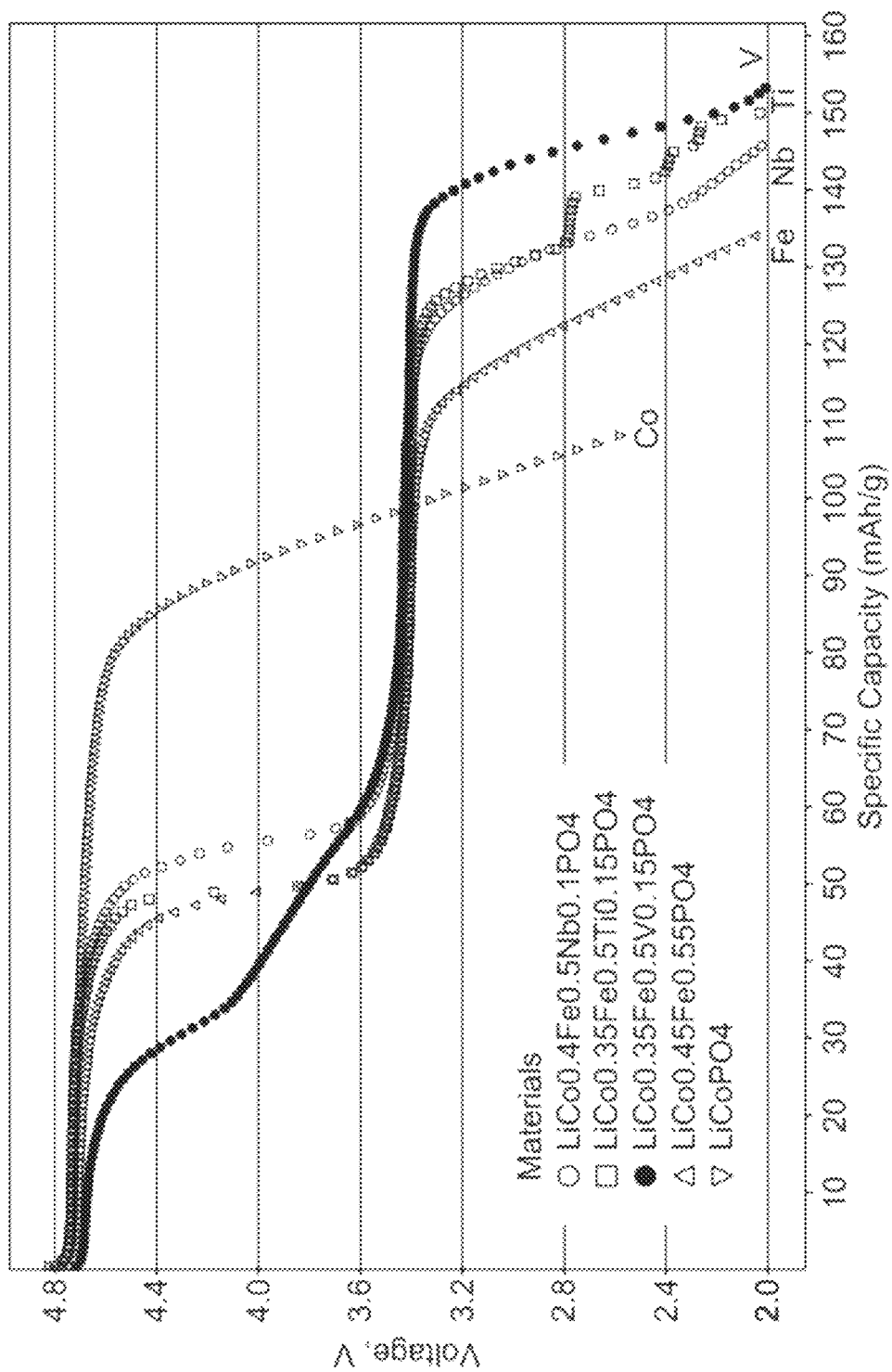
FIG. 4 illustrates a voltage trace comparison of specific capacity in constant current discharge experiments for cobalt-rich phosphate materials having compositions comprising Li, Fe, Co, an additional metal, "M", and $PO_4$, where M is a transition metal selected from Nb, Ti, and V, as measured upon discharge at a rate of 0.1C (about 15 mA/g) from 4.95 V to 2.0 V versus a $Li/Li^+$ counterelectrode. A composition comprising Li, Fe, Co, and $PO_4$ and a $LiCoPO_4$ composition were also evaluated as controls. (See Example 5).

FIG. 4 illustrates a voltage trace comparison of specific capacity on 1$^{st}$ cycle in constant current discharge experiments for cobalt-rich phosphate materials having compositions comprising Li, Fe, Co, an additional metal, and PO$_4$, as measured upon discharge at a rate of 0.1 C (about 15 mA/g) from 4.95 V to 2.0 V versus a Li/Li$^+$ counter electrode. A composition comprising Li, Fe, Co, and PO$_4$ and a LiCoPO$_4$ composition were also evaluated as controls. The materials were formed using similar conditions as set forth in Examples 1 and 2, and showed multiple plateaus with increased capacity as compared to LiCoPO$_4$.

Example 6

FIGS. 5a and 5b illustrate ternary maps comparing (maximum) specific capacity (FIG. 5a, mAh/g) and (maximum) specific energy (FIG. 5b, Wh/kg) on 1$^{st}$ cycle as a function of relative molar ratios of cobalt, iron, and titanium (titanium dioxide) in cobalt-rich phosphate materials having compositions comprising Li, Fe, Co, Ti, and PO$_4$. The cobalt-rich materials were formed using similar conditions as set forth in Examples 1 and 2. Iron amounts were varied from 0.0-0.5. Cobalt amounts were varied from 0.35-0.95. Titanium amounts were varied from 0.05-0.25.

Example 7

FIG. 6 illustrates a voltage trace comparison of specific capacity (FIG. 6a) and specific energy (FIG. 6b) on 1$^{st}$ cycle for a variety of materials doped with, or otherwise incorporating, TiO$_2$ in an embodiment of the present invention. The materials were formed using similar conditions as set forth in Examples 1 and 2. As can be seen from the graphs, specific capacity and specific energy generally increased with increasing titanium amount up to Ti amounts of 0.15. The capacity contribution from Co (above 4.5 V) and Ti (below 3 V) also increased with increasing titanium amount. When the Ti amount increased to 0.2, both the specific capacity and specific energy were lower than those with the Ti amount at 0.1.

Example 8

Figure 7A:
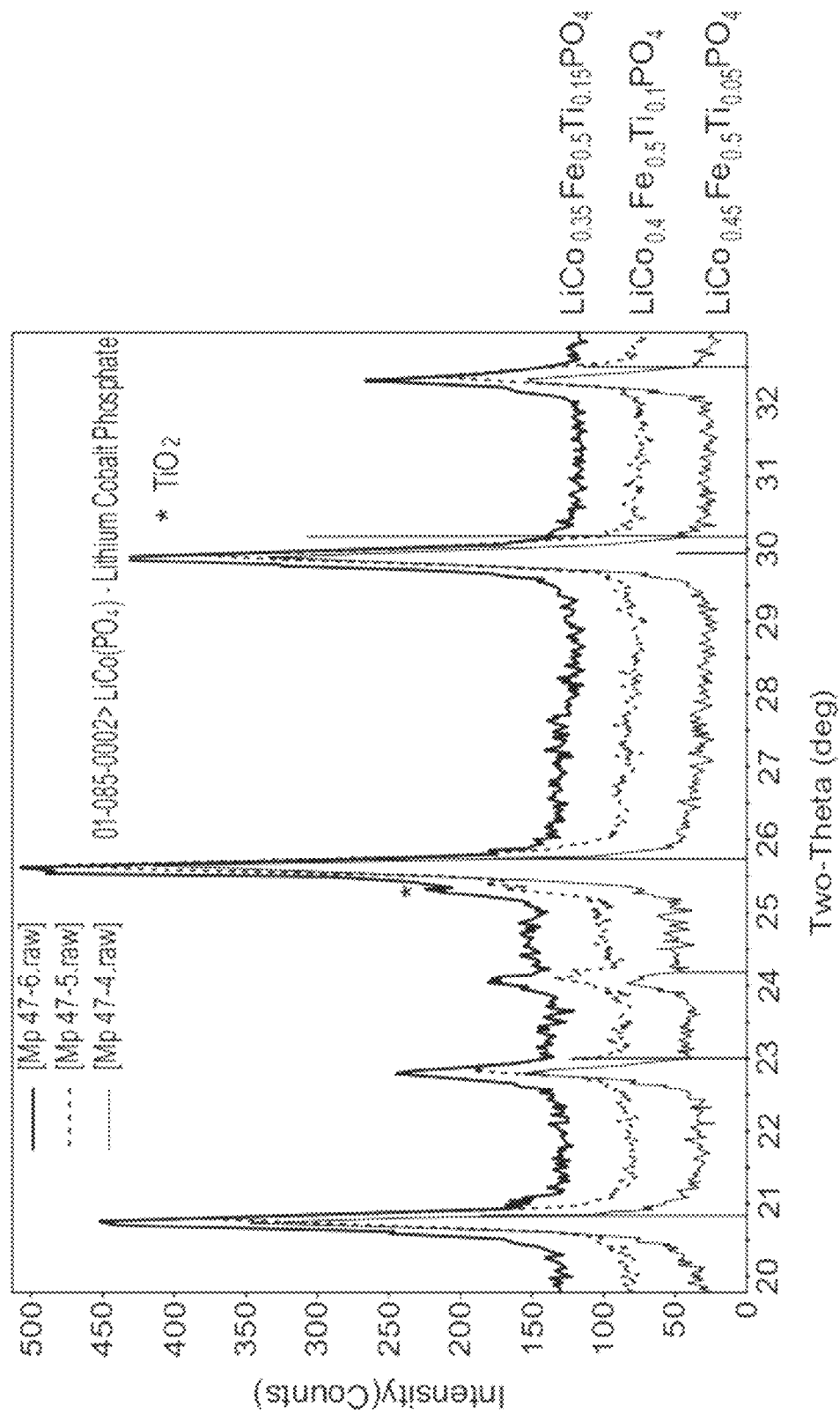
FIGS. 7a and 7b illustrate X-ray crystal structures for cobalt-rich phosphate materials having compositions comprising Li, Fe, Co, Ti, and $PO_4$ in various molar ratios. (See Example 8).
Figure 7B:
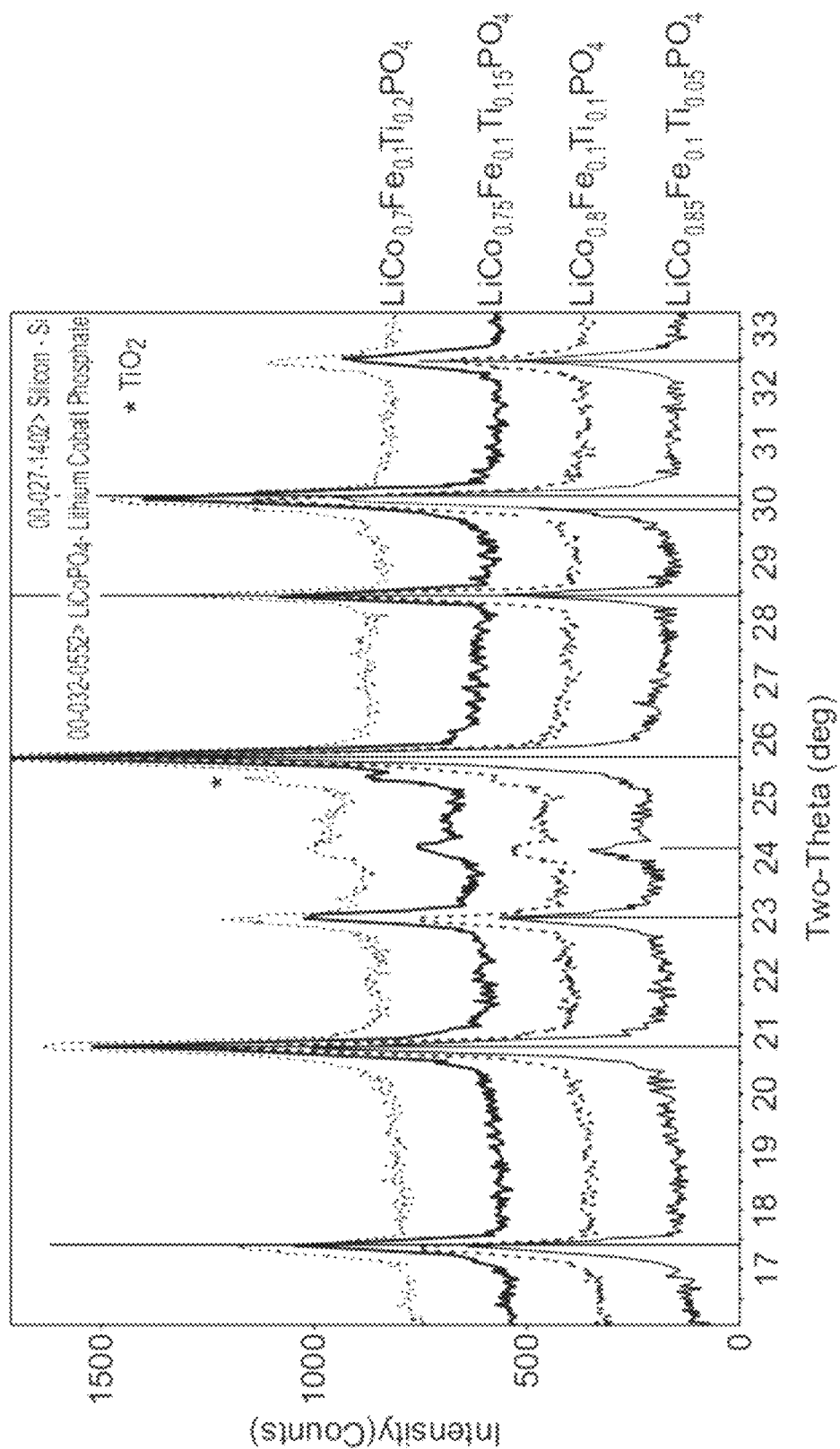

FIGS. 7a and 7b compare X-ray crystal structures for cobalt-rich phosphate materials doped with, or otherwise incorporating, titanium of embodiments of the present invention. The materials were formed using similar conditions as set forth in Examples 1 and 2. Major peaks can be indexed as LiCoPO$_4$, with a small shift to low two-θ (larger unit cell) at the (020) direction compared to LiCoPO$_4$, which can be attributed to Fe doping. A comparison of the structures shows that there is little or no apparent shift in position of the peaks with amount of titanium, and with little or no apparent change in unit cell size resulting from incorporation of titanium. Additionally, as titanium amount is increased to 0.1 or higher, a peak corresponding to a secondary phase of TiO$_2$ forms around 25.5 two-θ.

Figure 28:
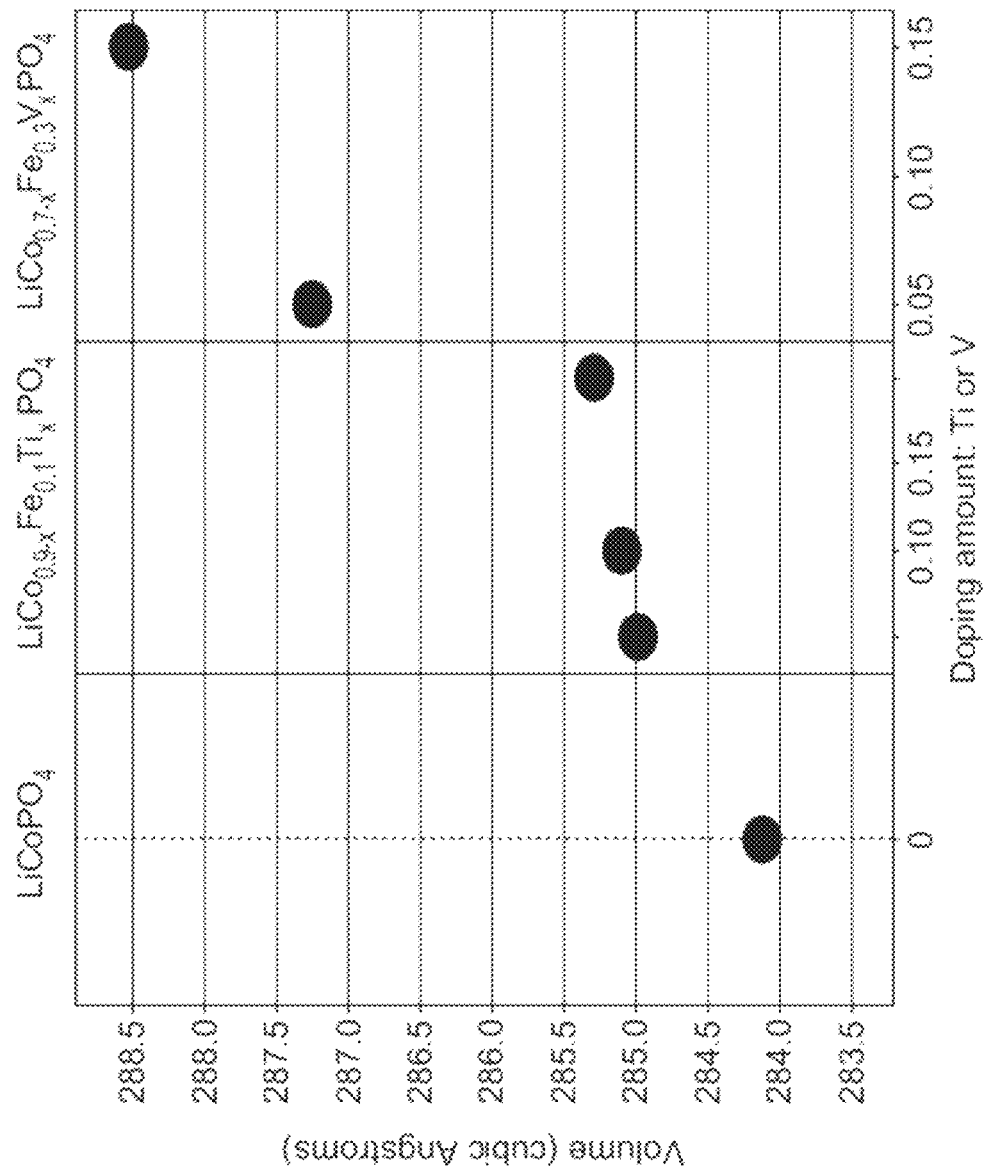
FIG. 28 illustrates unit cell volumes for cobalt-rich phosphate materials having a composition comprising Li, Fe, Co, Ti, and $PO_4$ and having a composition comprising Li, Fe, Co, V, and $PO_4$. A composition comprising $LiCoPO_4$ was evaluated as a control. (See Examples 8 AND 12).
Figure 29A:
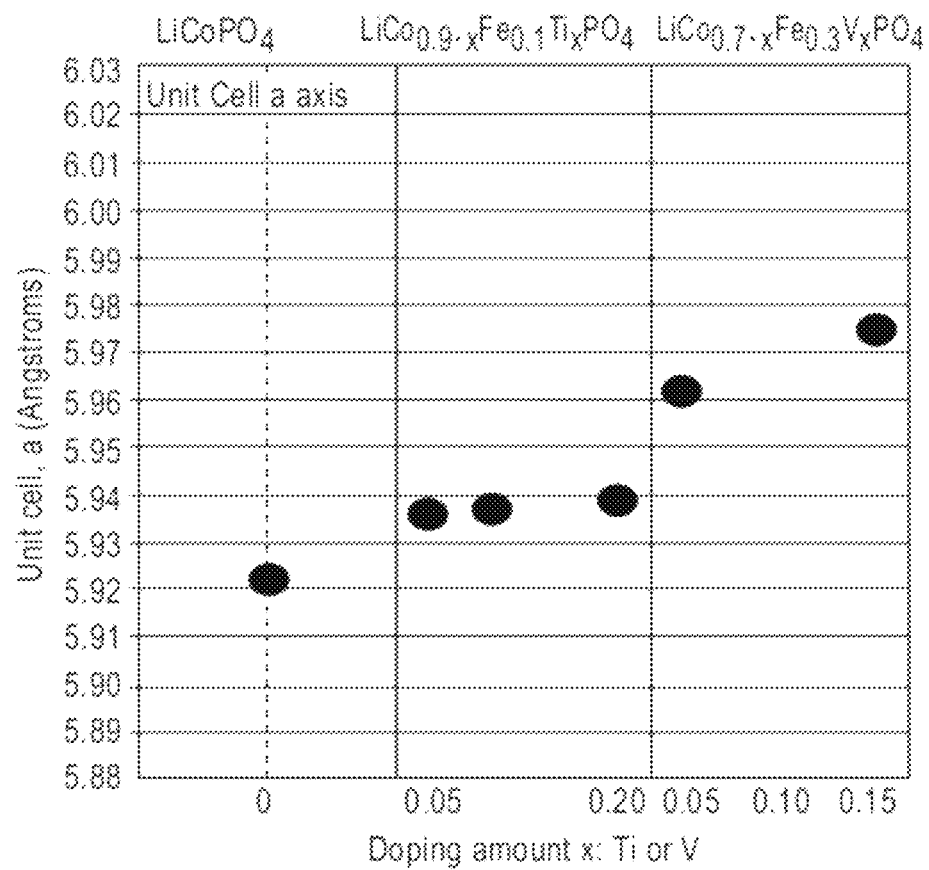
FIG. 29 illustrates unit cell sizes along the a axis (FIG. 29(a), left panel), the b axis (FIG. 29(b), middle panel), and the c axis (FIG. 29(c), right panel) for cobalt-rich phosphate materials having a composition comprising Li, Fe, Co, Ti, and $PO_4$ and having a composition comprising Li, Fe, Co, V, and $PO_4$. A composition comprising $LiCoPO_4$ was evaluated as a control. (See Examples 8 and 12).
Figure 29B:
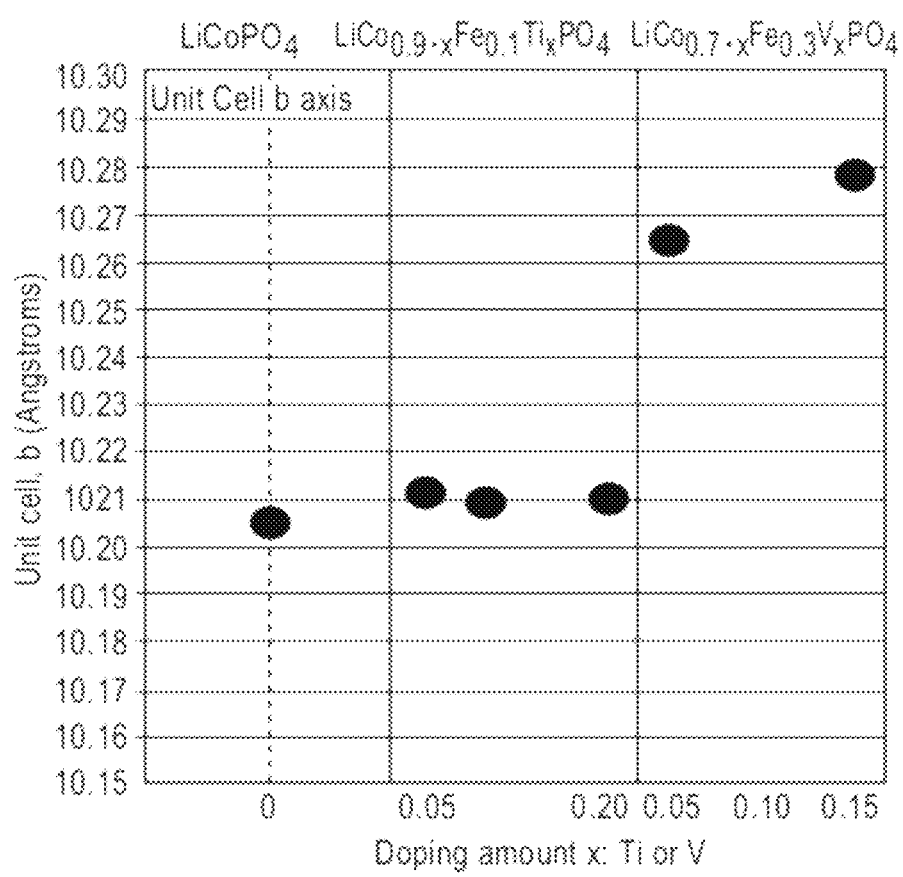
Figure 29C:
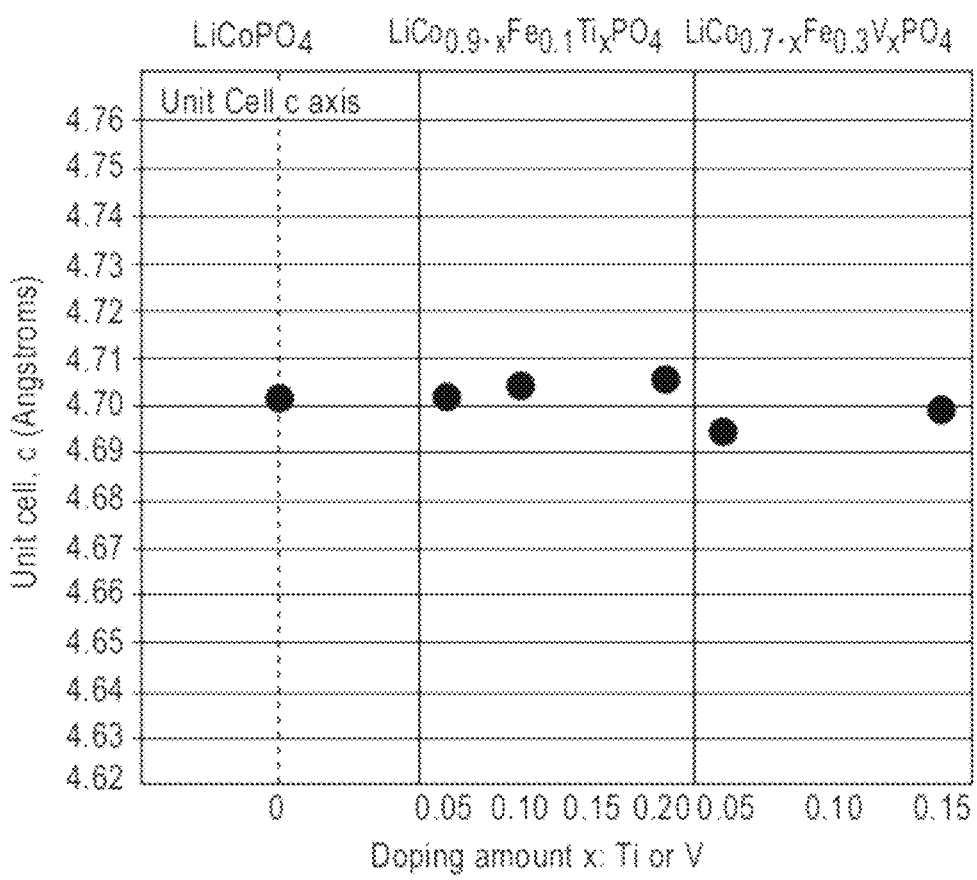

FIG. 28 and FIG. 29 illustrate unit cell sizes for cobalt-rich phosphate materials doped with, or otherwise incorporating, titanium of embodiments of the present invention. The materials were formed using similar conditions as set forth in Examples 1 and 2. Unit cell volumes are larger with Fe doping compared to $LiCoPO_4$ (about or greater than 285 Å$^3$ versus about 284 Å$^3$), as indicated in FIG. 28. A small unit cell volume increase is observed from Ti doping. Little or no apparent change in unit cell size is observed along the a axis, the b axis, and the c axis, as indicated in FIG. 29.

Example 9

FIGS. 8a and 8b illustrate ternary maps comparing (maximum) specific capacity (FIG. 8a, mAh/g) and (maximum) specific energy (FIG. 8b, Wh/kg) on 1$^{st}$ cycle as a function of cobalt, iron and vanadium ($V_2O_5$) in the cobalt-rich materials in an embodiment of the present invention. The cobalt-rich materials were formed using similar conditions as set forth in Examples 1 and 2. Fe amounts were varied from 0.0-0.5. Co amounts were varied from 0.35-0.95. V amounts were varied from 0.05-0.25.

Example 10

FIG. 9 illustrates Co-capacity on 1$^{st}$ cycle for cobalt-rich phosphate materials having compositions comprising Li, Fe, Co, V, and $PO_4$ with varying molar ratios, as indicated, of iron, cobalt, and vanadium. FIG. 10 illustrates (maximum) specific energy on 1$^{st}$ cycle for materials having compositions comprising Li, Fe, Co, V, and $PO_4$ with varying molar ratios, as indicated, of iron, cobalt, and vanadium (data indicated as circles). Corresponding compositions comprising Li, Fe, Co, and $PO_4$ (data indicated as triangles) were evaluated as controls. The materials were formed using similar conditions as set forth in Examples 1 and 2.

Example 11

FIG. 11 compares specific capacity (FIG. 11a) and specific energy (FIG. 11b) on 1$^{st}$ cycle for a variety of materials doped with, or otherwise incorporating, $V_2O_5$ in an embodiment of the present invention. The materials were formed using similar conditions as set forth in Examples 1 and 2. As can be seen from the graphs, small amounts of $V_2O_5$ improved both specific capacity and specific energy generally, with the amount of V at 0.1 yielding the largest improvements in specific capacity and specific energy within the tested ranges. Further, capacity at around 4.0 V correlates with a secondary phase of $Li_3V_2(PO_4)_3$ and increases with increasing $V_2O_5$.

Example 12

Figure 12B:
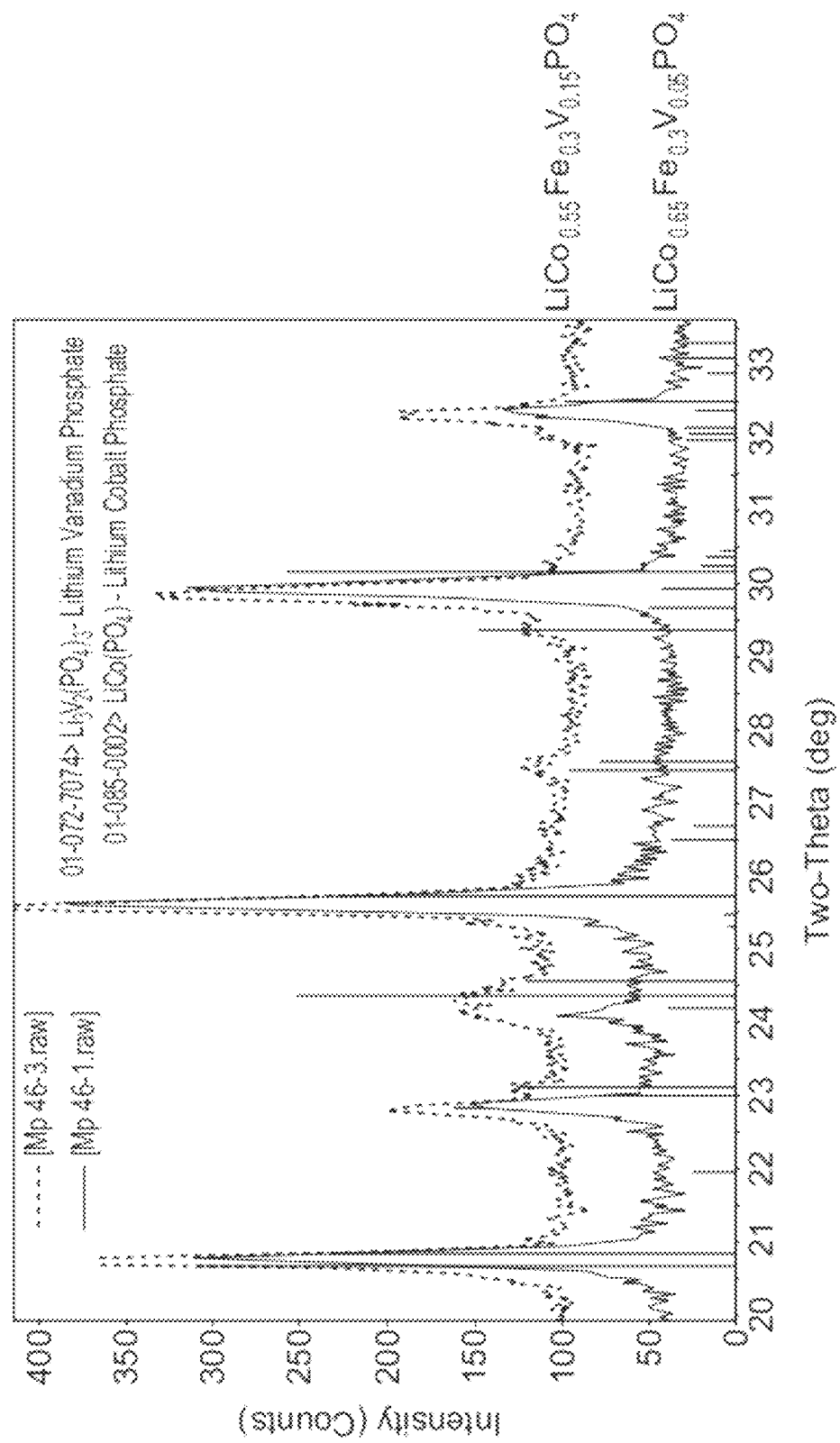

FIGS. 12a and 12b compare X-ray crystal structures for cobalt-rich phosphate materials doped with, or otherwise incorporating, vanadium of embodiments of the present invention. The materials were formed using similar conditions as set forth in Examples 1 and 2. Two phases are observed, including a phase that correlates to $LiCoPO_4$. A comparison of the structures shows that there is a secondary phase present in the material which correlates to $Li_3V_2(PO_4)_3$, and a shift in the crystallographic peaks to lower two-θ with increasing doping, indicative of an increase in unit cell size. The secondary phase is observed when V amounts is increased from 0.05 to 0.15, although the secondary phase also may be present at V amounts at or below 0.05.

FIG. 28 and FIG. 29 illustrate unit cell sizes for cobalt-rich phosphate materials doped with, or otherwise incorporating, vanadium of embodiments of the present invention. The materials were formed using similar conditions as set forth in Examples 1 and 2. Unit cell volumes are larger with Fe doping compared to $LiCoPO_4$, and a relatively large unit cell volume increase is observed from V doping (about or greater than 287 Å$^3$ versus about 284 Å$^3$ for $LiCoPO_4$), as indicated in FIG. 28. Relatively large changes in unit cell size are observed along the a axis and the b axis, with little change observed along the c axis, as indicated in FIG. 29.

Example 13

FIG. 13 illustrates that the presence of a second phase, $Li_3V_2(PO_4)_3$, in the cobalt-rich phosphate materials increases both specific capacity (FIG. 13a) and specific energy (FIG. 13b) on 1$^{st}$ cycle within the material. The materials were formed using similar conditions as set forth in Examples 1 and 2.

Example 14

FIG. 14 illustrate ternary maps comparing (maximum) specific capacity (FIG. 14a, mAh/g) and (maximum) specific energy (FIG. 14b, Wh/kg) on 1$^{st}$ cycle as a function of cobalt, iron and Nb ($Nb_2O_5$) in the cobalt-rich materials in an embodiment of the present invention. The cobalt-rich materials were formed using similar conditions as set forth in Examples 1 and 2. Fe amounts were varied from 0.0-0.5. Co amounts were varied from 0.35-0.95. Nb amounts were varied from 0.05-0.15.

Example 15

FIG. 15 illustrates Co-capacity on 1$^{st}$ cycle for cobalt-rich phosphate materials having compositions comprising Li, Fe, Co, Nb, and $PO_4$ with varying molar ratios, as indicated, of iron, cobalt, and niobium. The materials were formed using similar conditions as set forth in Examples 1 and 2.

Example 16

FIG. 16 compares specific capacity (FIG. 16a) and specific energy (FIG. 16b) on 1$^{st}$ cycle for a variety of materials doped with, or otherwise incorporating, $Nb_2O_5$ in an embodiment of the present invention. The materials were formed using similar conditions as set forth in Examples 1 and 2. As can be seen from the graphs, capacity and energy generally peaked with relatively small amounts of $Nb_2O_5$ doping (~0.05).

Example 17

FIG. 17 illustrates Co-capacity on 1$^{st}$ cycle for cobalt-rich phosphate materials doped with, or otherwise incorporating, $Y_2O_3$ and $ZrO_2$ as compared to no doping. The materials were formed using similar conditions as set forth in Examples 1 and 2. The graph shows that Co-capacity improves with the presence of both $Y_2O_3$ and $ZrO_2$.

Example 18

Stoichiometric ratios of LiOH, $Co(OH)_2$, $FeC_2O_4 \cdot 2H_2O$, $NH_4H_2PO_4$, $TiO_2$, and carbon-based additive (Super P Li or KJ600) were added into a reaction tank along with 1842 g of 5 mm diameter chrome steel ball bearings. The total mass of materials was 42.2 g for at least one set of measurements. The tank was sealed, removed from glove box, attached to an attritor mill and milled at 600 rpm for 6 h. The milled precursors were heated to 700° C. at 5° C./min for 18 h under $N_2$ flow, and finally cooled to room temperature at 4° C./min. The stoichiometric ratios were varied to include different amounts of Li and carbon, and included $LiOH:FeC_2O_4.2H_2O:Co(OH)_2:NH_4H_2PO_4:TiO_2=1.05:0.1:0.8:1:0.1$ with 5 wt % carbon-based additive. The batteries were assembled in a high purity argon filled glove box (M-Braun, $O_2$ and humidity contents <0.1 ppm). Samples of powder were formulated into slurries with poly(vinylidene fluoride) (Sigma-Aldrich) and Super P Li (TIMCAL, 85:7.5:7.5) in 1-methyl-2-pyrrolidinone (Sigma-Aldrich, anhydrous, 99.5%), and were deposited and dried on aluminum current collectors prior to battery assembly. Cells were made using lithium or graphite as an anode, glass fiber filters (Millipore) or Cellguard 2400 as separators, and electrolyte including 1M $LiPF_6$ in a EC:EMC=1:2 solution or with 2 wt % TTSP additives. Cells were cycled at room temperature from 2.0 V to 4.95 V with different rates: C/20 (based on theoretical capacity of 150 mAh/g or with 1C corresponding to 150 mA/g) for both charge and discharge on $1^{st}$ cycle from $3^{rd}$ cycle both charging and discharging rates are 1C. The $2^{nd}$ cycle was rate testing and the testing protocol was: charging at 1C, OCV (0.5 h), then 0.5C, OCV (0.5 h), then 0.1C, OCV (0.5 h), then 0.05C, OCV (0.5 h) and discharging at 1C, OCV (0.5 h), then 0.5C, OCV (0.5 h), then 0.1C, OCV (0.5 h), then 0.05C, OCV (0.5 h).

FIGS. 19(a) and 19(b) illustrates specific capacity (circles) and specific energy (squares) on $1^{st}$ cycle based on weight of active material only (FIG. 19(a)) and based on combined weight of active material and carbon-based additive (FIG. 19(b)), as a function of amount of Li and with 3 wt % carbon-based additive. As a comparison, FIGS. 19(a) and 19(b) also illustrates corresponding specific capacity and specific energy without excess Li (namely, with a stoichiometric ratio of Li corresponding to 1) and with 18 wt % carbon-based additive. As can be appreciated for 3 wt % carbon-based additive, the inclusion of excess Li improved both specific capacity and specific energy, yielding a peak in values at about Li=1.05 and tailing off for higher amounts of Li for the tested range. Also, in terms of the combined weight of the active material and the carbon-based additive, the inclusion of the lower amount of carbon-based additive at 3 wt % yielded significant improvements in both specific capacity and specific energy at the whole cell level, relative to the inclusion of the higher amount of carbon-based additive at 18 wt %.

FIG. 20(a) compares capacity retention with and without excess Li over several cycles, expressed in terms of a percentage of an initial discharge capacity retained at a particular cycle and based on cycling at C/20 with 3 wt % carbon-based additive (KJ600). As can be appreciated, the inclusion of excess Li improved cycle life, retaining at least about 85% of the initial discharge capacity after 100 cycles (compared to about 75% without excess Li), and retaining at least about 75% of the initial discharge capacity after 200 cycles (compared to about 62% without excess Li). FIG. 20(b) compares rate capability with and without excess Li, expressed in terms of a percentage of a low rate discharge capacity (namely at C/20) retained as a function of discharge rate. Measurements were made using signature quick rate tests to obtain a series of specific capacity at various discharge rates. The procedure involved carrying out successive discharges of the cell to a cutoff potential, starting with the highest rate and followed by successively decreasing rates. Each subsequent discharge was preceded by a brief relaxation period without a preceding charging period. As can be appreciated, the inclusion of excess Li also improved rate capability, retaining at least about 89.5% of the low rate discharge capacity at a rate of 1 C (compared to about 88% without excess Li).

Figure 21:
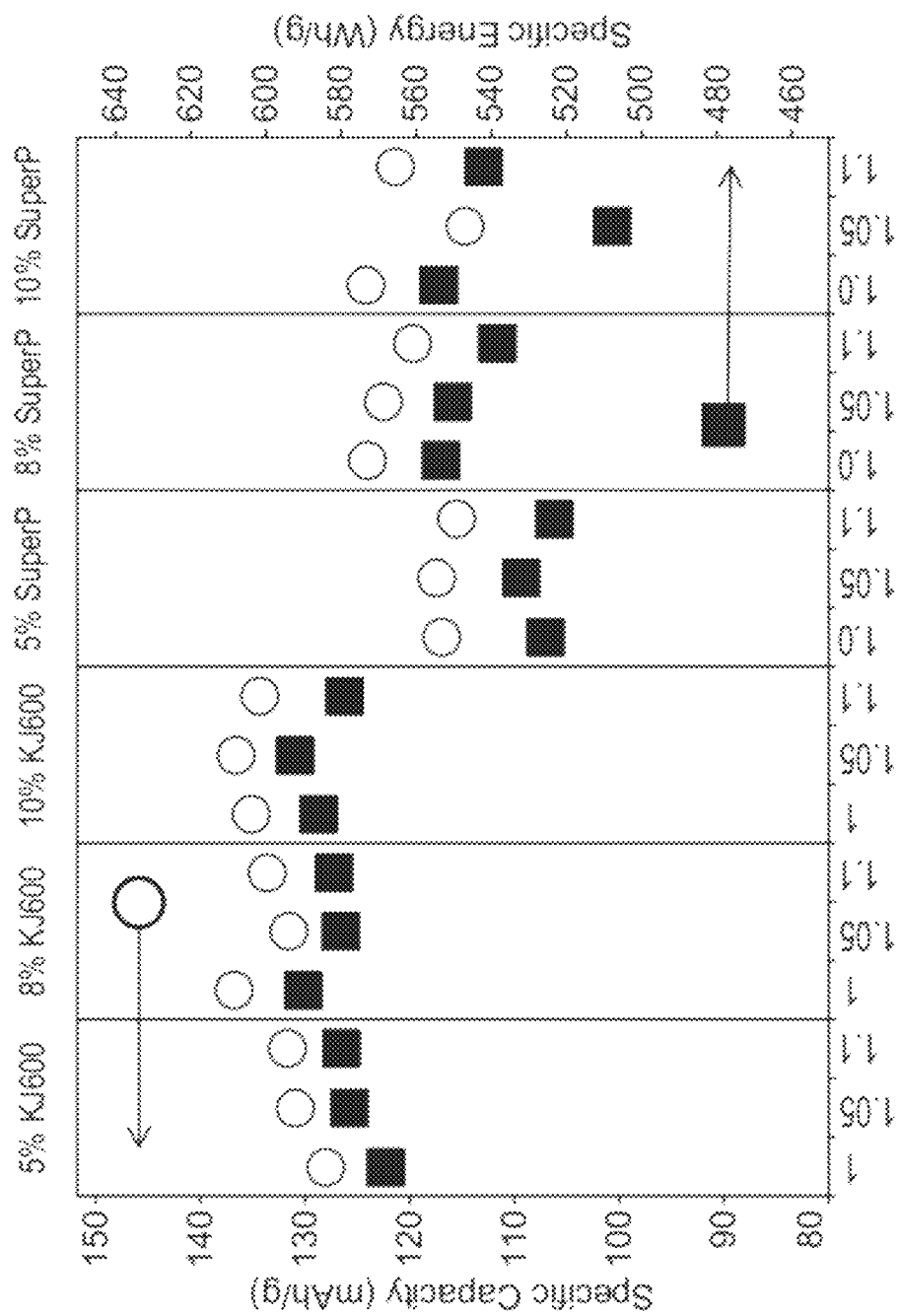
FIG. 21 illustrates (maximum) specific capacity (circles) and (maximum) specific energy (squares) on first cycle based on weight of active material only, as a function of various relative molar amounts of Li and with 5 wt % carbon-based additive, 8 wt % carbon-based additive, or 10 wt % carbon-based additive of SuperP or KJ600, as indicated. In each case, the active materials were the compositions comprising Li (in various relative molar amounts, as indicated), Fe, Co, Ti, and $PO_4$. (See Example 18).

FIG. 21 illustrates specific capacity (circles) and specific energy (squares) on $1^{st}$ cycle based on weight of active material only, as a function of amount of Li and as a function of amount and type of carbon-based additive. As can be appreciated, the inclusion of the higher surface area KJ600 carbon-based additive generally yielded superior performance in terms of specific capacity and specific energy, relative to the Super P Li carbon-based additive. Also, the effect of excess Li on specific capacity and specific energy was observed to depend on the amount and the type of carbon-based additive. For example, at a relatively low amount of 5 wt % of the KJ600 carbon-based additive, the inclusion of excess Li improved both specific capacity and specific energy, while, at higher amounts of the KJ600 carbon-based additive, the inclusion of excess Li sometimes yielded no significant change or a reduction in specific capacity and specific energy. In the case of the Super P Li carbon-based additive, the inclusion of excess Li yielded no significant change or a reduction in specific capacity and specific energy. This behavior indicates a potential synergistic effect as between the amount of Li and the amount and type of carbon-based additive and, in particular, a potential synergistic effect as between excess Li and reduced carbon content that yields improved performance. Improvements in performance at reduced carbon content are further magnified when specific capacity and specific energy are expressed in terms of a combined weight of active material and carbon-based additive.

Figure 22:
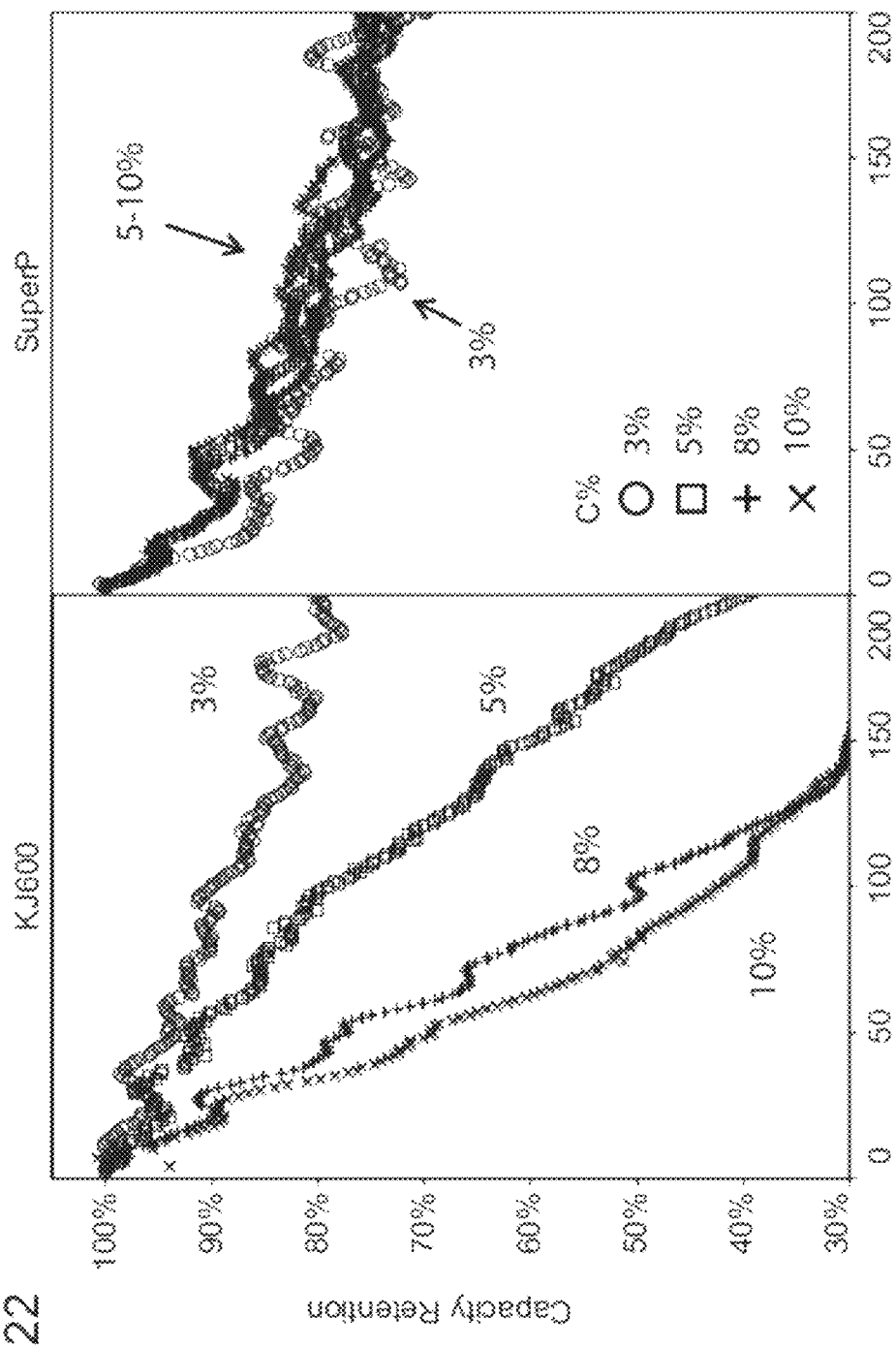
FIG. 22 compares capacity retention, determined as (maximum) specific capacity as a function of number of cycles (normalized on a percentage basis to the (maximum) specific capacity determined for the $3^{rd}$ cycle), for materials having various amounts of carbon-based additives, in terms of wt % of KJ600 (FIG. 22(a), left panel) and SuperP (FIG. 22(b), right panel), as indicated. In each case, the active materials were cobalt-rich phosphate materials having a composition comprising Li, Fe, Co, Ti, and $PO_4$ in relative molar ratios of 1.05:0.1:0.8:0.1:1, respectively. (See Example 18).

FIG. 22 (left) compares capacity retention at different amounts of the KJ600 carbon-based additive over several cycles, and FIG. 22 (right) compares capacity retention at different amounts of the Super P Li carbon-based additive over several cycles, expressed in terms of a percentage of an initial discharge capacity retained at a particular cycle. Measurements were carried out by cycling $Li_{1.05}Co_{0.8}Fe_{0.1}Ti_{0.1}PO_4$ cathode//mesocarbon microbeads anode full cells at C/20. In the case of the KJ600 carbon-based additive, reducing an amount of the carbon-based additive improved cycle life, with the inclusion of 3 wt % of the carbon-based additive retaining about 90% of the initial discharge capacity after 100 cycles (compared to about 80% at 5 wt % of the carbon-based additive and about 50% at 8 wt % of the carbon-based additive), and with the inclusion of 3 wt % of the carbon-based additive retaining at least about 80% of the initial discharge capacity after 200 cycles (compared to about 40% at 5 wt % of the carbon-based additive and less than 30% at 8 wt % of the carbon-based additive). In the case of the Super P Li carbon-based additive, varying the amount of the carbon-based additive did not yield a significant change in cycle life.

Figure 23:
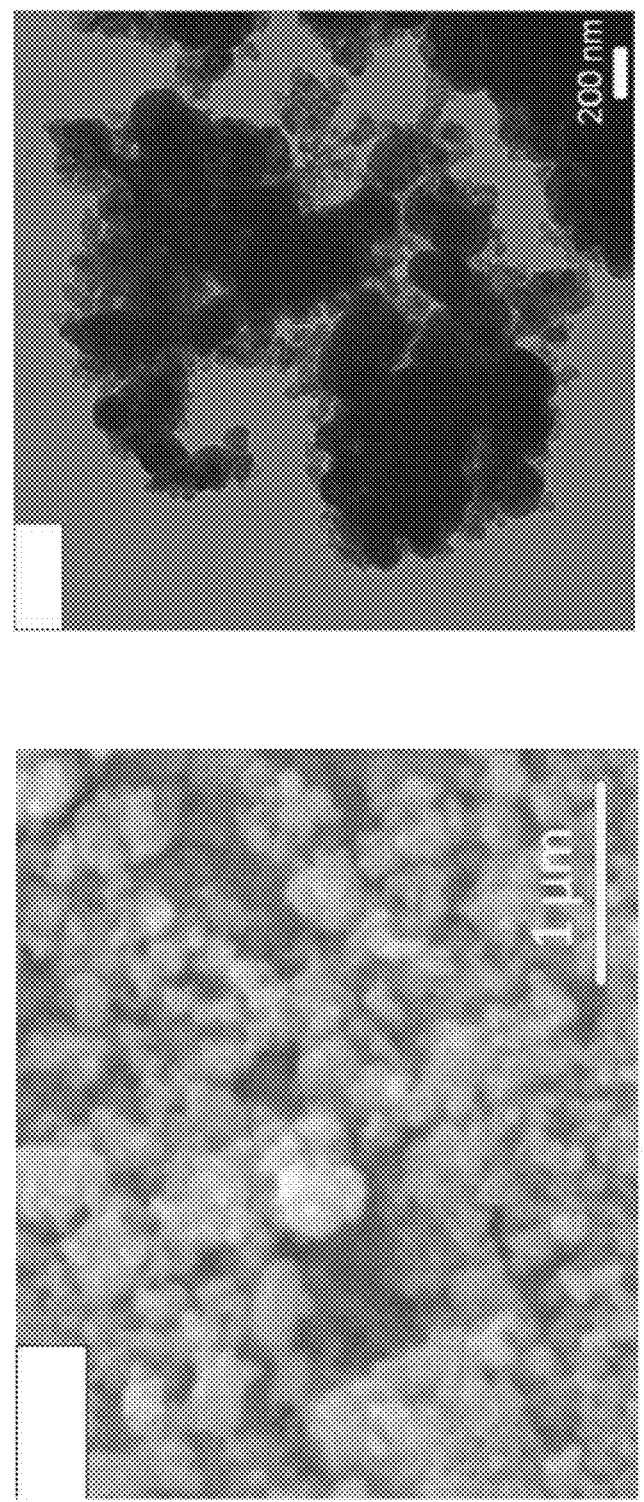
FIG. 23 illustrates a scanning electron microscope image (FIG. 23(a), left panel) and a transmission electron microscope image (FIG. 23(b), right panel) of a cobalt-rich phosphate material, having a composition comprising Li, Fe, Co, Ti, and $PO_4$ in relative molar ratios of 1.05:0.1:0.8:0.1:1, respectively, coated with a carbon-based additive. (See Example 18).

FIG. 23 illustrates a scanning electron microscope image (left) and a transmission electron microscope image (right) of a $Li_{1.05}Co_{0.8}Fe_{0.1}Ti_{0.1}PO_4$ cathode material coated with a carbon-based additive. As can be appreciated, particles of the cathode material are in the sub-micron range, and these particles, either individually or aggregated as clusters, are coated with smaller sized particles of the carbon-based additive.

Example 19

Figure 24:
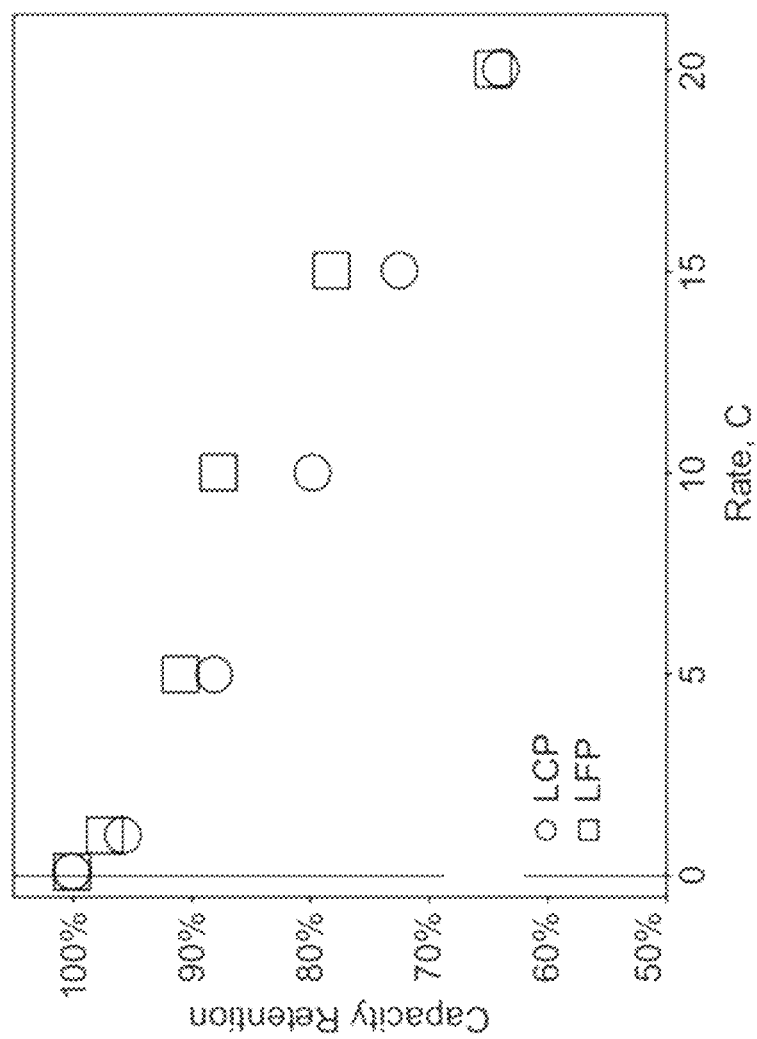
FIG. 24 demonstrates rate capability, by illustration of capacity retention as a function of current for a cobalt-rich phosphate material having a composition comprising Li, Fe, Co, Ti, and $PO_4$ in relative molar ratios of 1.05:0.1:0.8:0.1:1, respectively (data labeled as "LCP") as measured under high rate assay conditions upon discharge at the indicated rate from 4.9 V to 2.0 V. A $LiFePO_4$ composition was evaluated as a control (data labeled as "LFP"). "Rate (C)" refers to the discharge current as a fraction or multiple relative to a "1 C" current value under which the battery (in a substantially fully charged state) would substantially fully discharge in one hour. For this data and for this particular cell configuration, the "1C" current value was about 140 mA/g. (See Example 19).

FIG. 24 compares capacity retention as a function of current for a cobalt-rich phosphate material of an embodiment of the present invention (labeled as LCP), relative to $LiFePO_4$ (labeled as LFP). The cobalt-rich phosphate material is represented as $Li_{1.05}Co_{0.8}Fe_{0.1}Ti_{0.1}PO_4$, and was formed using similar conditions as set forth in Examples 1 and 2. Measurements were carried out by cycling $Li_{1.05}Co_{0.8}Fe_{0.1}Ti_{0.1}PO_4$// Li metal half cells at room temperature under high rate assay conditions between 4.9 V and 2.0 V. Specifically, in a $1^{st}$ cycle, charging was carried out at a rate of 0.1 C, followed by applying a constant voltage of 4.9 V until the current dropped to a value corresponding to 0.05 C and an open circuit period of about 10 minutes, and discharging was carried out at a rate of 0.1 C, followed by an open circuit period of about 10 minutes. In a $2^{nd}$ cycle, charging was carried out at a rate of 0.2 C, followed by applying a constant voltage of 4.9 V until the current dropped to a value corresponding to 0.05 C and an open circuit period of about 10 minutes, and discharging was carried out at a rate of 1 C, followed by an open circuit period of about 10 minutes. In a $3^{rd}$ cycle, charging was carried out at a rate of 0.2 C, followed by applying a constant voltage of 4.9 V until the current dropped to a value corresponding to 0.05 C and an open circuit period of about 10 minutes, and discharging was carried out at a rate of 5 C, followed by an open circuit period of about 10 minutes. In a $4^{th}$ cycle, charging was carried out at a rate of 0.2 C, followed by applying a constant voltage of 4.9 V until the current dropped to a value corresponding to 0.05 C and an open circuit period of about 10 minutes, and discharging was carried out at a rate of 10 C, followed by an open circuit period of about 10 minutes. In a $5^{th}$ cycle, charging was carried out at a rate of 0.2 C, followed by applying a constant voltage of 4.9 V until the current dropped to a value corresponding to 0.05 C and an open circuit period of about 10 minutes, and discharging was carried out at a rate of 15 C, followed by an open circuit period of about 10 minutes. In a $6^{th}$ cycle, charging was carried out at a rate of 0.2 C, followed by applying a constant voltage of 4.9 V until the current dropped to a value corresponding to 0.05 C and an open circuit period of about 10 minutes, and discharging was carried out at a rate of 20 C, followed by an open circuit period of about 10 minutes. As can be appreciated, the rate capability of the cobalt-rich phosphate material is at least comparable to $LiFePO_4$, while providing improvements in other battery properties over $LiFePO_4$.

Example 20

Synthesis of a cobalt-rich phosphate material was carried out using an alternative set of precursors (LiOH, $CoCO_3$, $FeC_2O_4.2H_2O$, $LiH_2PO_4$, and $TiO_2$), and resulting battery properties were compared to those using a previous, first set of precursors (LiOH, $Co(OH)_2$, $FeC_2O_4.2H_2O$, $NH_4H_2PO_4$, and $TiO_2$) as set forth in Examples 1, 2, and 18. Stoichiometric ratios of LiOH, $CoCO_3$, $FeC_2O_4.2H_2O$, $LiH_2PO_4$, $TiO_2$, and carbon-based additive (Super P Li or KJ600) were added into a reaction tank along with 1842 g of 5 mm diameter chrome steel ball bearings. The total mass of materials was 42.2 g for at least one set of measurements. The tank was sealed, removed from glove box, attached to an attritor mill and milled at 600 rpm for 6 h. The milled precursors were heated to 700° C. at 5° C./min for 18 h under $N_2$ flow, and finally cooled to room temperature at 5° C./min. The stoichiometric ratios included $LiOH:FeC_2O_4.2H_2O:CoCO_3$: $LiH_2PO_4:TiO_2$=0.05:0.1:0.8:1.0:0.1 with 5 wt % carbon-based additive. The batteries were assembled in a high purity argon filled glove box (M-Braun, $O_2$ and humidity contents <0.1 ppm). Samples of powder were formulated into slurries with poly(vinylidene fluoride) (Sigma-Aldrich) and Super P Li (TIMCAL, 85:7.5:7.5) in 1-methyl-2-pyrrolidinone (Sigma-Aldrich, anhydrous, 99.5%), and were deposited and dried on aluminum current collectors prior to battery assembly. Cells were made using graphite as an anode, glass fiber filters (Millipore) as separators, and electrolyte including 1M $LiPF_6$ in a EC:EMC=1:2 solution. Cells were cycled at room temperature from 2.0 V to 4.95 V with different rates: C/20 (based on theoretical capacity of 150 mAh/g or with 1 C corresponding to 150 mA/g) for both charge and discharge on $1^{st}$ cycle, and 1 C for later cycling.

Figure 25:
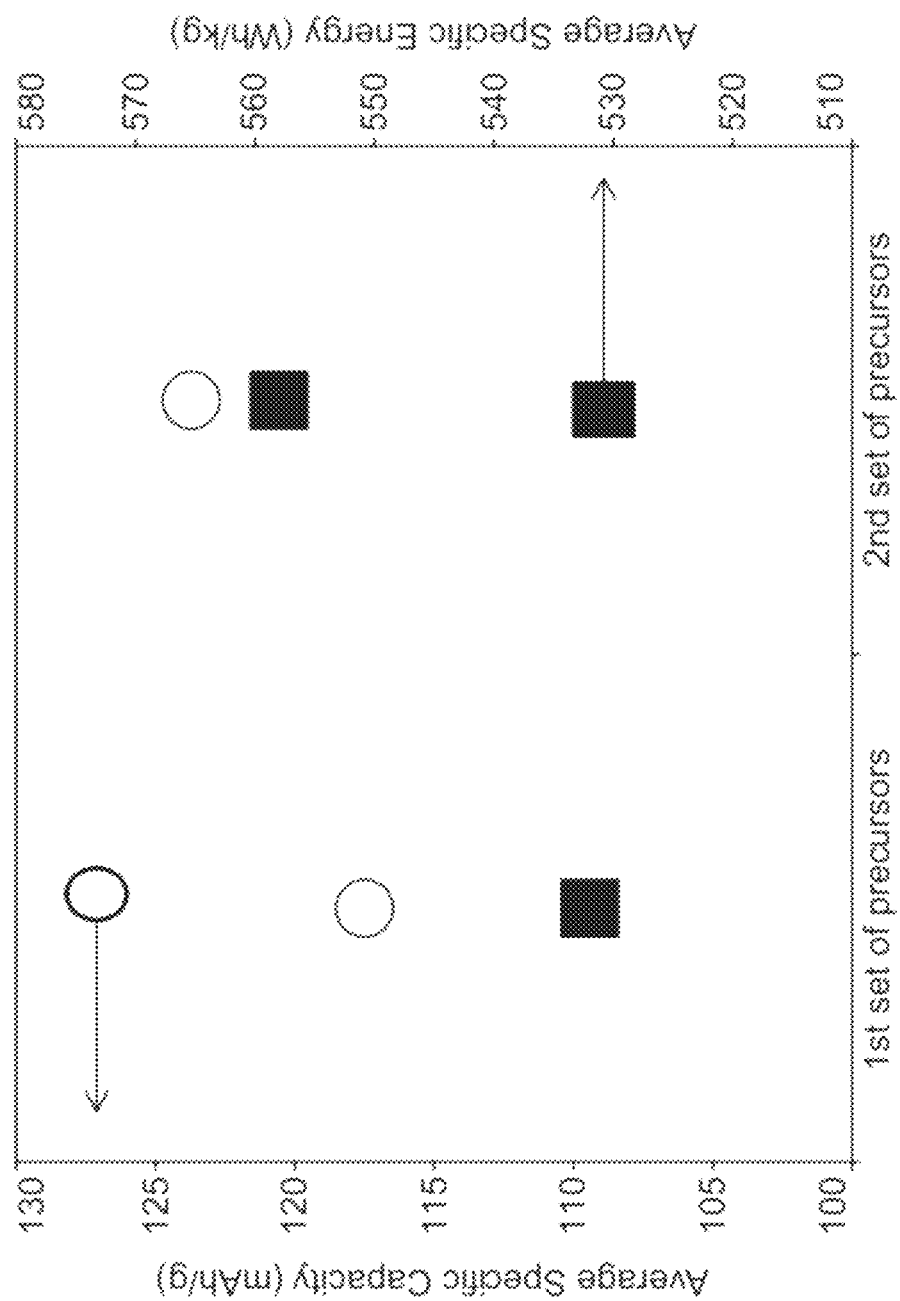
FIG. 25 illustrates the average value (across multiple samples) of first cycle (maximum) specific capacity (data indicated as closed ovals) and average value (across multiple samples) of first cycle (maximum) specific energy (data indicated as open ovals) of cobalt-rich phosphate materials having a composition comprising Li, Fe, Co, Ti, and $PO_4$ in relative molar ratios of 1.05:0.1:0.8:0.1:1, respectively, synthesized using different sets of precursors, including as indicated, a (previous) first set of precursors—LiOH, $Co(OH)_2$, $FeC_2O_4.2H_2O$, $NH_4H_2PO_4$, and $TiO_2$ and an (alternative) second set of precursors—LiOH, $CoCO_3$, $FeC_2O_4.2H_2O$, $LiH_2PO_4$, and $TiO_2$. (See Example 20).
Figure 26:
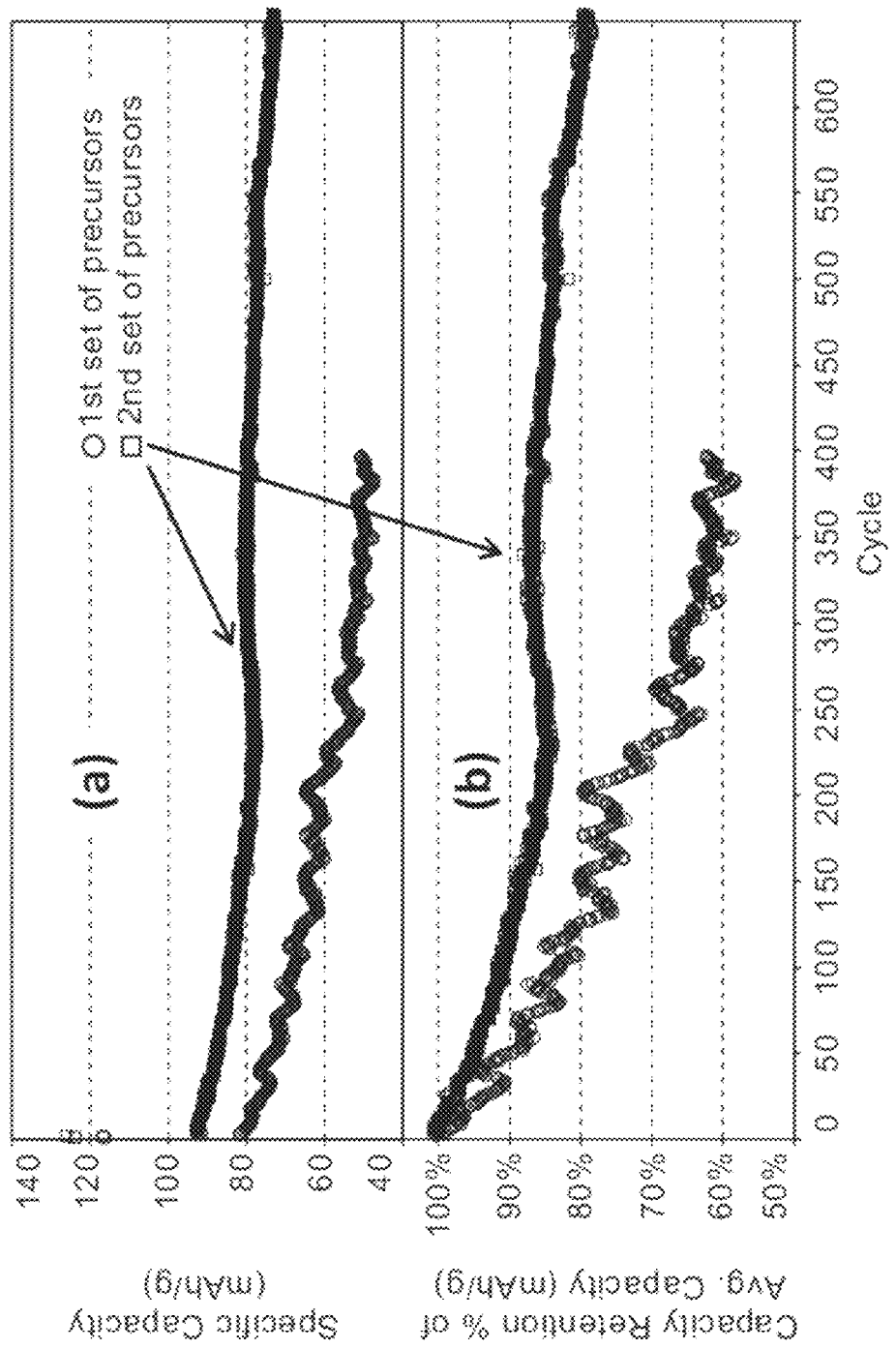
FIG. 26 illustrates (maximum) specific capacity (FIG. 26(a), top panel) and capacity retention (FIG. 26(b), bottom panel), in each case as a function of number of cycles, for cobalt-rich phosphate materials having a composition comprising Li, Fe, Co, Ti, and $PO_4$ in relative molar ratios of 1.05:0.1:0.8:0.1:1, respectively, synthesized using different sets of precursors, including as indicated, a (previous) first set of precursors—LiOH, $Co(OH)_2$, $FeC_2O_4.2H_2O$, $NH_4H_2PO_4$, and $TiO_2$ and an (alternative) second set of precursors— LiOH, $CoCO_3$, $FeC_2O_4.2H_2O$, $LiH_2PO_4$, and $TiO_2$. Capacity retention was determined as the (maximum) specific capacity for a particular cycle normalized on a percentage basis relative to the (maximum) specific capacity determined for an initial cycle. (See Example 20).

FIG. 25 compares $1^{st}$ cycle specific capacity and specific energy of materials synthesized using the alternative set of precursors and the previous set of precursors, and FIG. 26 compares specific capacity and capacity retention of the materials synthesized using the alternative set of precursors and the previous set of precursors. The stoichiometric ratios of $Li:Co:Fe:Ti:PO_4$ were 1.05:0.8:0.1:0.1:1 for both materials, and results are expressed based on weight of active material only. Using the alternative set of precursors, specific energy increased from about 532 Wh/kg to about 556 Wh/kg, and specific capacity increased from about 118 mAh/g to about 123 mAh/g. Using the alternative set of precursors, capacity retention increased from about 65% to about 87% at 300 cycles and remained above 80% until 650 cycles, and specific capacity at 1 C also increased in comparison with the material synthesized using the previous set of precursors.

Example 21

Synthesis of an oxide coated cobalt-rich phosphate material was carried out, and resulting battery properties were compared to the same uncoated electrode materials. Stoichiometric ratios of LiOH, $CoCO_3$, $FeC_2O_4.2H_2O$, etc., were added into a reaction tank along with 1842 g of 5 mm diameter chrome steel ball bearings. The total mass of materials was 42.2 g for at least one set of measurements. The tank was sealed, removed from glove box, attached to an attritor mill and milled at 600 rpm for 3 h. The milled precursors were heated to 700° C. at 5° C./min for 18 h under $N_2$ flow (19 L/min), and finally cooled to room temperature at 5° C./min. Oxide precursors (Tetraethyl orthosilicate (TEOS) for $SiO_2$, Zirconium(IV) propoxide solution 70% for $ZrO_2$, Aluminum isopropoxide for $Al_2O_3$, Titanium(IV) isopropoxide for $TiO_2$) were added to the above prepared electrode materials along with 5 mL iso-propanol in a glove box. The percentage of oxides corresponding to the initial precursor loadings were calculated based on 100% transfer from the precursors to the oxides. For example, for coating 0.15%, 0.25%, 0.5%, 1%, 2% and 5 wt % $SiO_2$ onto 600 mg electrode materials, approximately 0.9, 1.5, 3.1, 6.1, 12.2 and 31.6 mg oxides, respectively, were used. The tank was sealed, removed from glove box, attached to an attritor mill and milled at 600 rpm for 3 h. After milling, the mixtures were first dried under vacuum at 70-100° C. for 2 hours, and then transferred to $N_2$ filled glove box. The milled and dried precursors were heated to 500° C. at 5° C./min for 12 h under $N_2$ flow, and finally cooled to room temperature at 5° C./min. In some tests, a broad annealing temperature ranging from 350 to 800° C. were used and coated phosphate battery materials annealed in the range of 400-500° C. were found to show improved cycle life and capacity retention when compared to the control (i.e., uncoated battery materials).

Figure 30:
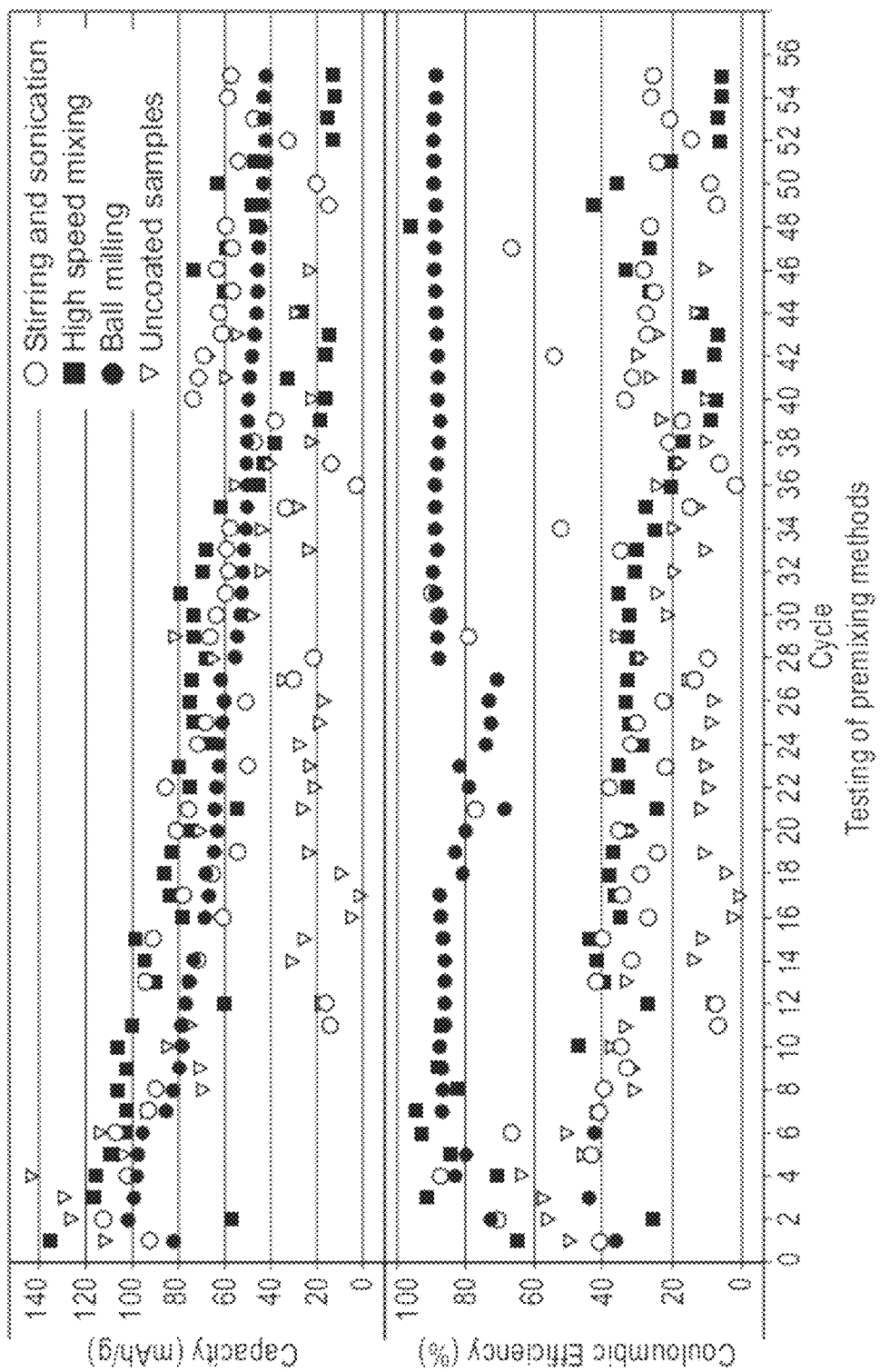
FIG. 30 illustrates a comparison of several mixing methods for preparing the precursors for oxide coated electrode materials.
Figure 31:
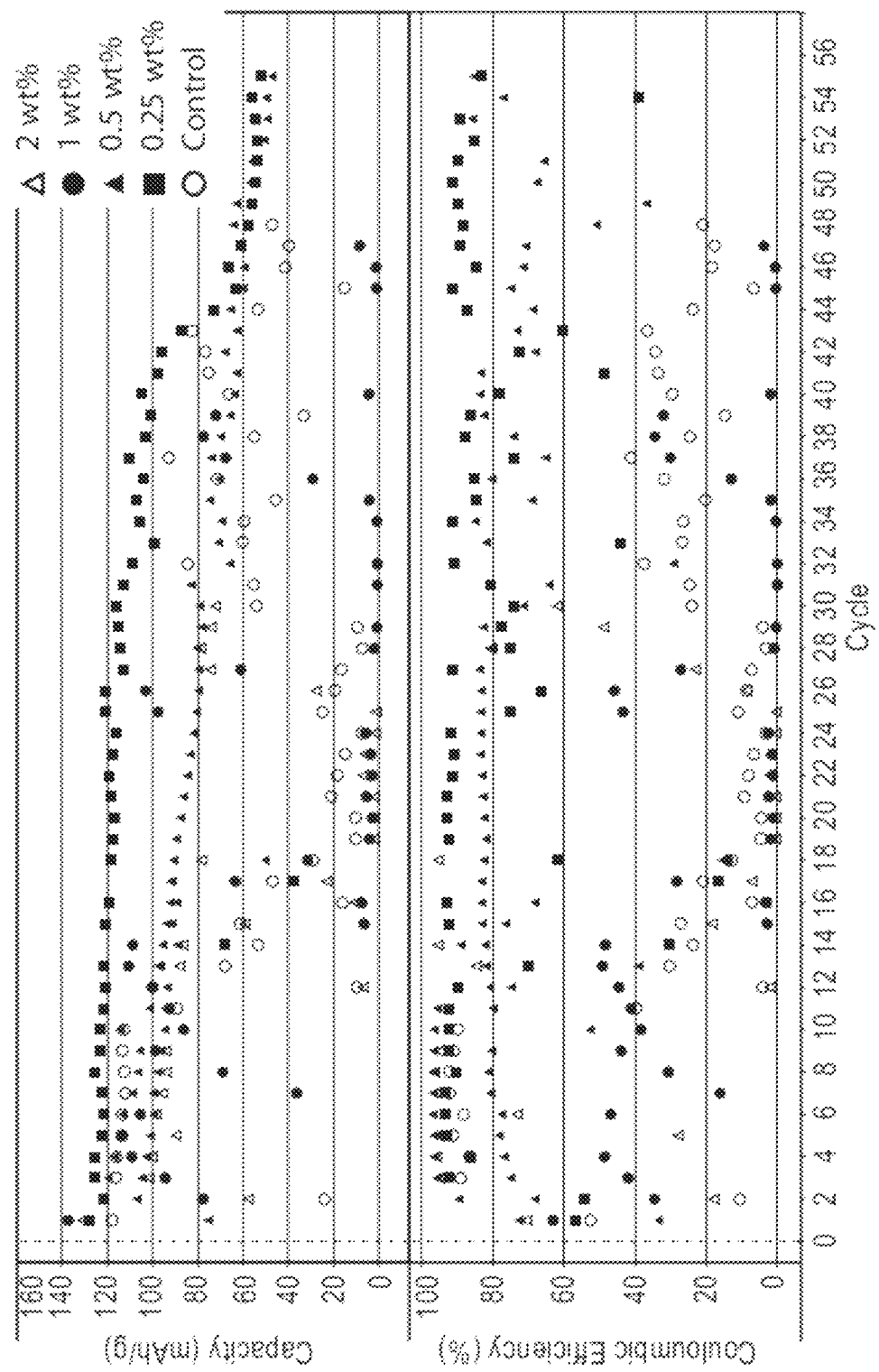
FIG. 31 illustrates a testing of coating per weight percentage.

The batteries were assembled in a high purity argon filled glove box (M-Braun, $O_2$ and humidity contents <0.1 ppm). Samples of powder were formulated into slurries with poly (vinylidene fluoride) (Sigma-Aldrich) and Super P Li (TIMCAL, 85:7.5:7.5) in 1-methyl-2-pyrrolidinone (Sigma-Aldrich, anhydrous, 99.5%), and were deposited and dried on aluminum current collectors prior to battery assembly. Cells were made using lithium as an anode, glass fiber filters (Millipore) as separators, and electrolyte including 1M $LiPF_6$ in a EC:EMC=1:2 solution. Cells were cycled at room temperature from 2.0 V to 4.95 V with different rates: C/20 (based on theoretical capacity of 150 mAh/g or with 1 C corresponding to 150 mA/g) for both charge and discharge on $1^{st}$ cycle, and 1 C for later cycling FIG. 30 compares several mixing methods for preparing the precursors for the later annealing process. Due to the cell operation at high voltage up to 4.95 V and therefore the severe electrolyte decomposition, the electrochemical performance (capacity and Couloumbic efficiency) varies from well-to-well. As shown, the coated samples prepared by ball milling have the least variability in well-to-well performance. These samples also had substantially continuous capacity degradation and the Couloumbic efficiency is consistently higher after 55 cycles. These tests indicate that ball milling provides an additional layer of protection on the electrode materials and improved electrochemical stability.

Figure 32:
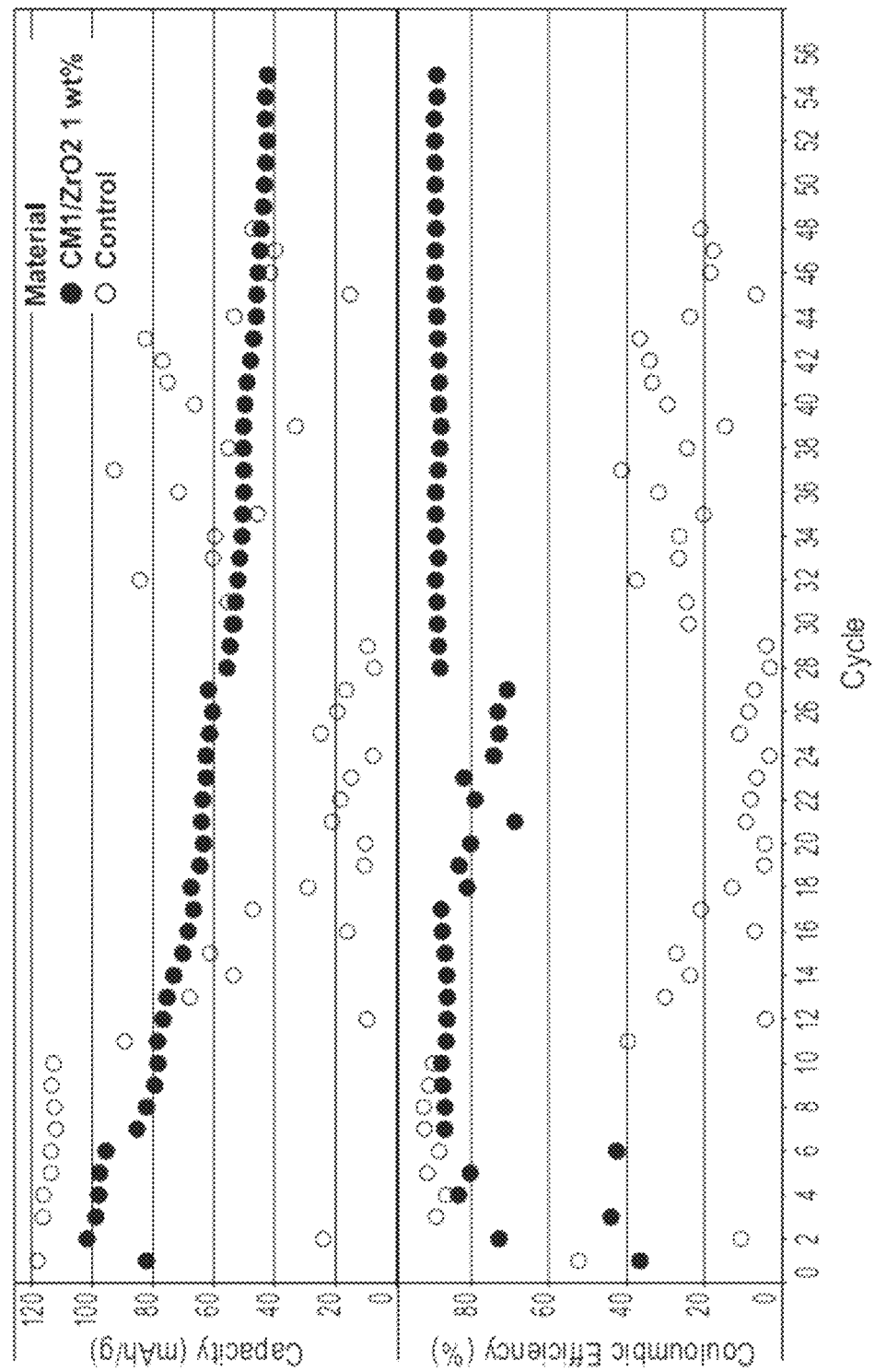
FIG. 32 illustrates capacity and coulombic efficiency of a 1 wt % $ZrO_2$ coated battery materials in comparison with the uncoated battery materials.

As shown in FIG. 30, the control data (uncoated electrode materials) started to lose continuous capacity changing only after around 10 cycles of operation. The unpredictable variations in Couloumbic efficiency also indicate that the electrolyte decomposition has significantly affected the electrochemical performance (e.g., ion transport) at the interface between the electrode materials and the organic electrolyte. The oxide coated samples can largely minimize this negative effect as shown from the improved capacity retention and Couloumbic efficiency (FIG. 32).

The entire disclosures of all references cited in this application are incorporated by reference.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. An electrode material comprising
an active material comprising (i) a first phase comprising lithium (Li), cobalt (Co), iron (Fe), phosphate ($PO_4$), and at least one additional metal selected from titanium (Ti) or vanadium (V), wherein the active material has a molar ratio of Co to a total amount of Co, Fe, and the at least one additional metal of at least 0.70, and (ii) a second phase comprising a metal oxide wherein the metal in the metal oxide is the same metal as the at least one additional metal in the first phase,
the electrode material having its specific capacity at a voltage of 4.5 V which is at least 10% of its specific capacity at a voltage of 2.0 V, as measured upon discharge at a current of 7.5 mA/g from 4.95 V to 2.0 V versus a Li/Li+ counterelectrode.

2. The electrode material of claim 1, wherein the molar ratio of Co is in the range of 0.7 to 0.98.

3. The electrode material of claim 1, wherein, as measured upon discharge at the current of 7.5 mA/g from 4.95 V to 2.0 V versus the Li/Li+ counterelectrode, the electrode material has its specific capacity at the voltage of 4.5 V which is at least 30% of its specific capacity at the voltage of 2.0 V.

4. The electrode material of claim 1, wherein, as measured upon discharge at the current of 7.5 mA/g from 4.95 V to 2.0 V versus the Li/Li+ counterelectrode, the electrode material has its specific capacity at the voltage of 4.5 V which is at least 50% of its specific capacity at the voltage of 2.0 V.

5. The electrode material of claim 1, wherein, as measured upon discharge at a current of 15 mA/g from 4.95 V to 2.0 V versus the Li/Li+ counterelectrode, the electrode material has its specific capacity at the voltage of 4.5 V which is at least 10% of its specific capacity at the voltage of 2.0 V.

6. The electrode material of claim 1, wherein, as measured upon discharge at a current of 75 mA/g from 4.95 V to 2.0 V versus the Li/Li+ counterelectrode, the electrode material has its specific capacity at the voltage of 4.5 V which is at least 10% of its specific capacity at the voltage of 2.0 V.

7. The electrode material of claim 1, wherein, as measured upon discharge at a current of 150 mA/g from 4.95 V to 2.0 V versus the Li/Li+ counterelectrode, the electrode material has its specific capacity at the voltage of 4.5 V which is at least 10% of its specific capacity at the voltage of 2.0 V.

8. The electrode material of claim 1, wherein the specific capacity at the voltage of 2.0 V is at least 130 mAh/g.

9. The electrode material of claim 1, wherein the specific capacity at the voltage of 2.0 V is at least 140 mAh/g.

10. The electrode material of claim 1, wherein the specific capacity at the voltage of 2.0 V is at least 150 mAh/g.

11. The electrode material of claim 1, wherein, as measured upon discharge at the current of 7.5 mA/g from 4.95 V to 2.0 V versus the Li/Li+ counterelectrode, the electrode material has a specific energy of at least 500 Wh/kg.

12. The electrode material of claim 11, wherein the specific energy is at least 550 Wh/kg.

13. The electrode material of claim 11, wherein the specific energy is at least 600 Wh/kg.

14. The electrode material of claim 1, wherein the additional metal is titanium (Ti).

15. The electrode material of claim 1, wherein the additional metal is vanadium (V).

16. The electrode material of claim 1, wherein the active material comprises lithium (Li), cobalt (Co), iron (Fe), phosphate ($PO_4$), and titanium (Ti) in a molar ratio represented by $Li_{1.05}Co_{0.8}Fe_{0.1}Ti_{0.1}PO_4$.

* * * * *